US007945092B2

(12) United States Patent
Hayashi et al.

(10) Patent No.: US 7,945,092 B2
(45) Date of Patent: May 17, 2011

(54) PIXEL PROCESSOR

(75) Inventors: Akimichi Hayashi, Okayama (JP);
Masahiko Shimoda, Okayama (JP)

(73) Assignee: Ryobi System Solutions (JP)

( * ) Notice: Subject to any disclaimer, the term of this patent is extended or adjusted under 35 U.S.C. 154(b) by 1027 days.

(21) Appl. No.: 11/791,605

(22) PCT Filed: Oct. 21, 2005

(86) PCT No.: PCT/JP2005/019424
§ 371 (c)(1),
(2), (4) Date: May 24, 2007

(87) PCT Pub. No.: WO2006/057126
PCT Pub. Date: Jun. 1, 2006

(65) Prior Publication Data
US 2008/0193011 A1 Aug. 14, 2008

(30) Foreign Application Priority Data

Nov. 26, 2004 (JP) ................................. 2004-342963

(51) Int. Cl.
*G06K 9/00* (2006.01)
(52) U.S. Cl. ........ 382/167; 382/162; 382/274; 345/591; 345/592; 715/771
(58) Field of Classification Search ................... 382/162, 382/164, 166, 167, 274; 358/1.9, 1.14; 345/591, 345/592, 581, 589; 715/771; 351/201, 242
See application file for complete search history.

(56) References Cited

U.S. PATENT DOCUMENTS

| 5,498,157 | A | * | 3/1996 | Hall ................................. 433/26 |
| 2001/0053246 | A1 | | 12/2001 | Tachibana et al. |
| 2003/0095705 | A1 | | 5/2003 | Weast |
| 2004/0085327 | A1 | * | 5/2004 | Jones et al. ................... 345/591 |
| 2004/0212815 | A1 | | 10/2004 | Heeman et al. |
| 2005/0179727 | A1 | * | 8/2005 | Bestmann ....................... 347/43 |

FOREIGN PATENT DOCUMENTS

| EP | 1453006 A | 9/2004 |
| JP | A-63-282883 | 11/1988 |
| JP | A-11-175050 | 7/1999 |

(Continued)

OTHER PUBLICATIONS

Internet Citation, "Color blind image correction" [Online] XP02248494, Retrieved from Internet: URL:http://www.vischeck.com/daltonize>[retrieved on Jul. 15, 2003], p. 3, line 12-line 22.

(Continued)

*Primary Examiner* — Samir A Ahmed
*Assistant Examiner* — Ali Bayat
(74) *Attorney, Agent, or Firm* — Trojan Law Offices

(57) ABSTRACT

A pixel processor employing an image processing technology by a computer capable of enhancing color identity. The pixel processor comprises a means performing color vision conversion processing for varying the component in the luminance axis direction depending on the component in the selected axis, i.e. any one of first axis and second axis, out of the component in the luminance axis direction, the component in the first axis direction and the component in the second axis direction included in pixel data represented as positional data in a uniform color space defined by three orthogonal coordinate axes system of the luminance axis indicating luminance, and the first and second axes indicating chromaticness index.

19 Claims, 40 Drawing Sheets

FOREIGN PATENT DOCUMENTS

| | | |
|---|---|---|
| JP | A-2000-30607 | 1/2000 |
| JP | 2002-044678 A | 2/2002 |
| JP | A-2002-290985 | 10/2002 |
| JP | A-2002-303830 | 10/2002 |
| JP | A-2003-223635 | 8/2003 |
| JP | A-2004-34750 | 2/2004 |
| JP | A-2004-266821 | 9/2004 |
| WO | 03/091946 A | 11/2003 |

OTHER PUBLICATIONS

EP 05795227, Supplemental European Search Report dated Feb. 24, 2010.

* cited by examiner

Fig. 10

Necessary information for calculating coordinates on boundary line

| Area | Reference axis | Variation axis | Reference axis range | Content of boundary line |
|---|---|---|---|---|
| u1 | u | L | 0.0 ~ 175.1 | Minimum value of L |
| u2 | u | L | 0.0 ~ 175.1 | Maximum value of L |
| u3 | u | L | −70.7 ~ 0.0 | Maximum value of L |
| u4 | u | L | −83.1 ~ −70.7 | Maximum value of L |
| u5 | L | u | 0.1 ~ 87.8 | Minimum value of u |
| v1 | v | L | 0.0 ~ 107.5 | Minimum value of L |
| v2 | L | v | 87.8 ~ 97.0 | Maximum value of v |
| v3 | v | L | 0.0 ~ 106.8 | Maximum value of L |
| v4 | v | L | −108.8 ~ 0.0 | Maximum value of L |
| v5 | L | v | 32.4 ~ 60.4 | Minimum value of v |
| v6 | v | L | −130.5 ~ 0.0 | Minimum value of L |

Fig. 11

Approximate expression of boundary line

| Area | Approximate expression |
|---|---|
| u1 | $u = 3.27911 \times L + 0.334513$ |
| u2 | $u = -0.00038119 \times L^3 + 0.121971 \times L^2 - 15.5168 \times L + 713.514$ |
| u3 | $u = 7.93939 \times L - 794.381$ |
| u4 | $u = -0.311262 \times L^2 + 59.4391 \times L - 2902.62$ |
| u5 | $u = -0.945026 \times L - 0.0931042$ |
| v1 | $v = 1.22208 \times L + 0.124972$ |
| v2 | $v = 0.00966957 \times L^2 - 1.85826 \times L + 196.172$ |
| v3 | $v = 2.29506 \times L^2 - 490.268 \times L + 26079.6$ |
| v4 | $v = 2.78401 \times L - 278.237$ |
| v5 | $v = -0.000944111 \times L^3 + 0.186393 \times L^2 - 10.2379 \times L + 37.5197$ |
| v6 | $v = -4.03263 \times L + 0.0856512$ |

PIXEL PROCESSOR

This is a national stage application of PCT/JP2005/019424 filed Oct. 21, 2005.

FIELD OF THE INVENTION

The present invention relates to a pixel processor, and more specifically it relates to a pixel processing device facilitating visualization of an image (being composed of pixel data) by processing the pixel data included in electronic image data.

The pixel processing device of the present invention may be used preferably to process the image data to make the color included in the image recognized more easily by people having color vision deficiencies (So-called, people having color amblyopia or color-blindness. Hereinafter to be referred to as "color deficient observer".)

BACKGROUND ART

People in the modern society often obtain much information by viewing various kinds of matter (It is possible, for example, to obtain much useful information by viewing a subway map, a sign, various kinds of web pages existing on the internet, recognize that a tomato is ripe by viewing the color of the tomato, and check doneness of broiled meat by viewing it.) and soothe their heart (For example, people soothe their heart by viewing a scene with full of bloomed flowers or mountains with leaves turned red and yellow.).

Such viewing is of course to recognize various kinds of things by eyesight and it is important whether the things themselves (contour) can be seen or not in the visual perception (It usually depends on whether the eyesight is good enough or not. Hereinafter, it is referred to as "shape perception".) as well as whether color differences can be discriminated or not (It usually depends on the chromatic vision. Hereinafter, it is referred to as "color perception".). For example, in one of the above examples, each subway route is often drawn in a different color in the subway map in order to discriminate each route, but it becomes difficult to recognize each route by each color if the number of routes to be shown is increased (For example, a subway map around Tokyo area may be a good example.). In the example of the subway map, the color perception is more important than the shape perception. And the color perception is also more important than the shape perception in the case of checking how ripe the tomato is by viewing the color of the tomato or checking the doneness of the meat by viewing the color of the meat. Also, the color perception is more important than the shape perception in the case of finding a flower when such a flower blooms in a gorgeous color in the hedge with full of leaves and twigs, viewing leaves turned red, or the like.

In such cases where the color perception is more important than the shape perception, the color deficient observer may not render the perception well by eyesight if the color perception is necessary since the color deficient observer has a lower level of the color perception than people who have no color deficiency (Herein after, referred to as "color non-deficient observer".). The color deficiency is caused by a disorder of cones as photoreceptor cells of the retina and categorized in a red-green color blindness such as a protan (protanopia and protanomaly) having disorder in L-cone cell characterized by a peak of sensitivity in a longer wavelength zone and a deutan (deuteranopia and deuteranomaly) having disorder in M-cone cell characterized by a peak of sensitivity in a middle wavelength zone, and a blue-yellow color blindness such as a tritan (tritanopia and tritanomaly) having disorder in S-cone cell characterized by a peak of sensitivity in a shorter wavelength zone. In the case where these three cone cells are deficient, the color deficiency is a total color blindness. However, the total color blindness is quite rare and most color deficiencies are the red-green color blindness, to which it is said that 5% of Japanese men and 0.2% of Japanese women belong. In order to enhance the color perception of such a color deficient observer, a filter for the color deficient observer to drive a car and lenses of eyeglasses for the color deficient observer and so on have been developed (For example, patent references 1 and 2 should be referred to.), but many color deficient observers have a resistance to using the filter or lenses having a thick coloring or a special reflecting film such that they are not widely used.

Recently, an image processing technology utilizing a computer is also developed. For example, converting colors difficult to percept into colors easy to percept by an image processing method or the like, and inputting lines between colors are also considered. However, it is possible for people having red-green blindness to discriminate two colors as different colors by utilizing these methods, but it is not understood which tomato is ripe, red and ripe tomato or green tomato, although the red and ripe tomato and the green tomato can be discriminated as different tomatoes. Therefore, the technology can not be applied to various situations.

Patent Reference 1

JP-A-2004-34750 (claim 1 and FIG. 3)

Patent Reference 2

JP-A-2002-303830 (claim 1)

DISCLOSURE OF THE INVENTION

Problem to be Solved by The Invention

It is an object to provide a pixel processor utilizing an image processing technology by a computer to enhance the color perception in viewing various things. In particular, the pixel processor that can be used in processing the image data such that the color deficient observer can easily percept the color contained in the image is provided.

Means for Solving Problem

A pixel processor (hereinafter, referred to as "present device") comprises: color vision conversion processing means for performing color vision conversion processing which is processing of changing the component in the direction of the luminance axis according to the component in the direction of a selected axis of either a first axis or a second axis among the component in the direction of the first axis, the component in the direction of the second axis, and the component in the direction of the luminance axis which are included by the pixel data shown as position data in a uniform color space indicated by three orthogonal coordinate axes of the luminance axis representing luminance, the first axis and the second axis which are two axes representing the chromaticness index.

The uniform color space is a color space designed such that the color differences perceived as the same greatness substantially correspond to the same distance in the space and several kinds of the color spaces are known. For example, the color space is exemplified as follows: a color space (LMS Color Space. Hereinafter, referred to as "LMS") where a stimulus value for each cone is determined in reference to spectral absorption properties of three kinds of cones and a measured value of coloring properties (spectral distribution) of a display of a computer or the like, a color space (Opponent Color Space. Hereinafter, referred to as "OCS") where chromesthesia that is perceived by the brain is determined from the LMS value in consideration of calculation conducted in the process to transmit a signal from the cone to the brain, CIE L*u*v* color space (Hereinafter, referred to as "Luv color space".), CIE L*a*b* color space (Hereinafter, referred to as "Lab color space".), and so on.

Among these uniform color spaces, the uniform color space such as OCS space, Luv space, and Lab space indicated by three orthogonal coordinate axes of the luminance axis representing luminance, the first axis and the second axis which are two axes representing the chromaticness index is used here.

Here, the two axes of the first axis and the second axis correspond to the 'u' axis (Red color for the positive direction and green color for the negative direction are indicated, respectively.) and the 'v' axis (Yellow color for the positive direction and blue color for the negative direction are indicated, respectively.) in the case where the uniform color space is the Luv color space, respectively, and the 'a' axis (Red color for the positive direction and green color for the negative direction are indicated, respectively.) and the 'b' axis (Yellow color for the positive direction and blue color for the negative direction are indicated, respectively.) in the case that the uniform color space is the Lab color space, respectively.

Then, either the first or second axis is referred to as a selected axis.

Pixel data indicated as position data in such uniform color space include a component in the direction of the luminance axis, a component in the direction of the first axis, and a component in the direction of the second axis such that the position of the pixel data in the uniform color space is determined by the three components.

The color vision conversion processing means of the present device performs the color vision conversion processing which is processing of changing the component in the direction of the luminance axis according to the component in the direction of a selected axis (either the first axis or the second axis) which is included by the pixel data. Here, "changing the component in the direction of the luminance axis according to the component in the direction of a selected axis" means that the changing amount of the component in the luminance axis shows a monotonic increase with respect to the absolute value of the component in the direction of the selected axis.

In this way, the component in the direction of the selected axis of the pixel data indicated as the position data in the uniform color space can be observed by means of the component in the direction of the luminance axis since the component in the direction of the luminance axis of the pixel data is changed according to the component in the direction of the selected axis of the pixel data. That is, the color difference according to the difference in the components in the direction of the selected axis (For example, the color difference according to the difference in the components in the 'u' axis of the Luv color space. In this case, it is actually the color difference in the range from red to green.) can be observed as the difference in the components in the direction of the luminance axis (i.e., luminance difference) such that the color difference can be perceived by the component difference in the direction of the selected axis as the components in the direction of the luminance axis (luminance difference) when an axis, in which the color difference by the component difference is more difficult to perceive, out of the first and the second axes is selected as the selected axis (i.e., less color perception by the component difference in the selected axis direction).

In either case where the component in the direction of the selected axis is larger than a first prescribed value or where the component in the direction of the selected axis is smaller than the first prescribed value, the color vision conversion processing is conducted by a processing device to decrease the component in the direction of the luminance axis. And in the other case, the color vision conversion processing is conducted by the processing device (Hereinafter, referred to as "increase-decrease two-way processing device".) to increase the component in the direction of the luminance axis.

In doing this, it is possible to percept the difference much clearly in the direction of the selected axis of the components on one side and the other side, in the middle of which there is a first predetermined value, as the difference between the components separated by the first predetermined value in the direction of the luminance axis since the component in the direction of the luminance axis is decreased on the one side and the component in the direction of the luminance axis is increased on the other side.

Here, the first predetermined value may be the same or different in either case where the selected axis is the first axis or the second axis.

Also, the component in the direction of the luminance axis may not be changed when the component in the direction of the selected axis is close to the first predetermined value.

In the increase-decrease two-way processing device, the selected axis is an axis designating the red component in the positive direction and the green component in the negative direction, and the color vision conversion process is conducted such that the component in the direction of the luminance axis is increased when the red component is greater than the first predetermined value while the component in the direction of the luminance axis is decreased when the red component is smaller than the first predetermined value.

In doing this, the color deficient observer in the red-green blindness can discriminate different colors in the range from red to green as the component difference in the direction of the luminance axis since the pixel data including more reddish color have higher luminance as the component in the direction of the luminance axis is increased and the pixel data including more greenish color have lower luminance as the component in the direction of the luminance axis is decreased.

Here, the selected axis which indicates the red component in the positive direction and the green component in the negative direction is the 'u' axis if the uniform color space is the Luv color space or the 'a' axis if the uniform color space is the Lab color space.

In the increase-decrease two-way processing device, the selected axis is an axis indicating the yellow component in the positive direction and the blue component in the negative direction, and the color vision conversion process is conducted such that the component in the direction of the luminance axis is decreased when the yellow component is greater than the first predetermined value while the component in the direction of the luminance axis is increased when the yellow component is smaller than the first predetermined value.

In doing this, the color deficient observer having the blue-yellow blindness can discriminate different colors in the range from blue to yellow as the component difference in the direction of the luminance axis since the pixel data including more bluish color has higher luminance as the component in the direction of the luminance axis is increased while the pixel data including more yellowish color has lower luminance as the component in the direction of the luminance axis is decreased.

Here, the selected axis which indicates the yellow component in the positive direction and the blue component in the negative direction is the 'v' axis if the uniform color space is the Luv color space or the 'b' axis if the uniform color space is the Lab color space.

The device (Hereinafter, referred to as "selected axis component residual device") may be characterized in that a component in the direction of the selected axis after the color vision conversion processing is determined by converting the component in the direction of the selected axis before the color vision conversion processing based on a monotone increasing function that monotonically increases an absolute value of the component in the direction of the selected axis after the color vision conversion processing with respect to an absolute value of the component in the direction of the selected axis before the color vision conversion processing.

Here, "the monotone increasing function that monotonically increases an absolute value of the component in the direction of the selected axis after the color vision conversion processing with respect to an absolute value of the component in the direction of the selected axis before the color vision conversion processing" may satisfy the relationship that 'B' is greater than 'A' wherein the 'B' is an absolute value of a component in the direction of the selected axis after the pixel data of 'b' is processed in the color vision conversion processing and the 'A' is an absolute value of a component in the direction of the selected axis after the pixel data of 'a' is processed in the color vision conversion processing in consideration of any given absolute values of the 'a' and the 'b' (here, the 'b' is greater than 'a') of the component in the direction of the selected axis before the color vision conversion processing.

In doing this, the order of components in the direction of the selected axis before the color vision conversion processing is kept in the same order of the components in the direction of the selected axis after the color vision conversion processing such that the tone of the original pixel remains as specific kinds of colors are converted in the color vision conversion processing to become brighter or dimmer. Therefore, the tone of the original pixel before the color vision conversion processing can be recognized from the tone of the pixel after the color vision conversion processing.

In the case of the selected axis component residual device, the device (hereinafter, referred to as "convex-concave function conversion device") may be characterized in that a selected data combination is composed of the component in the direction of the luminance axis and the component in the direction of the selected axis that are included in the pixel data, and either selected data combination including the component in the direction of the selected axis greater than a second predetermined value or smaller than the second predetermined value is alternatively converted such that either convex or concave function existing on a selected plane including the selected axis and the luminance axis as the selected axis is a horizontal axis and the luminance axis is a vertical axis is alternatively satisfied.

Here, the "convex function existing on the selected plane in which the selected axis is a horizontal axis and the luminance axis is a vertical axis" may means a function indicated by a curve being concave upward (The curve, of course, exists on the selected plane.) when the selected plane including the selected axis and the luminance axis is considered and the selected axis is made to be the horizontal axis and the luminance axis is made to be the vertical axis on the selected plane.

In the same way, the "concave function existing on the selected plane in which the selected axis is a horizontal axis and the luminance axis is a vertical axis" may mean a function indicated by a curve being convex upward (The curve, of course, exists on the selected plane.) when the selected plane including the selected axis and the luminance axis is considered and the selected axis is made to be the horizontal axis and the luminance axis is made to be the vertical axis on the selected plane.

In such selected data combinations (The combinations are composed of the components of both component in the direction of the luminance axis and component in the direction of the selected axis which are included by the pixel data.), either selected data combination in which the component in the direction of the selected axis is greater than the second predetermined value or the component in the direction of the selected axis is smaller than the second predetermined value is converted such that either convex or concave function is satisfied alternatively while the other selected data combination is converted in the color vision conversion processing such that the other function is satisfied. Therefore, it may be determined how much of the tone of the original pixel is reflected on the tone of the pixel after the color vision conversion processing.

In the convex-concave function conversion device, the convex function and the concave function may be formed by a part of a first elliptic circumference existing in a greater range than the second predetermined value, the first elliptic circumference having the center on a straight line indicating the second predetermined value as a component in the direction of the selected axis; and a part of a second elliptic circumference existing in a smaller range than the second predetermined value, the second elliptic circumference having the center on a straight line indicating the second predetermined value as a component in the direction of the selected axis, and one end of the first elliptic circumference and one end of the second elliptic circumference may be connected at the second predetermined value, when components thereof in the direction of the luminance axis are the same.

The first ellipse and the second ellipse have centers on the straight line having the component, which indicates the second predetermined value, in the direction of the selected axis. Then, the first elliptic circumference is composed of a portion of an elliptic circumference existing in the larger range than the second predetermined value of the elliptic circumference of the first ellipse. The second elliptic circumference is composed of a portion of an elliptic circumference existing in the smaller range than the second predetermined value of the elliptic circumference of the second ellipse. One end of the first elliptic circumference and one end of the second elliptic circumference are connected at the second predetermined value such that either the first or the second elliptic circumference forms alternatively either the convex or the concave function while the other of the first and second elliptic circumferences forms the other of the convex and concave functions.

Thus, it is possible to recognize well the tone of the original pixel before the color vision conversion processing from the tone of the pixel after the color vision conversion processing as the convex and concave functions are formed with the first and second elliptic circumferences.

The device (hereinafter, referred to as "selected axis reference value using device") may be characterized in that a change amount of the component in the direction of the luminance axis to be changed corresponding to the component in the direction of the selected axis in the color vision conversion processing is determined corresponding to a ratio of the component of the selected axis of the pixel data to a selected axis reference value as a reference value of the component of the selected axis.

Here, that the change amount is determined corresponding to the ratio is that the change amount monotonically increases as the ratio increases. For example, the relationship that the change amount Rr2 by r2 is greater than the change amount Rr1 by r1 is realized when given values r1 and r2 of the ratio (Here, the r1 is greater than r2.) are considered.

In doing this, it is possible to evaluate how large the component is according to the ratio of the component of the selected axis of the pixel data to the predetermined selected axis reference value. Then, the change amount is determined corresponding to the scale of the component such that it is possible to recognize the degree of the scale of the component in the direction of the selected axis as the component change in the direction of the luminance axis.

In the selected axis reference value using device, the selected axis reference value may be a limit value, which can be displayed, of the component of the selected axis in at least part of the range of the component in the direction of the luminance axis before the color vision conversion processing.

In this way that the limit value, which can be displayed, of the component of the selected axis is made a selected axis reference value, the degree of the scale of the component is evaluated by the ratio of the component to the limit value to be displayed such that it is possible to evaluate the scale of the component with respect to the limit to some degree of standardization and it is also possible to recognize well the degree of scale of the component in the direction of the selected axis as the component change in the direction of the luminance axis.

Here, the limit value, which can be displayed, of the component of the selected axis may be any value, but it can be determined by the component value in the direction of the luminance axis since it may change according to the component value in the direction of the luminance axis.

In the selected axis reference value using device, the selected axis reference value may be constant in at least part of the range of the component in the direction of the luminance axis before the color vision conversion processing.

In this way that the selected axis reference value is made a constant value, it is possible to recognize well the degree of scale of the component in the direction of the selected axis as the component change in the direction of the luminance axis if the constant value is determined such that the degree of the scale of the component may be well evaluated.

In the case of the selected axis reference value using device, the change amount of the component in the direction of the luminance axis may be determined corresponding to a value of a difference between a luminance axis reference value as a reference value of the component of the luminance axis and the component in the direction of the luminance axis before the color vision conversion processing multiplied by the above-mentioned ratio (such device is referred to as "luminance axis reference value using device").

Here, that the change amount of the component in the direction of the luminance axis is determined according to the multiplied value is that the change amount monotonically increases as the multiplied value increases. When any given multiplied values x1 and x2 (Here, the x2 is greater than the x1.) are considered, the relationship that the change amount Xx2 for the x2 is greater than the change amount Xx1 for the x1 is satisfied. Here, the multiplied value is a product (i.e., $(y1-Li) \times (ui/um)$) of the difference $(y1-Li)$ between the luminance reference value y1 as a reference value of the component of the luminance axis and the component Li in the direction of the luminance axis before the color vision conversion processing and the ratio (e.g., ui/um).

In this way, the distance in the direction of the luminance axis from the component Li in the direction of the luminance axis before the color vision conversion processing to the predetermined luminance axis reference value y1 may be evaluated according to the difference $(y1-Li)$ between the predetermined luminance axis reference value y1 and the component Li in the direction of the luminance axis before the color vision conversion processing. And the change amount of the component in the direction of the luminance axis is determined according to the multiplied value proportional to the distance such that the change amount of the component in the direction of the luminance axis can be well determined according to the difference between the luminance axis reference value y1 and the component Li in the direction of the luminance axis before the color vision conversion processing.

In the case of the luminance axis reference value using device and the convex-concave function conversion device, the component of the luminance axis of the intersection of a convex function or a concave function in the convex-concave function conversion device; and a boundary line of the range that can be displayed on the selected plane including the selected axis and the luminance axis may be the luminance axis reference value.

The boundary line of the range that can be displayed on the selected plane including the selected axis and the luminance axis means a boundary line (Usually, it is a line of an outer border of the range that can be displayed.) indicating the border between the range that can be displayed and the range that cannot be displayed when the range that can be displayed is projected on the selected plane.

In this way, if the component of the luminance axis of the intersection of the convex or concave function satisfied by the selected data combination after the conversion and the boundary line of the range that can be displayed is made the luminance axis reference value, since the limit value that can be displayed may be the luminance axis reference value, the difference between the limit value that can be displayed and the component in the direction of the luminance axis before the color vision conversion processing indicates a moveable distance in the direction of the luminance axis from the component Li in the direction of the luminance axis before the color vision conversion processing. Therefore, the change amount of the component in the direction of the luminance axis may be determined well according to the moveable distance in the direction of the luminance axis The device (hereinafter, referred to as "unselected axis processing device") may be characterized in that the color vision conversion processing means further conducts unselected axis processing as processing to decrease an absolute value of a component of the pixel data in a direction of an unselected axis as the other axis than the selected axis of either the first axis or the second axis.

The unselected axis is one of the first and second axes, which is not the selected axis, by way of example, if the first axis is the selected axis; the second axis is the unselected axis, and if the second axis is the selected axis; the first axis is the unselected axis.

In this way that the unselected axis processing which is processing to decrease the absolute value of the component in the direction of the unselected axis, it is possible to prevent that the hue of the pixel data after the pixel data is processed by the present device would not change much from the pixel data before the processing.

In the unselected axis processing device, the absolute value of the component in the direction of the unselected axis is decreased corresponding to a change amount of the component in the direction of the luminance axis to change corresponding to the component in the direction of the selected axis.

That "the absolute value of the component in the direction of the unselected axis is decreased corresponding to a change amount of the component in the direction of the luminance axis to change according to the component in the direction of the selected axis" means that a decreasing amount z of the absolute value of the component in the direction of the unselected axis monotonically increases according to the change amount w of the component in the direction of the luminance axis, for example, if any given change amounts w1 and w2 (here, the w2 is greater than the w1) are considered, the relationship that the decreasing amount Zz2 for the w2 is greater than the decreasing amount Zz1 for the w1 is satisfied.

In doing this, since the absolute value of the component in the direction of the unselected axis is decreased according to the change amount of the component in the direction of the luminance axis, the change in the hue between the pixel data before the processing by the present device and the pixel data after the processing by the present device is more effectively prevented.

In the unselected axis processing device, the component of the unselected axis of the pixel data may be made 0 after the unselected axis processing when the component of the unselected axis is positive or negative alternatively before or after the unselected axis processing.

The component of the unselected axis of the pixel data may be made 0 after the unselected axis processing when the component of the unselected axis switches between positive and negative alternatively before or after the unselected axis processing in order to prevent that the pixel data become totally in different colors (the color is reversed) before and after the unselected axis processing.

In the case of the unselected axis processing device, it is determined whether the pixel data after unselected axis processing is in the range that can be displayed or not such that the component of the unselected axis may be corrected to a limit value that can be displayed when the pixel data after the unselected axis processing is determined not to be displayed.

Since the pixel data processed by the unselected axis processing becomes out of the range that can be displayed, the pixel data cannot be displayed. Therefore, the component of the unselected axis may be corrected to be a limit value that can be displayed if the pixel data becomes out of the range that can be displayed.

The uniform color space may be a Luv color space or a Lab color space.

As described above, the uniform color space means a color space to be designed such that the color differences perceived in the same amount correspond to approximately same respective distances in the space, and for example, OCS, Luv color space, Lab color space, and the like are known. These uniform color spaces are used such that the conversion processing may be conducted in a closer manner to the human color feeling.

In these OCS, Luv color space, and Lab color space, the Luv color space and the Lab color space are composed of the luminance axis and two axes indicating the chromaticness index of the first and second axes so as to be three dimensional. And it is extremely easy to handle the data since the data conversion method is standardized among the data, the RGB color model values, and CIE and XYZ values. Also, if the Luv color space of the Luv color space and the Lab color space is used, the color deficient observer can more clearly perceive the color difference as the component difference in the direction of the luminance axis.

A uniform color space conversion means for converting original pixel data indicated by RGB color model into position data in the uniform color space may further be included.

Since there are so many pixel data indicated by the RGB color model, which is often used in the image processing, photographing, and so on, it is strongly desired to process so many pixel data indicated by such RGB color model. Therefore, the present device may further comprise uniform color space conversion means that converts the original pixel data indicated by the RGB color model into the position data in the uniform color space. In doing this, many existing original pixel data indicated by the RGB color model can be smoothly processed by the present device.

Also, the data conversion method to convert from the RGB color model into the uniform color space is, as mentioned above, standardized and known to the public such that the explanation thereof is omitted here.

A uniform color space inverse conversion means for outputting pixel data in the uniform color space processed by the color vision conversion processing means after the pixel data is converted into the RGB color model may further be included.

Since the RGB color model is used heavily in the image processing and the like, it may be requested that the present device outputs the pixel data in the RGB color model as used heavily. Therefore, the present device may further comprise the uniform color space inverse conversion means for outputting after the pixel data in the uniform color space, which are processed by the color vision conversion processing means, are converted into the RGB color model, such that the pixel data indicated by the RGB color model used heavily may be output smoothly by the present device.

Here, the data conversion method of converting the data from the uniform color space to the RGB color model is, as mentioned above, standardized and known to the public so that the explanation thereof is omitted here.

The present device can be realized by executing a predetermined program on the computer, and such program can be recorded in a computer readable storage medium.

BRIEF DESCRIPTION OF THE DRAWINGS

FIG. 10 is a view summarizing reference axis, variation axis, reference axis range, and meaning of boundary line with respect to each line u1 to u5 and v1 to v6.

FIG. 11 is a view showing approximate expressions of respective lines u1 to u5 and v1 to v6 as shown in FIGS. 8 and 9.

Figure 1:
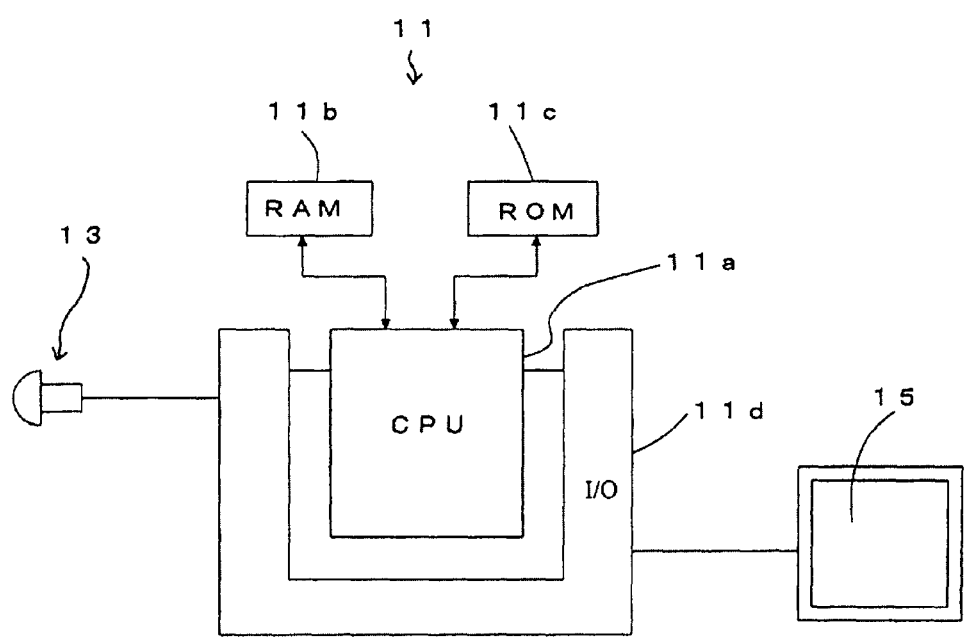
FIG. 1 is a general block diagram showing a hardware configuration of a pixel processor (present device) according to an embodiment of the present invention.

DESCRIPTION OF NOTATIONS 11 present device
11a CPU
11b RAM
11c ROM
11d interface
13 digital camera part
15 display part
21 reception part
31 color space conversion part
41 data processing part
42 data storage part
43 object image data extraction part
44 conversion part
45 conversion type storage part
46 parameter storage part
47 mathematical formula storage part
48 reading part
51 color space inverse transform part
61 output part

BEST MODE OF CARRYING OUT THE INVENTION

In the following, embodiments of the present invention are described with reference to the drawings. However the present invention is not limited thereto in any way.

FIG. 1 is a general block diagram showing a hardware configuration of a pixel processor (present device) 11 as an embodiment of the present invention. The hardware configuration of the present device 11 of the embodiment is described with reference to FIG. 1. The present device 11 is built into a part of a mobile phone (not illustrated), and a digital camera part 13 attached to the mobile phone and a display part 15 attached to the mobile phone are connected to the present device 11. Here, in order to make the description and the understanding easier, only a portion related to the present device 11 in the mobile phone is shown, but a telephone call using the mobile phone, the transmission and reception of E-mails, and image photographing using the digital camera part 13 can be performed in a similar manner to a general mobile phone.

In the present embodiment, the present device 11 comprises a computer in which a program is built, and the present device 11 is connected to the digital camera part 13 and the display part 15 as mentioned above.

The present device 11 comprises: a CPU 11a which performs arithmetic processing, a RAM 11b which the CPU 11a uses as a working area and the like, a ROM 11c for recording a control program and the like, and an interface 11d for performing information exchange with the digital camera part 13 and the display part 15. Although the control program and the like are stored in the ROM 11c in this embodiment, it should be understood that they may be stored in another storage (for example, a hard disk or the like).

Figure 2:
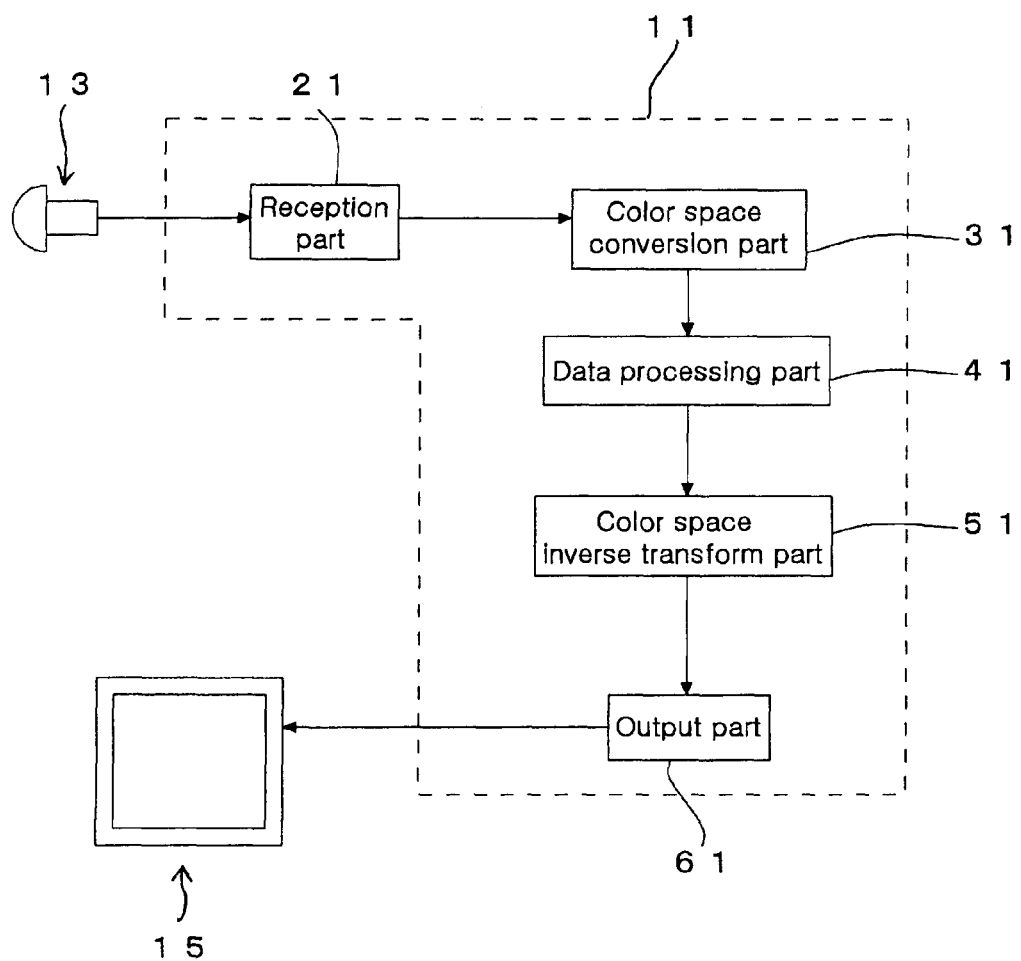
FIG. 2 is a general functional block diagram showing a general basic configuration of the present device.

FIG. 2 shows a general functional block diagram illustrating a general basic configuration of the present device 11 implemented by the hardware in FIG. 1 and the program recorded mainly in the ROM 11c. The basic configuration of the present device 11 is described with reference to FIG. 2.

Described in a functional manner, the present device 11 comprises: a reception part 21, a color space conversion part 31, a data processing part 41, a color space inverse transform part 51, and an output part 61.

Upon receiving a photographing instruction signal which instructs photographing (Here, a part which sends out the photographing instruction signal toward the digital camera part 13 is not illustrated.), the digital camera part 13 takes a picture of an image according to an RGB color model, and transmits image data of the taken picture to the reception part 21. The reception part 21 is constantly kept in a standby mode and ready to receive image data from the digital camera part 13, and when receiving the image data from the digital camera part 13, the reception part 21 transmits the data of the received image to the color space conversion part 31.

The color space conversion part 31 having received the image data according to the RGB color model (hereinafter referred to as "RGB image data") from the reception part 21 converts the RGB image data into data in Luv color space ((L, u, v)=(Li, ui, vi) is included. Hereinafter referred to as "Luv image data".). The conversion from the RGB image data to the Luv image data is performed by converting all pixel data included in the RGB image data into the Luv image data. Since such a conversion method is already known, the description thereof is omitted here.

The Luv image data converted by the color space conversion part 31 is transmitted from the color space conversion part 31 to the data processing part 41. Table 1 shows schematically an example of the Luv image data transmitted from the color space conversion part 31 to the data processing part 41. Table 1 includes the pixel numbers (1, 2, 3, 4 ... n (positive integers)) and (L, u, v) data ((Li, ui, vi)) (The position of each pixel data in an image is determined by the order of the arrangement of the pixel data.). Although the data of (L, u, v) is indicated as (L1, u1, v1) or (L2, u2, v2), numeric values are actually included in these 'L' data (L1, L2, L3 ... ), 'u' data (u1, u2, u3 ... ), and 'v' data (v1, v2, v3 ... ). Thus, an image is formed of a set of pixels (Luv data (L, u, v)=(Li, ui, vi) of the pixel), which may be expressed by a pixel number 'i' (Here, 'i' is from 1 to n).

Here, as constituting (L, u, v), the 'L' axis is a luminance axis (Li indicates luminance.), and the 'u' axis (The positive direction indicates red and the negative direction indicates green.) and the 'v' axis (The positive direction indicates yellow and the negative direction indicates blue.) are a first axis and a second axis which are two axes indicating chromaticness indices.

TABLE 1

| Example of Luv image data | |
|---|---|
| Pixel number | (L, u, v) |
| 1 | (L1, u1, v1) |
| 2 | (L2, u2, v2) |

TABLE 1-continued

| Example of Luv image data | |
|---|---|
| Pixel number | (L, u, v) |
| 3 | (L3, u3, v3) |
| 4 | (L4, u4, v4) |
| . | . |
| . | . |
| . | . |
| N | (Ln, un, vn) |

Figure 3:
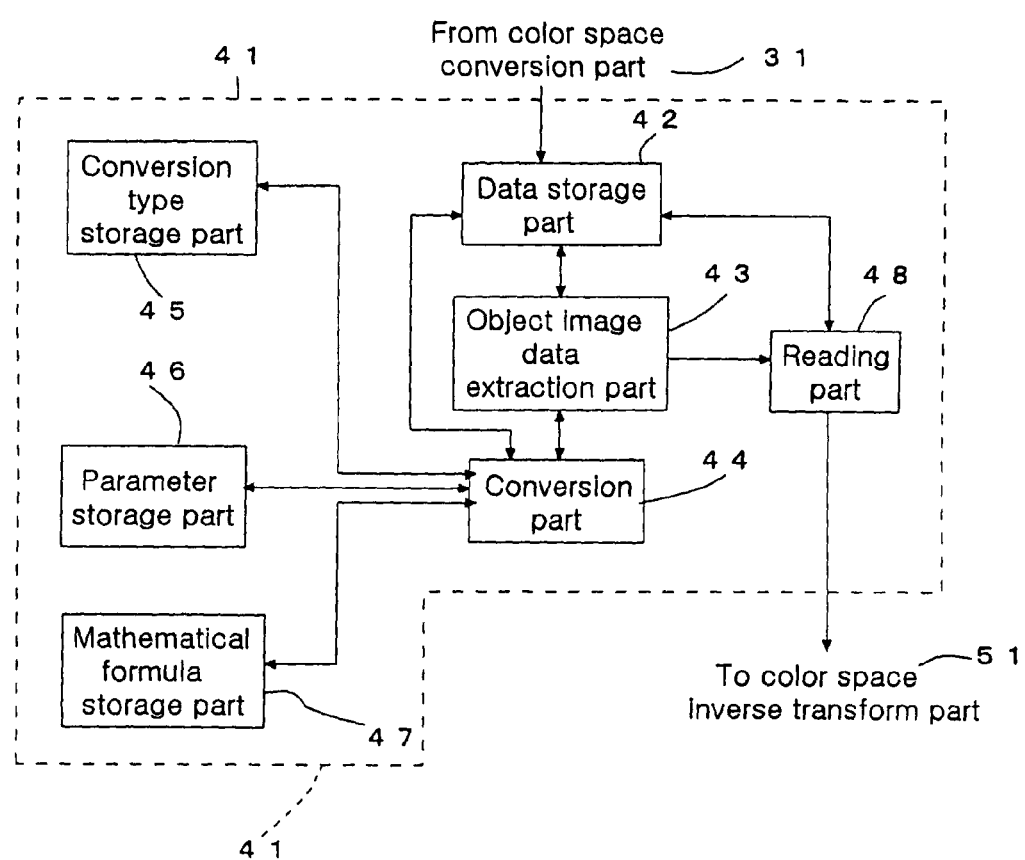
FIG. 3 is a detailed functional block diagram showing details of a data processing part.

FIG. 3 is a detailed functional block diagram showing details of the data processing part 41. The details of the data processing part 41 are described with reference to FIG. 3.

The data processing part 41 comprises: a data storage part 42, an object image data extraction part 43, a conversion part 44, a conversion type storage part 45, a parameter storage part 46, a mathematical formula storage part 47, and a reading part 48 as expressed in a functional manner.

The data storage part 42 of the data processing part 41 receives the Luv image data (data as shown in Table 1) transmitted from the color space conversion part 31. The data storage part 42 having received the Luv image data stores the received Luv image data, and also transmits the received Luv image data to the conversion part 44.

The conversion part 44 having received the Luv image data determines whether either first conversion (for protan and deutan) or third conversion (for tritan) is specified by accessing the conversion type storage part 45 to read conversion types stored in the conversion type storage part 45. When it is determined that the first conversion (for protan and deutan) is specified, the conversion part 44 performs the "first conversion" to be described below, and when it is determined that the third conversion (for tritan) is specified, performs the "third conversion" to be described below. Processing classification desired by a user of the present device 11 (specifically, the distinction of the first conversion (for protan and deutan) or the third conversion (for tritan)) is input into the conversion type storage part 45 via a keyboard, a touch panel, or the like (none of them are illustrated) connected to the present device 11, and is in advance stored in the conversion type storage part 45.

Then, as described below, data on all the pixels included in the Luv image data (In Table 1, a pixel number and (L, u, v) related to the same pixel number are data on one pixel. Therefore, for example, the data on all the pixels in Table 1 is all 'n' pieces of data from the pixel number 1 to the pixel number 'n'.) are subjected to the first conversion (for protan and deutan) or the third conversion (for tritan) (That is, the specified conversion (either the first or the third conversion) is continued for each pixel data included in the Luv image data until the specified conversion (either the first or the third conversion) for all the pixel data included in the Luv image data is completed.).

(First Conversion (for Protan and Deutan))

The conversion part 44 having determined that the first conversion (for protan and deutan) is specified transmits an instruction signal (hereinafter referred to as a "readout instruction signal") to the object image data extraction part 43 for instructing the object image data extraction part 43 to read out one piece of pixel data which is not yet read out from among the pixel data included in the Luv image data stored by the data storage part 42 and transmit the one piece of pixel data to the conversion part 44. The object image data extraction part 43 having received the readout instruction signal from the conversion part 44 accesses the data storage part 42, reads out and acquires the one piece of pixel data (That is, information on the pixel number 'i' and the Luv data (L, u, v)=(Li, ui, vi) (Here, 'i' is a positive integer.) is considered as one unit as the pixel data related to the pixel number 'i'.) which is not yet read out from among the pixel data included in the Luv image data stored in the data storage part 42. Then, the object image data extraction part 43 transmits the one piece of pixel data read out and acquired from the data storage part 42 to the conversion part 44. Here, when the object image data extraction part 43 having received the readout instruction signal from the conversion part 44 determines that there is no unread pixel data among the pixel data included in the Luv image data stored by the data storage part 42 (That is, all the pixel data have been read out and there is no unread pixel data.), the object image data extraction part 43 transmits a startup signal to the reading part 48. The pixel data which is transmitted from the object image data extraction part 43 to the conversion part 44 and to be subsequently processed is referred to as "object pixel data".

The conversion part 44 having received the object pixel data from the object image data extraction part 43 determines first whether or not the 'u' value (ui) of the Luv data included in the object pixel data (the pixel number 'i' and Luv data (L, u, v)=(Li, ui, vi)) is greater than 0, and when the 'u' value (ui) is determined to be greater, performs the following "Processing in the case where 'u' is positive". When the 'u' value (ui) is not determined to be greater than 0, the conversion part 44 determines whether or not the 'u' value (ui) of the Luv data is smaller than 0. When the 'u' value (ui) is determined to be smaller, the conversion part 44 performs the following "Processing in the case where 'u' is negative". When the 'u' value (ui) is not determined to be smaller than 0 (That is, the 'u' value (ui) is 0 in this case.), the conversion part 44 does not perform conversion at all as mentioned later.

Figure 4:
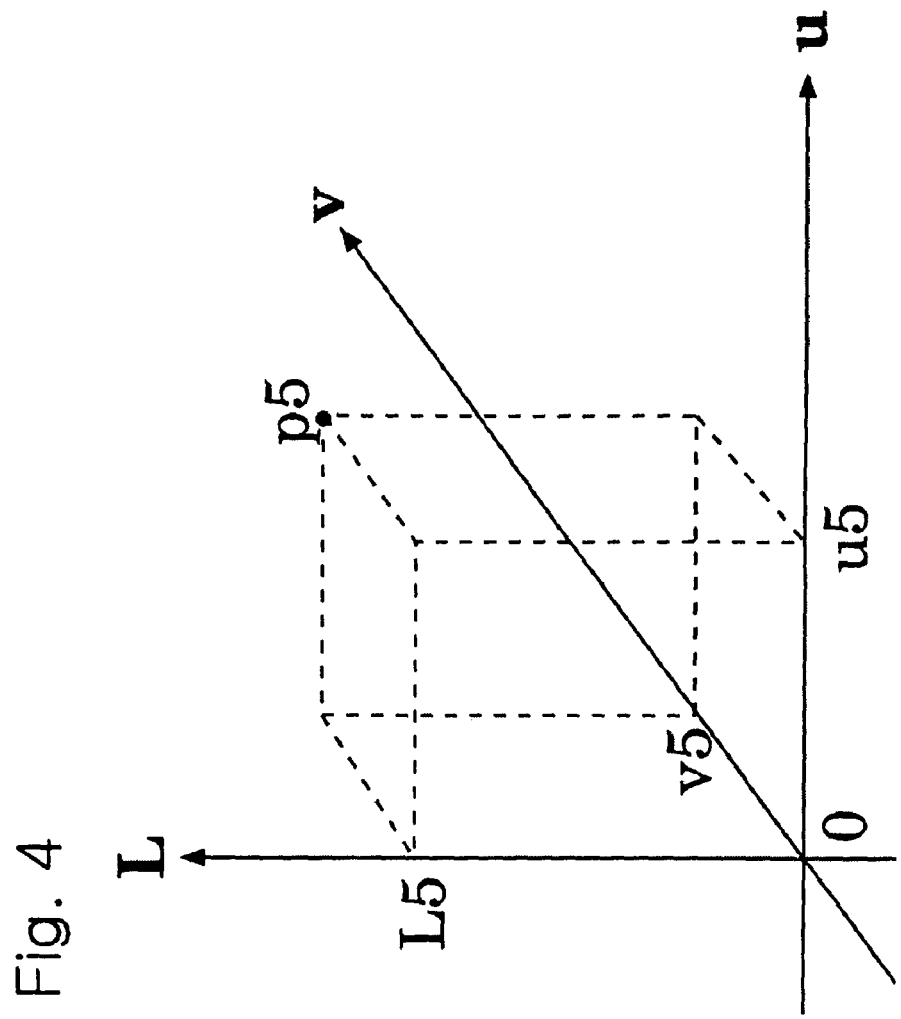
FIG. 4 is a view showing an example of object pixel data.

Here, to make understanding easier, as shown in FIG. 4, object pixel data having a 'u' value greater than 0 is used as a specific example of the object pixel data (Here, the pixel number 5 and Luv data (L, u, v)=(L5, u5, v5), wherein u5 is greater than 0 as mentioned above. In FIG. 4, the position of the object pixel data is indicated by the point: p5.).

(Processing in the Case where 'u' is Positive)

The conversion part 44 having determined that the 'u' value (ui) is greater than 0 prepares the following formula (1) of an ellipse in the two orthogonal axes of 'u' and 'L' by using the numeric value Li of 'L' included in the Luv data (L, u, v)=(Li, ui, vi) of the Luv image data. The ellipse represented by the formula (1) exists on a uL plane (That is, the plane including two axes of the 'u' axis and the 'L' axis among the 'L' axis, the 'u' axis, and the 'v' axis which are three axes intersecting orthogonally with each other as shown in FIG. 4.) and has the center (u, L) of (0, 100). The major axis (the diameter in the 'L' axial direction) is (100−Li), and the minor axis (the diameter in the 'u' axial direction) is (Pumax×(100−Li)/100). As described later, the 'u' value and the 'L' value of the object pixel data are converted such that the 'u' value and the 'L' value of the object pixel data have the coordinates of a point existing on the circumference of the ellipse (on an elliptic circumference) represented by the formula (1).

$$u^2/(\text{Pumax} \times (100-Li)/100)^2 + (L-100)^2/(100-Li)^2 = 1 \quad \text{Formula (1)}$$

In the formula (1), Pumax is a parameter. The user of the present device 11 in advance inputs a value of Pumax into the parameter storage part 46 via the keyboard, the touch panel, or the like (none of them are illustrated) connected to the present device 11, and the parameter storage part 46 stores the value of Pumax. For this reason, when the conversion part 44 prepares the formula (1), the conversion part 44 accesses the parameter storage part 46 to read out and acquire the value of Pumax from the parameter storage part 46.

Then, when the formula (1) is transformed, since "L" is greater than 0 and smaller than 100, a formula (1.1) is obtained. In addition, L(Li) becomes 0 or 100 in the case of u(ui)=v(vi)=0. In this case, since processing in the case where "u" is 0 or processing in the case where 'v' is 0 to be described later is performed, here, 'L' is greater than 0 and smaller than 100.

$$L = 100 - (100 - Li) \times (1 - u^2/(\text{Pumax} \times (100-Li)/100)^2)^{0.5} \quad \text{Formula (1.1)}$$

When the formula (1) of the specific example of the object pixel data (in the case of the pixel number 5 and Luv data (L, u, v)=(L5, u5, v5). Here, u5 is greater than 0. It is the point p5 in FIG. 4.) is prepared, the following formula (1.2) is obtained.

$$u^2/(\text{Pumax} \times (100-L5)/100)^2 + (L-100)^2/(100-L5)^2 = 1 \quad \text{Formula (1.2)}$$

Figure 5:
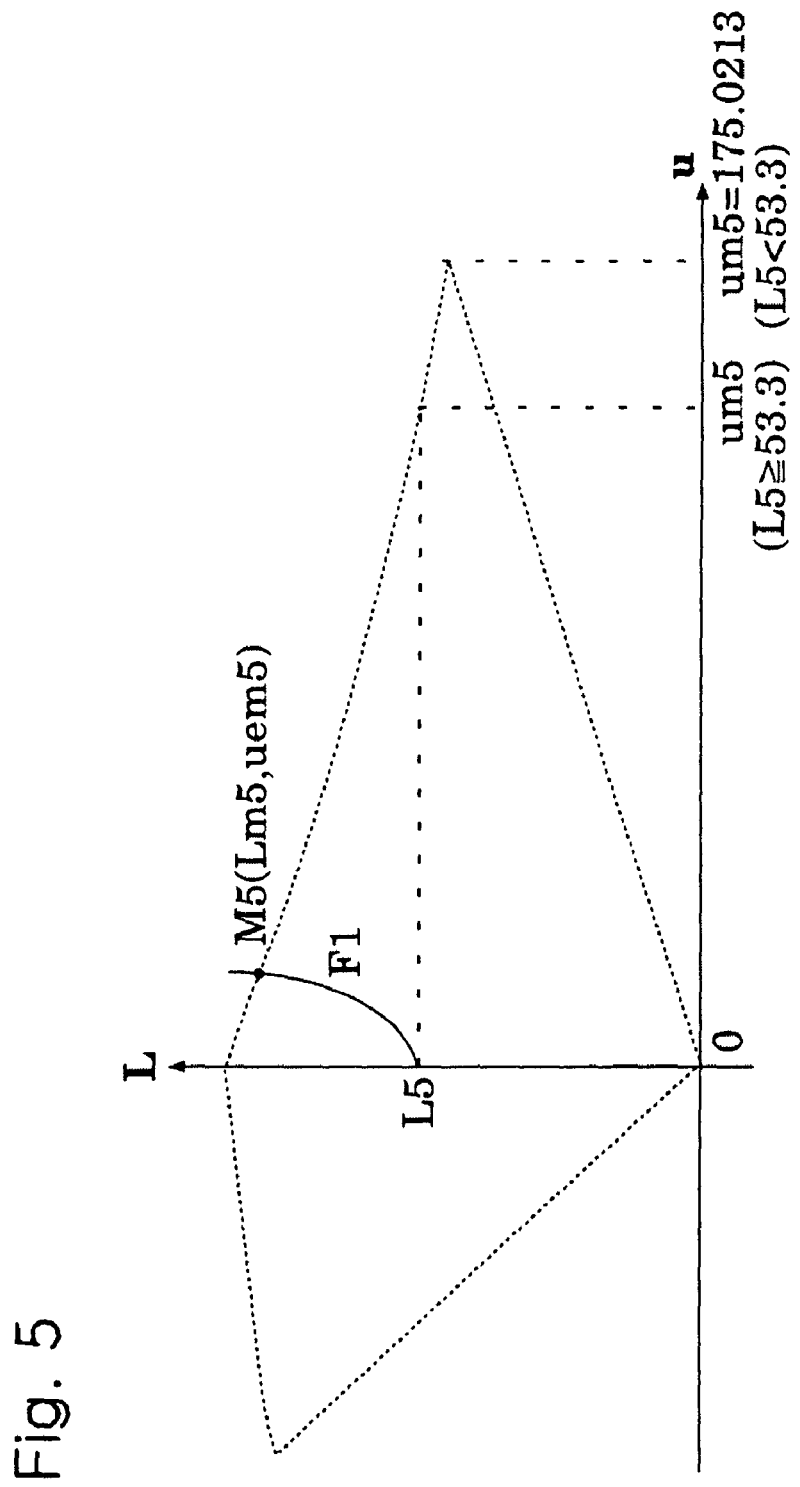
FIG. 5 shows a graph on a uL plane illustrating how an 'L' value and a 'u' value that are contained in the object pixel data are converted.

FIG. 5 shows an ellipse represented by the formula (1.2). The range which a display can display is surrounded with a dotted line as shown in FIG. 5. Here, the area which the display can display is determined by the procedure of calculating a display color gamut, the procedure of calculating color coordinate values on a boundary line, and the procedure of deriving an approximate expression of the boundary line to be described later. As the ellipse represented by the formula (1.2) is shown with a solid line F1 in FIG. 5, since a portion of the ellipse within the area which the display can display (that is, a portion within the area surrounded with the dotted line in FIG. 5) is involved with the processing here, only the portion which exists within the area and where the 'u' is positive is shown here because the case where the 'u' is positive is processed.

Next, the conversion part 44 determines whether or not the 'L' value (Li) of the Luv data included in the object pixel data (the pixel number 'i' and Luv data (L, u, v)=(Li, ui, vi)) is 53.3 or greater, and when the 'L' value (Li) is determined to be 53.3 or greater, the conversion part 44 uses the maximum value of the 'u' value which the display can display in the 'L' value (Li) as a first reference value um. The maximum value (Here, it is set to the first reference value um.) of the 'u' value is defined as a 'u' value obtained by substituting the 'L' value (Li) of the object pixel data for an 'L' value in the following formula (2). The method of deriving the formula (2) is based on the procedure of calculating the display color gamut, the procedure of calculating color coordinate values on a boundary line, and the procedure of deriving an approximate expression of the boundary line which are described later, and the derived formula (2) is previously input into the mathematical formula storage part 47 and stored therein. For this reason, when the conversion part 44 determines that the 'L' value (Li) is 53.3 or greater, the conversion part 44 accesses the mathematical formula storage part 47 to read out and acquire the formula (2) from the mathematical formula storage part 47.

$$u = -0.00038119 \times L^3 + 0.121971 \times L^2 - 15.5168 \times L + 713.514 \quad \text{Formula (2)}$$

On the other hand, when the conversion part 44 determines whether or not the 'L' value (Li) of the Luv data included in the object pixel data (the pixel number 'i' and Luv data (L, u, v)=(Li, ui, vi)) is 53.3 or greater, and when the 'L' value (Li) is determined not to be 53.3 or greater (That is, the 'L' value (Li) is smaller than 53.3.), the first reference value um is set to 175.0213.

If the specific example of the object pixel data (the pixel number 5 and Luv data (L, u, v)=(L5, u5, v5), wherein u5>0) shown in FIG. 4 is considered, when the conversion part 44 determines that the 'L' value (L5) is 53.3 or greater, a first reference value um5 is calculated by using the following formula (2.1). FIG. 5 shows the first reference value um5 thus calculated.

$$um5 = -0.00038119 \times L5^3 + 0.121971 \times L5^2 - 15.5168 \times L5 + 713.514 \quad \text{Formula (2.1)}$$

On the other hand, when the conversion part 44 determines that the 'L' value (L5) is not 53.3 or greater (That is, the 'L' value (L5) is smaller than 53.3.), the first reference value um5 is set to 175.0213. When the 'L' value (L5) is determined not to be 53.3 or greater as mentioned in the above, the value 175.0213 taken as the first reference value um5 is also shown in FIG. 5.

Then, the conversion part 44 determines the ratio Sc (=ui/um) of the 'u' value ui of the Luv data included in the object pixel data (the pixel number 'i' and Luv data (L, u, v)=(Li, ui, vi)) to the first reference value um determined as mentioned above.

For example, when the specific example of the object pixel data as shown in FIG. 4 (the pixel number 5 and Luv data (L, u, v)=(L5, u5, v5), wherein u5>0) is taken as an example, the ratio Sc5=u5/um5 of the 'u' value u5 of the Luv data to the determined first reference value um5 is calculated.

Subsequently, the conversion part 44 defines a point being a point existing within the area which the display can display among the points on the elliptic circumference of an ellipse represented by the formula (1.1) and having the maximum 'L' value as (Lm, uem) and calculates uem. For example, when the specific example of the object pixel data (the pixel number 5 and Luv data (L, u, v)=(L5, u5, v5), wherein u5>0) as shown in FIG. 4 is taken as an example, it is shown as the point M5 (Lm5, uem5) in FIG. 5. As understood from FIG. 5, the point M5 (Lm5, uem5) is a point that exists within the area (area surrounded with the dotted line) the display can display as shown in FIG. 5 and has the maximum 'L' value among the points on the elliptic circumference of the ellipse (solid line F1) represented by the formula (1.1) as shown in FIG. 5. In the following, a method of calculating the uem is described.

(Method of Calculating Uem)

First, a formula (3) is considered.

$$u^2/(\text{Pumax})^2 + (L-100)^2/(100)^2 = 1 \quad \text{Formula (3)}$$

Figure 6:
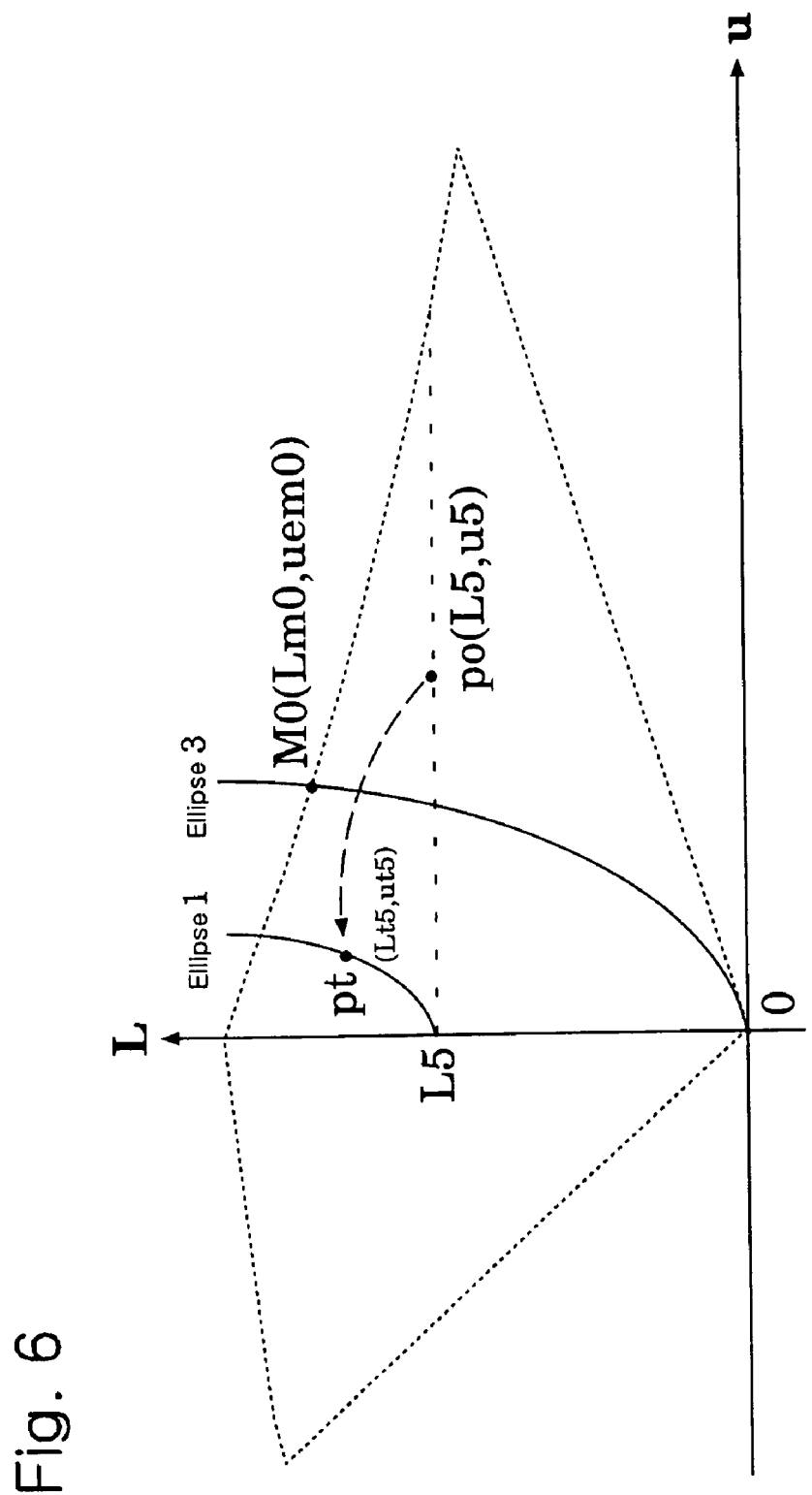
FIG. 6 shows a graph on a uL plane illustrating how an 'L' value and a 'u' value that are contained in the object pixel data are converted.

FIG. 6 shows an ellipse (hereinafter referred to as an "ellipse 3") represented by the formula (3). In FIG. 6, the area which the display can display is surrounded with a dotted line in a similar manner as shown in FIG. 5 and an ellipse (hereinafter referred to as an "ellipse 1") represented by the formula (1) is also shown.

Secondly, when a point existing within the area which the display can display among points on the elliptic circumference of an ellipse represented by the formula (3) and having the maximum 'L' value is defined as (Lm0, uem0), the conversion part 44 calculates the uem0 by using the following formula (4). The maximum point (Lm0, uem0) is shown in FIG. 6 as a point MO (Lm0, uem0). The method of deriving the formula (4) is as described below. The derived formula (4) is in advance input into the mathematical formula storage part 47 and stored therein. For this reason, the conversion part 44 accesses the mathematical formula storage part 47 to read out and acquire the formula (4) from the mathematical formula storage part 47, and then calculates the uem0.

The formula (4) is obtained by calculating the 'u' coordinate uem0 of the intersection point between the formula (3) and the formula (2) (which gives the maximum 'u' value which the display can display) where the 'u' is positive by using GNU Octave (The name of software managed and distributed in a GNU project by Free Software Foundation (corporate name). The same hereinafter.). Specifically, the Pumax of the formula (3) is changed from 10 to 100 at 0.2 intervals to determine each intersection point (L, u) between the formula (3) and the formula (2) by using the GNU Octave. As a result, 451 sets of three values (Pumax, L, u) are obtained. Subsequently, the formula (4) which is the relational expression (approximate expression) of the two values (Pumax, u) among the sets is obtained by using the GNU Octave.

$$uem0 = -0.000675336 \times (\text{Pumax})2 + 1.02361 \times (\text{Pumax}) - 0.252138 \quad \text{Formula (4)}$$

Thirdly, the conversion part 44 substitutes the uem0 calculated in the second processing into the following formula (5) to calculate the uem. The method of deriving the formula (5) is as described below. The derived formula (5) is in advance input into the mathematical formula storage part 47 and stored therein. For this reason, the conversion part 44 accesses the mathematical formula storage part 47 to read out and acquire the formula (5) from the mathematical formula storage part 47, and then calculates the uem.

Here, the formula (5) is an approximate expression for approximating the uem by using the uem0 when the 'L' value (Li) of the Luv data included in the object pixel data (the pixel number 'i' and Luv data (L, u, v)=(Li, ui, vi)) is greater than 0 and smaller than 100 (The value Li in the formula (5) is the 'L' value (Li) of the Luv data included in the object pixel data. Further, since L(Li) becomes 0 or 100 in the case of u(ui)=v (vi)=0 as mentioned above and since the processing in the case where the 'u' is 0 or the processing in the case where 'v' is 0 is performed, the 'L' is greater than 0 and smaller than 100 in this case.). A boundary line (that is, a line approximated by the formula (2)) which the display can display on the uL plane and indicates the maximum 'L' value where the 'u' is positive can be substantially approximated by a straight line which passes (L, u)=(100, 0) (that is, L=a×u+100, wherein the 'a' is a constant). The uem0 is obtained when the 'L' of the formula (3) is eliminated by using the formula of the straight line L=a×u+100, and when the 'L' of the formula (1) is eliminated by using the formula of the straight line, the uem is obtained, and then the formula (5) is obtained by using these values. The formula (5) can perform approximation very successfully with a small error.

$$uem = uem0 \times (100 - Li)/100 \quad \text{Formula (5)}$$

For example, when the specific example of the object pixel data shown in FIG. 4 (the pixel number 5 and Luv data (L, u, v)=(L5, u5, v5), wherein u5>0) is taken as an example, the uem5 which is the uem relating to the specific example is calculated by using the following formula (5.1).

$$uem5 = uem0 \times (100 - L5)/100 \quad \text{Formula (5.1)}$$

Then, the conversion part 44 determines the 'L' value (Lt) of the Luv data after the first conversion (for protan and deutan) of the object pixel data (the pixel number 'i' and Luv data (L, u, v)=(Li, ui, vi)). The method of calculating the 'L' value (Lt) after the conversion is applied so as to increase luminance within the color gamut which the display can display according to reddishness in certain luminance. The 'L' value (Lt) is determined such that the ratio (that is, (Lt−Li)/(Lm−Li)) of the amount of 'L' value increased by the conversion (the difference between the 'L' value Lt after conversion and the 'L' value Li before conversion, that is, (Lt−Li)) to (Lm−Li) becomes equal to the above-mentioned Sc (=ui/um). Here, the value (Lm−Li) shows the difference between the 'L' value Lm after the conversion of a color converted into the highest luminance color by the present conversion processing among all colors having L=Li and the 'L' value Li before conversion.

Specifically, the Lt is represented by the formula (6).

$$(Lt-Li)/(Lm-Li)=Sc(=ui/um) \qquad \text{Formula (6)}$$

By transforming the formula (6), a formula (6.1) is obtained.

$$Lt=Sc \times (Lm-Li)+Li \qquad \text{Formula (6.1)}$$

The value Lm in the formula (6.1) is the 'L' value of a point (Lm, uem) existing within the area which the display can display among the points on the elliptic circumference of the ellipse represented by the formula (1.1) and having the maximum 'L' value as mentioned above. Here, the point (Lm, uem) is the point on the elliptic circumference of the ellipse represented by the formula (1.1) and satisfies the following formula (7).

$$Lm=100-(100-Li) \times (1-uem^2/(Pumax \times (100-Li)/100)^2)^{0.5} \qquad \text{Formula (7)}$$

When the formula (5) is substituted into the formula (7), a formula (8) is obtained.

$$Lm=100-(100-Li) \times (1-uem0^2/Pumax^2)^{0.5} \qquad \text{Formula (8)}$$

When the formula (8) is substituted into the formula (6.1), a formula (9) is obtained.

$$\begin{aligned} Lt &= Sc \times (Lm - Li) + Li \\ &= Li + (100 - Li) \times Sc \times \left(1 - (1 - uem0^2/Pumax^2)^{0.5}\right) \end{aligned} \qquad \text{Formula (9)}$$

The conversion part 44 determines the 'L' value (Lt) of the Luv data after the first conversion (for protan and deutan) of the object pixel data (the pixel number 'i' and Luv data (L, u, v)=(Li, ui, vi)) by using the formula (9). Since the formula (9) is in advance input into the mathematical formula storage part 47 and stored therein, the conversion part 44 accesses the mathematical formula storage part 47 to read out and acquire the formula (9) from the mathematical formula storage part 47, and then calculates Lt (Further, the conversion part 44 accesses the parameter storage part 46 to read out and acquire the value of Pumax from the parameter storage part 46.). Subsequently, the conversion part 44 determines the 'u' value (ut) of the Luv data after the first conversion (for protan and deutan) of the object pixel data. Since the 'L' value (Lt) and the 'u' value (ut) of the Luv data after the conversion are the values of the point on the elliptic circumference of the ellipse represented by the formula (1.1), the 'u' value (ut) is calculated by the following formula (10) (here, the ut is greater than 0) obtained by transforming the formula (1.1) with the 'L' value (Lt) determined as mentioned above. Since the formula (10) is also in advance input into the mathematical formula storage part 47 and stored therein, the conversion part 44 accesses the mathematical formula storage part 47 to read out and acquire the formula (10) from the mathematical formula storage part 47, and then calculates the ut (Further, the conversion part 44 accesses the parameter storage part 46 to read out and acquire the value of Pumax from the parameter storage part 46).

$$ut=Pumax/100 \times ((1-Li)^2-(Lt-100)^2)^{0.5} \qquad \text{Formula (10)}$$

FIG. 6 shows how the 'L' value and the 'u' value (Lt5 and ut5, respectively) included in the specific example (the pixel number 5 and Luv data (L, u, v)=(L5, u5, v5), wherein u5>0) of the object pixel data shown in FIG. 4 are converted. A point po (L, u)=(L5, u5) in FIG. 6 is obtained by projecting the point of the specific example (the pixel number 5 and Luv data (L, u, v)=(L5, u5, v5)) of the object pixel data onto the uL plane (the plane including the 'u' axis and the 'L' axis).

The 'L' value (Lt5) is determined such that the ratio of the amount of the 'L' value increased by the conversion (the difference between the 'L' value Lt5 after conversion and the 'L' value L5 before conversion, i.e., (Lt5−L5)) to (Lm5−L5) on the uL plane as shown in FIG. 6 (that is, (Lt5−L5)/(Lm5−L5)) becomes equal to the above Sc5 (=u5/um5), and the point po (L, u)=(L5, u5) is converted into a point pt (L, u)=(Lt5, ut5) on the elliptic circumference of the ellipse 1 according to the determined 'L' value (Lt5). Thus, the 'L' value and the 'u' value of the Luv data (L5, u5, v5) of the object pixel data are converted into Lt5 and ut5, respectively, such that a redder color is converted into a higher luminance color (That is, the greater the 'u' value is, the more the 'L' value increases.).

Next, the conversion part 44 determines whether the 'v' value vi of the Luv image data (L, u, v)=(Li, ui, vi) of the object pixel data is positive or not exceeding 0 and determines the value of the 'v' value (vt) of the Luv data after conversion by using a formula (11) when the vi is positive (>0). Then, the conversion part 44 determines whether or not the value of the determined 'v' value (vt) is negative (vt<0) and sets 0 to vt (vt=0) when the value (vt) is determined to be negative (Thus, hue inversion is prevented by performing conversion from vi into vt.).

On the other hand, when the 'v' value vi of the Luv image data (L, u, v)=(Li, ui, vi) of the object pixel data is 0 or smaller (=0 or <0), the conversion part 44 determines a value of vt based on a formula (12). Then, the conversion part 44 determines whether or not the value of the determined "v" value (vt) is positive (vt>0), and sets 0 to vt (vt=0) when the 'v' value (vt) is determined to be positive (thereby preventing the hue inversion due to conversion from vi into vt).

$$vt=vi-(Lt-Li) \qquad \text{Formula (11)}$$

$$vt=vi+(Lt-Li) \qquad \text{Formula (12)}$$

Since both the formulae (11) and (12) are in advance input into the mathematical formula storage part 47 and stored therein, the conversion part 44 accesses the mathematical formula storage part 47 to read out and acquire either the formula (11) or (12) from the mathematical formula storage part 47 and then calculates vt.

Then, the conversion part 44 checks whether or not the thus determined value of vt (the value calculated by either the formula (11) or (12), or 0) exists within the area which the display can display, and, when the vt value is determined not to exist within the area, corrects the vt value in the following manner. In the basic point of view of the correction, the minimum value and the maximum value of 'v' at L=Lt are determined based on the Lt value after conversion, and the reference axis range of v2 and v5 in FIG. 10 to be described later, and the approximate expressions v1 to v6 in FIG. 11 to be described later. Since data shown in FIGS. 10 and 11 are in advance input into the mathematical formula storage part 47 and stored therein, the conversion part 44 can access the mathematical formula storage part 47 to freely read out and acquire the data from the mathematical formula storage part 47. When the determined vt value deviates from the range from the minimum value to the maximum value, the conversion part 44 determines that the value does not exist within the area which the display can display, and performs correction by replacing the vt value by the minimum value or the maximum value of 'v' at the Lt value after the conversion (whichever is closer to vt after conversion). Specifically, (1) in the case of vt>0, the maximum value of the 'v' is determined by using one of the formulae in FIG. 11, that is, the formula v1 when Lt is at least 0 and smaller than 87.8 ($0 \leq Lt < 87.8$), the formula v2 when Lt is at least 87.8 and smaller than 97.0 ($87.8 \leq Lt < 97.0$), and the formula v3 when Lt is at least 97.0 and not exceeding 100 ($97.0 \leq Lt \leq 100$). When the vt is greater than the maximum value of the 'v', the maximum value is set to the vt value. (2) In the case where the vt is 0 or smaller ($vt \leq 0$), the minimum value of the 'v' is determined by using one of the formulae in FIG. 11, that is, the formula v4 when the Lt is greater than 60.4 and not exceeding 100 ($60.4 \leq Lt \leq 100$), the formula v5 when the Lt is greater than 32.4 and not exceeding 60.4 ($32.4 < Lt \leq 60.4$), and the formula v6 when the Lt is at least 0 and not exceeding 32.4 ($0 \leq Lt \leq 32.4$). When the vt is smaller than the minimum value of the 'v', the minimum value is set to the vt value.

Thus, the Luv data (Li, ui, vi) included in the object pixel data (the pixel number i, Luv data (L, u, v)=(Li, ui, vi)) is converted into data after conversion (Lt, ut, vt) (hereinafter referred to as "data after conversion").

Then, the conversion part 44 transmits the data after conversion (Lt, ut, vt) to the data storage part 42 to cause the data storage part 42 to store the data after conversion. The order of causing the data storage part 42 to store the data after conversion (Lt, ut, vt) is the same as the order of the pixel data included in the Luv image data stored by the data storage part 42 (That is, the data after conversion (Lt, ut, vt) is stored in the data storage part 42 exactly in the order of the original pixel data included in the Luv image data stored by the data storage part 42. In addition, a storage area where the data after conversion (Lt, ut, vt) is stored by the data storage part 42 differs from the storage area of the original pixel data included in the Luv image data.). Further, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

Figure 7:
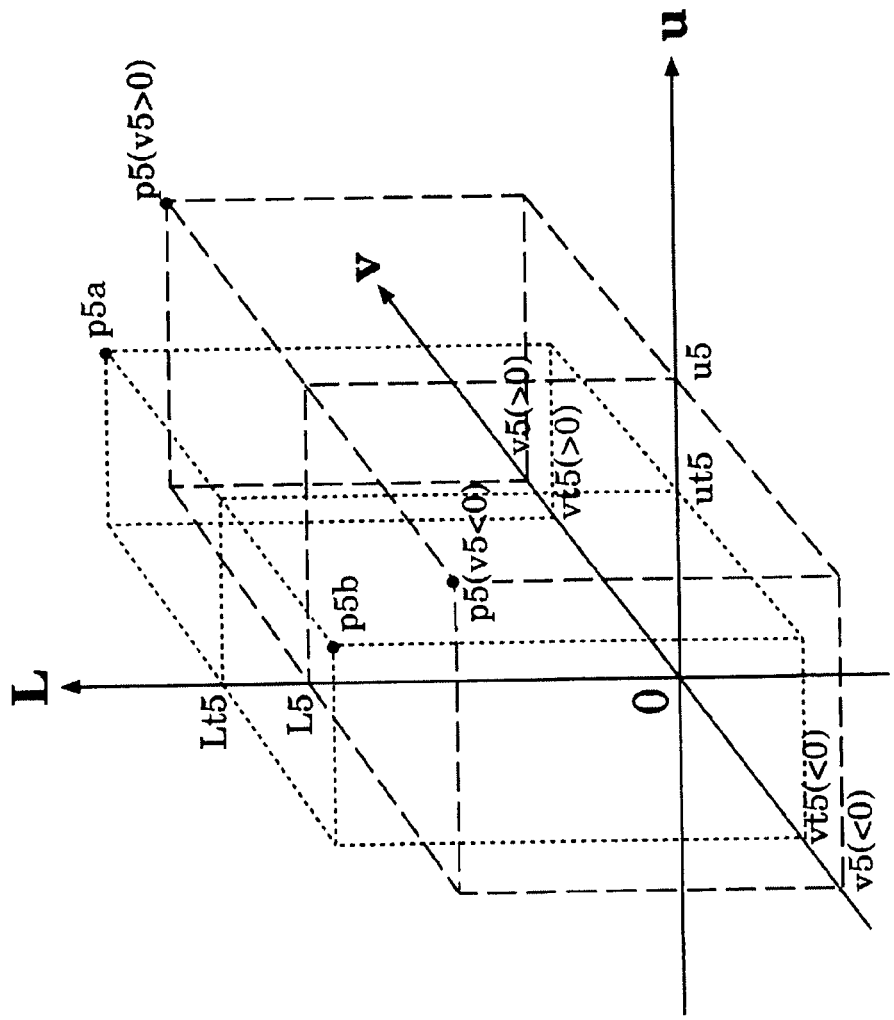
FIG. 7 shows a graph illustrating how the object pixel data are converted.

FIG. 7 shows how the specific example of the object pixel data (the pixel number 5 and Luv data (L, u, v)=(L5, u5, v5), wherein u5>0) shown in FIG. 4 is converted by the conversion described above. Since how the 'u' value and the 'L' value are converted (conversion from the point po (L5, u5) to the point pt (Lt5, ut5)) is already described in detail by using FIG. 6, refer to FIG. 6 and the description thereof regarding the conversion.

In FIG. 7, a position after conversion in the case where v5 is positive (>0) is shown as a point p5a (Lt5, ut5, vt5), and a position after conversion in the case where v5 is zero or smaller (0 or <0) is shown as a point p5b (Lt5, ut5, vt5). In FIG. 7, vt5 of the point p5a equals v5−(Lt5−L5), and vt5 of the point p5b equals v5+(Lt5−L5).

Thus, by calculating the 'v' coordinate after the conversion by using the formula (11) or (12), it is possible to suppress a great change in hue before and after conversion (The conversion does not give to the user an impression of a great change in tone before and after conversion.).

The formula (2) and the like used for the above processing (The data, the mathematical formula, and the like shown in FIGS. 10 and 11 are included as mentioned above.) are derived regardless of the operation of the present device 11, previously input into the mathematical formula storage part 47 and stored therein. Information input into the mathematical formula storage part 47 is derived through the following procedure of calculating a display color gamut, the procedure of calculating color coordinate values on a boundary line, and the procedure of deriving the approximate expression of the boundary line.

(Procedure of Calculating Display Color Gamut)

A value which each of the 'R' value, 'G' value, and 'B' value in the RGB color model can take is an integer of 0 to 255, and, in the case of one piece of pixel data according to the RGB color model, there are 256×256×256=16,777,216 kinds of values. All these values are converted into data in the Luv color space.

Each maximum value and minimum value of 'L' value, 'u' value, and 'v' value of the data in the Luv color space obtained by thus converting all 16,777,216 values are extracted. Thus, a minimum value 0 and a maximum value 100 are determined for the 'L' value, a minimum value −83.0667 and a maximum value 175.0213 are determined for the 'u' value, and a minimum value −134.0896 and a maximum value 107.4177 are determined for the 'v'value.

(Procedure of Calculating Color Coordinate Values on Boundary Line)

Figure 8:
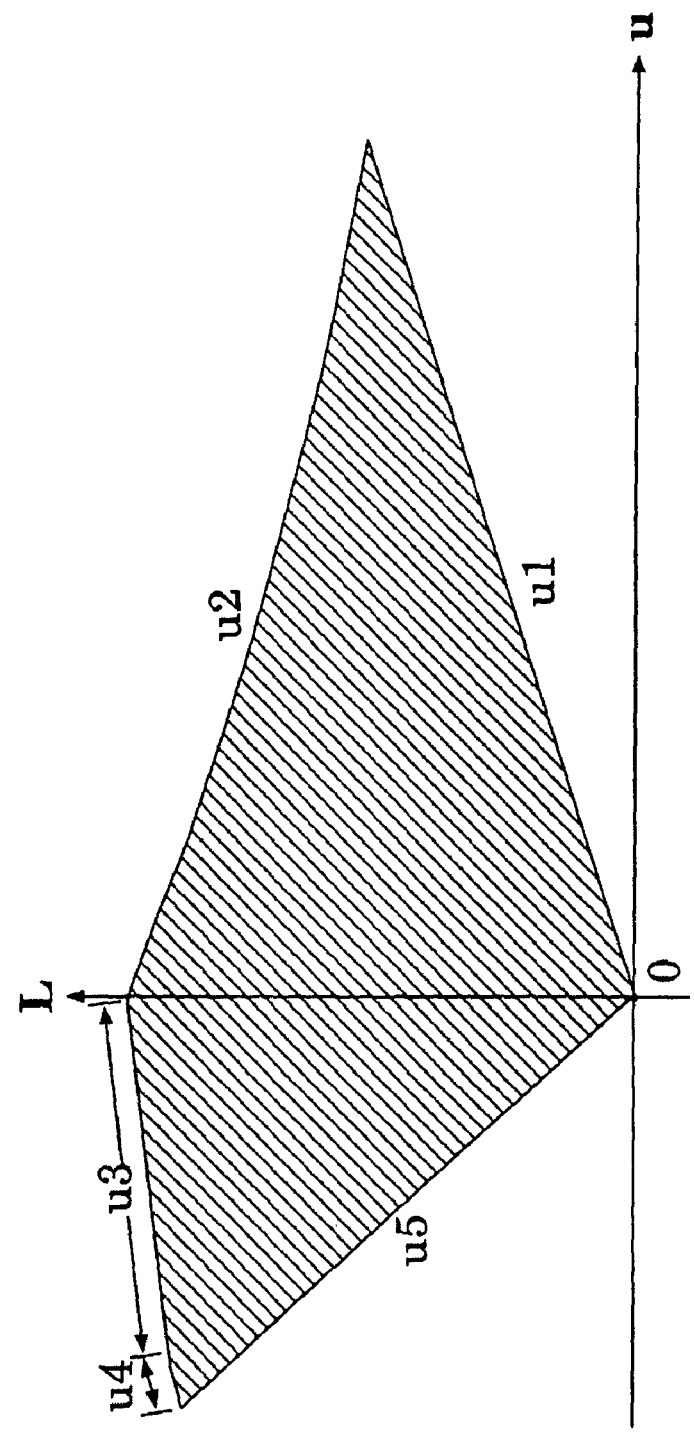
FIG. 8 shows a graph indicating a range where projected points exist when each of 16777216 kinds of points shown by an RGB color model is projected orthogonally on the Lu plane.
Figure 9:
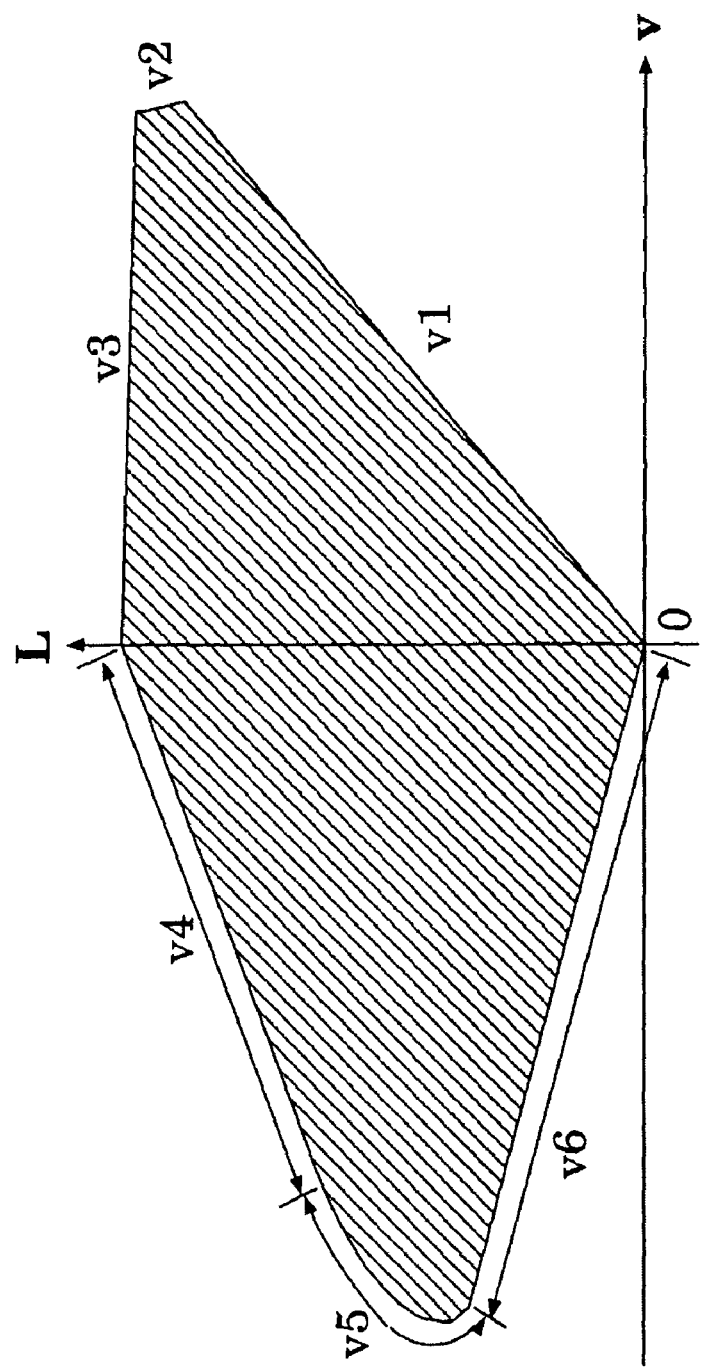
FIG. 9 shows a graph indicating a range where projected points exist when each of 16777216 kinds of points shown by an RGB color model is projected orthogonally on the Lv plane.

Next, the area of the Luv color space which can be shown by the RGB color model used as a display signal in a display of a general computer or the like is determined. As described in the procedure of calculating the display color gamut, each case of the 16,777,216 values represented by the RGB color model is plotted on the Luv color space (orthogonal 3-axis space of 'L' axis, 'u' axis, and 'v' axis). Next, each of the 16,777,216 plotted points is projected on an Lu plane (That is, a plane including the 'u' axis and the 'L' axis among the 'L' axis, the 'u' axis, and the 'v' axis which are three axes intersecting orthogonally to each other.) and an Lv plane (That is, a plane including the 'v' axis and the 'L' axis among the 'L' axis, the 'u' axis, and the 'v' axis which are three axes intersecting orthogonally to each other.). FIG. 8 shows projection to the Lu plane, and FIG. 9 shows projection to the Lv plane. In FIGS. 8 and 9, shaded areas are areas where each of the 16,777,216 points is projected (In the following, an area projected on the Lu plane is referred to as an "Lu projection area", and an area projected on the Lv plane is referred to as an "Lv projection area".).

Regarding each of the Lu projection area and the Lv projection area, an approximate expression representing the boundary line of the area is determined. As shown in FIGS. 8 and 9, a plurality of lines (lines u1, u2, u3, u4, u5, v1, v2, v3, v4, v5, v6) form the boundary line.

The method for determining the approximate expression is described taking the case of the line u1 shown in FIG. 8 as an example.

First, among two axes (the 'u' axis and the 'L' axis for the line u1) indicated by a line to be determined (Hereinafter referred to as "object line", which is the line u1 here.), one axis (the 'u' axis for the line u1) is used as a reference axis (the 'u' axis for the line u1) and the other axis is used as a variation axis (the 'L' axis for the line u1) wherein a change on the other axis relative to the one axis is smaller than that on the one axis relative to the other axis. An axis perpendicular to the two axes is used as an arbitrary axis (the 'v' axis for the line u1).

Secondly, it is determined (meaning of the boundary line) whether a value of the variation axis (the 'L' axis for the line u1) on the object line (here, the line u1) indicates the maximum value or the minimum value of an object area (here, the Lu projection area). When the line u1 is taken as an example, a value of the variation axis (the 'L' axis) on the line u1 indicates the minimum value of the Lu projection area (the line u1 is the bottom end of the Lu projection area.).

Thirdly, a value for the reference axis (the 'u' axis for the line u1) is increased in steps of 0.1 from the minimum value to the maximum value (In the case where the reference axis is the 'L' axis, from the minimum value of 0 to the maximum value of 100; in the case of the 'u' axis, from the minimum value of −83.0667 to the maximum value of 175.0213; and in the case of the 'v' axis, from the minimum value of −134.0896 to the maximum value of 107.4177.) of the object area (here, the Lu projection area) (Hereinafter the value is referred to as "reference axis assumed value".), and the following (A) is checked in each case.

(A) When it is determined to be the minimum value in the determination of the second stage, the value for the variation axis (the 'L' axis for the line u1) is increased in steps of 0.1 from the minimum value determined in the "procedure of calculating the display color gamut" (In the case where the variation axis is the 'L' axis, the minimum value is 0; in the case of the 'u' axis, the minimum value is −83.0667; and in the case of the 'v' axis, the minimum value is −134.0896.), and a first value included in the object area (here, the Lu projection area) is determined in accordance with the following (B). In contrast, when it is determined to be the maximum value in the determination of the second stage, the value for the variation axis (the 'L' axis for the line u1) is decreased in steps of 0.1 from the maximum value determined in the "procedure of calculating the display color gamut" (In the case where the variation axis is the 'L' axis, the maximum value is 100; in the case of the 'u' axis, the maximum value is 175.0213; and in the case of the 'v' axis, the maximum value is 107.4177.), and a first value included in the object area (here, the Lu projection area) is determined in accordance with the following (B). The thus determined value (value of the variation axis) first included in the object area (here, the Lu projection area) and the value of the reference axis (the reference axis assumed value that was used when calculating the first included value (value of the variation axis)) corresponding to the first included value (value of the variation axis) are used as coordinates on the boundary line.

(B) In the above reference axis assumed value and the value of the variation axis (the 'L' axis for the line u1), the value for the arbitrary axis (the 'v' axis for the line u1) is increased in steps of 0.1 from the minimum value to the maximum value determined in the "procedure of calculating the display color gamut" (In the case where the reference axis is the 'L' axis, from the minimum value of 0 to the maximum value of 100; in the case of the 'u' axis, from the minimum value of −83.0667 to maximum value of 175.0213; and in the case of the 'v' axis from the minimum value of −134.0896 to the maximum value of 107.4177.), and each value (L, u, v) is converted into the values of the RGB color model. When at least one value of the arbitrary axis (the 'v' axis for the line u1) exists such that all of the 'R' value, the 'G' value, and the 'B' value, which are converted according to the RGB color model, are between 0 and 255, a combination of the reference axis assumed value and the value of the variation axis (the 'L' axis for the line u1) is determined to be that of the values first included in the object area (here, the Lu projection area).

The reference axis, the variation axis, the reference axis range, and the meaning of the boundary line regarding each of the lines u1 to u5 and v1 to v6 shown in FIGS. 8 and 9 are collectively shown in FIG. 10.

(Procedure of Deriving Approximate Expression of Boundary Line)

The coordinates on the boundary line determined in accordance with the above "procedure of calculating the color coordinate values on the boundary line" are used to determine approximate expressions representing a plurality of lines (specifically, the lines u1 to u5 and v1 to v6) which form the boundary lines of the Lu projection area and the Lv projection area.

Although the approximate expressions representing the plurality of lines (the lines u1 to u5 and v1 to v6) may be derived by various methods, the above-mentioned GNU Octave is used here.

The thus determined approximate expressions representing the plurality of lines (the lines u1 to u5 and v1 to v6) are collectively shown in FIG. 11.

Specifically, a formula for u2 of FIG. 11 is used for the formula (2).

Thus, data, mathematical formulae, and the like which are shown in FIGS. 10 and 11 are in advance derived regardless of the operation of the present device 11, previously input into the mathematical formula storage part 47 and stored therein.

(Processing in the Case where 'u' is Negative)

The conversion part 44 which does not determine that the 'u' value (ui) is greater than 0 further determines whether or not the 'u' value (ui) is smaller than 0. And when the 'u' value (ui) is determined to be smaller than 0, the conversion part 44 performs "processing in a case where 'u' is negative" to be described below.

Figure 12:
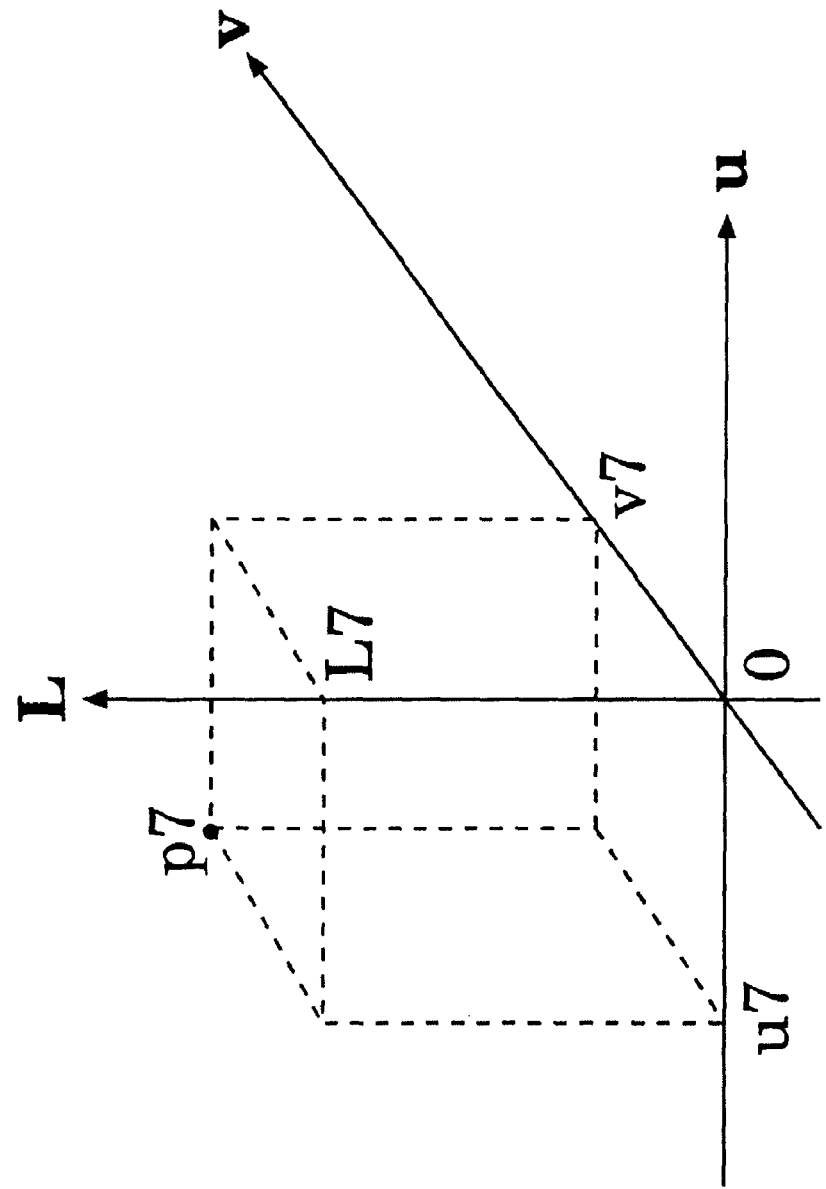
FIG. 12 is a view showing an example of object pixel data.

The conversion part 44 which determines that the 'u' value (ui) is smaller than 0 prepares the following formula (13) of an ellipse in the two orthogonal axes of 'u' and 'L' by using the numeric value Li of 'L' included in the Luv data (L, u, v)=(Li, ui, vi) of the Luv image data. The ellipse represented by the formula (13) exists on the uL plane (the plane including two axes of 'u' axis and 'L' axis among the 'L' axis, the 'u' axis, and the 'v' axis which are three axes intersecting orthogonally to each other as shown in FIG. 12), and the center (u, L) is (0, 0), a major axis (axis in the 'L' axial direction) is Li, and a minor axis (axis in the 'u' axial direction) is (Pumin×Li/100). As described later, the 'u' value and the 'L' value of the object pixel data are converted such that the 'u' value and the 'L' value of the object pixel data become the coordinates of points which exist on the circumference of the ellipse (on the elliptic circumference) represented by the formula (13).

$$u^2/(Pumin \times Li/100)^2 + L^2/Li^2 = 1 \qquad \text{Formula (13)}$$

Pumin in the formula (13) is a parameter. The user of the present device 11 previously inputs a value of Pumin into the parameter storage part 46 similar to the Pumax via the keyboard, the touch panel, or the like (neither is shown) connected to the present device 11, and the parameter storage part 46 stores the value of Pumin. For this reason, when the conversion part 44 prepares the formula (13), the conversion part 44 accesses the parameter storage part 46 to read out and acquire the value of Pumin from the parameter storage part 46.

Then, when the formula (13) is transformed, since 'L' is a value greater than 0 and smaller than 100, a formula (13.1) is obtained. Since L(Li) becomes 0 or 100 in the case of u(ui)= v(vi)=0, and processing in the case where 'u' is 0 or processing in the case where 'v' is 0 is performed in this case, 'L' is greater than 0 and smaller than 100 here.

$$L = Li \times (1 - u^2/(Pumin \times Li/100)^2)^{0.5} \qquad \text{Formula (13.1)}$$

To make an understanding easier here, as shown in FIG. 12, object pixel data having a 'u' value smaller than 0 (the pixel number 7 and Luv data (L, u, v)=(L7, u7, v7), wherein u7 is smaller than 0 as described above. Further, in FIG. 12, a point p7 indicates the position of the object pixel data.) is used as a specific example of object pixel data.

When the formula (13) is prepared for the specific example of object pixel data (the pixel number 7, Luv data (L, u, v)=(L7, u7, v7), wherein u7 is smaller than 0 as described above.) shown in FIG. 12, the following formula (13.2) is derived.

$$u^2/(\text{Pumin} \times L7/100)^2 + L^2/L7^2 = 1 \qquad \text{Formula (13.2)}$$

Figure 13:
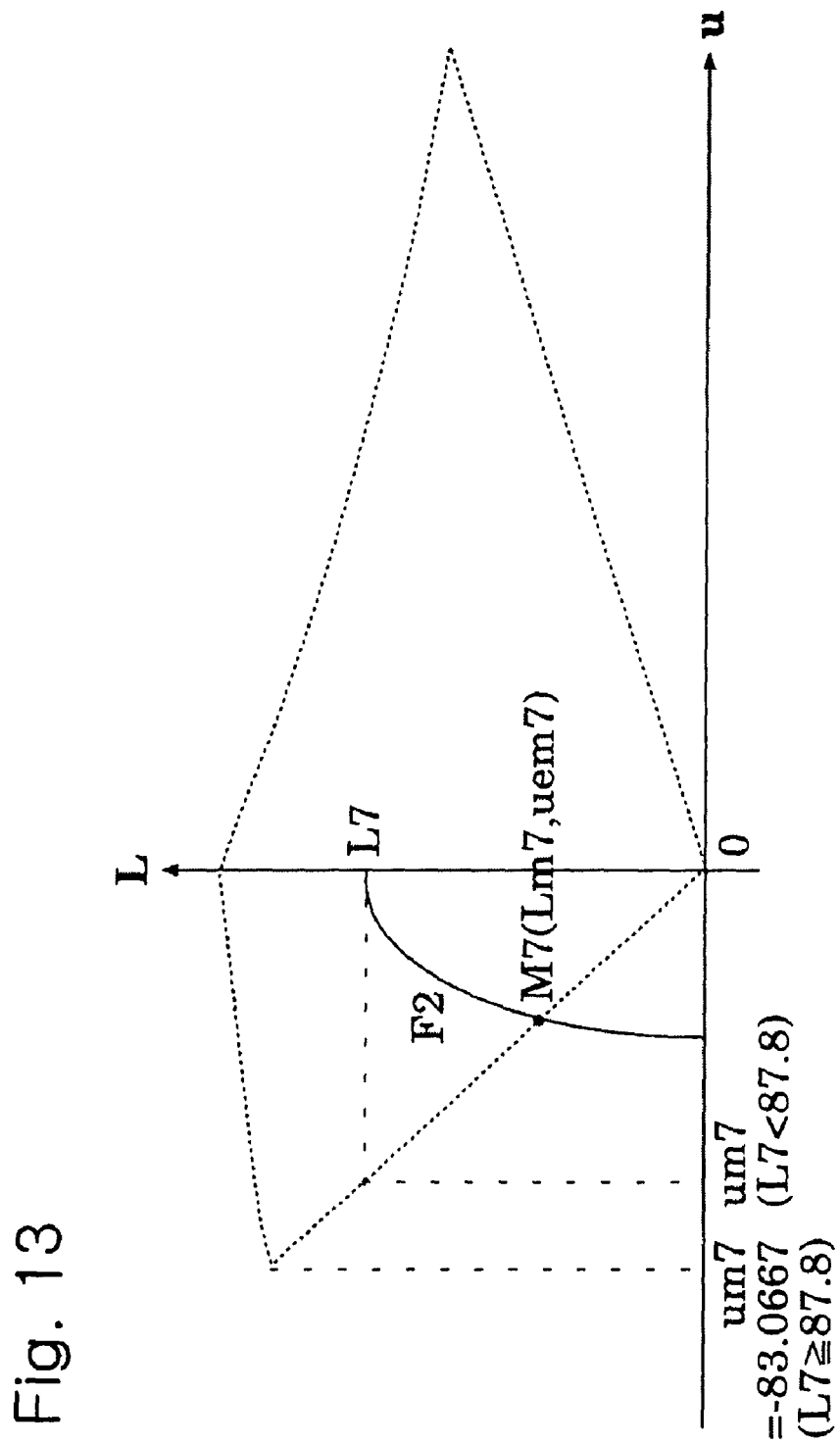
FIG. 13 shows a graph of a uL plane illustrating how 'L' value and 'u' value included in the object pixel data are converted.

FIG. 13 shows an ellipse represented by the formula (13.2). An area which the display can display is surrounded with a dotted line and shown in FIG. 13. The area which the display can display is determined by the procedure of calculating the display color gamut, the procedure of calculating color coordinate values on the boundary line, and the procedure of deriving the approximate expression of the boundary line which are mentioned above. The ellipse represented by the formula (13.2) is shown with a solid line F2 in FIG. 13. Since a portion of the ellipse within the area which the display can display (that is, a portion within the area surrounded with the dotted line in FIG. 13) is involved with the processing here, only the portion which exists within the area and in which the 'u' is negative is shown because the case where 'u' is negative is processed here.

Next, the conversion part 44 determines whether or not the 'L' value (Li) of the Luv data included in the object pixel data (the pixel number 'i', Luv data (L, u, v)=(Li, ui, vi)) is smaller than 87.8, and when the 'L' value (Li) is determined to be smaller than 87.8, uses the minimum 'u' value which the display can display in the 'L' value (Li) as a first reference value um. The minimum 'u' value (here, the first reference value um) is obtained by substituting the 'L' value (Li) of the object pixel data for an 'L' value in the following formula (14). The method of deriving the formula (14) is based on the procedure of calculating the display color gamut, the procedure of calculating color coordinate values on the boundary line, and the procedure of deriving the approximate expression of the boundary line which are already described, and the derived formula (14) is in advance input into the mathematical formula storage part 47 and stored therein (Specifically, the formula (14) is the formula of the line u5 in FIG. 11.). For this reason, when the conversion part 44 determines that the 'L' value (Li) is smaller than 87.8, the conversion part 44 accesses the mathematical formula storage part 47 to read out and acquire the formula (14) from the mathematical formula storage part 47.

$$u = -0.945026 \times L - 0.0931042 \qquad \text{Formula (14)}$$

On the other hand, the conversion part 44 determines whether or not the 'L' value (Li) of the Luv data included in the object pixel data (the pixel number 'i', Luv data (L, u, v)=(Li, ui, vi)) is smaller than 87.8, and when the 'L' value (Li) is not determined to be smaller than 87.8 (That is, the 'L' value (Li) is 87.8 or greater.), the first reference value um is set to −83.0667 (the minimum 'u' value which the display can display).

If the specific example of the object pixel data (the pixel number 7, Luv data (L, u, v)=(L7, u7, v7), wherein u7<0) shown in FIG. 12 is considered, when the conversion part 44 determines that the 'L' value (L7) is smaller than 87.8, the first reference value um7 is calculated by using the following formula (14.1). FIG. 13 shows the thus calculated first reference value um7.

$$um7 = -0.945026 \times L7 - 0.0931042 \qquad \text{Formula (14.1)}$$

On the other hand, when the conversion part 44 determines that 'L' value (L7) is 87.8 or greater (when the conversion part 44 does not determine that 'L' value (L7) is smaller than 87.8), the first reference value um7 is set to −83.0667. FIG. 13 shows −83.0667 set to the first reference value um7 when the 'L' value (L7) is thus determined to be 87.8 or greater (when the conversion part 44 does not determine that 'L' value (L7) is smaller than 87.8).

Then, the conversion part 44 determines the ratio Sc (=ui/um) of the 'u' value ui of the Luv data included in the object pixel data (the pixel number 'i', Luv data (L, u, v)=(Li, ui, vi)) to the first reference value um determined as described above.

For example, when the specific example of the object pixel data (the pixel number 7, Luv data (L, u, v)=(L7, u7, v7), wherein u7<0) shown in FIG. 12 is taken as an example, the ratio Sc7=u7/um7 of the 'u' value u7 of the Luv data to the determined first reference value um7 is determined.

Subsequently, the conversion part 44 uses, as (Lm, uem), a point existing within the area which the display can display among points on the elliptic circumference of an ellipse represented by the formula (13.1), and having the minimum 'L' value, and determines this uem. For example, when the specific example of the object pixel data (the pixel number 7, Luv data (L, u, v)=(L7, u7, v7), wherein u7<0) shown in FIG. 12 is taken as an example, the point is shown in FIG. 13 as a point M7 (Lm7, uem7). As understood from FIG. 13, the point M7 (Lm7, uem7) is the point existing within the area (area surrounded with a dotted line) the display can display as shown in FIG. 13 and has the minimum 'L' value among the points on the elliptic circumference of the ellipse (solid line F2) represented by the formula (13.1) as shown in FIG. 13. In the following, the method of calculating uem is described.

(Method of Calculating Uem)

First, a formula (15) is considered.

$$u^2/(\text{Pumin})^2 + L^2/(100)^2 = 1 \qquad \text{Formula (15)}$$

Figure 14:
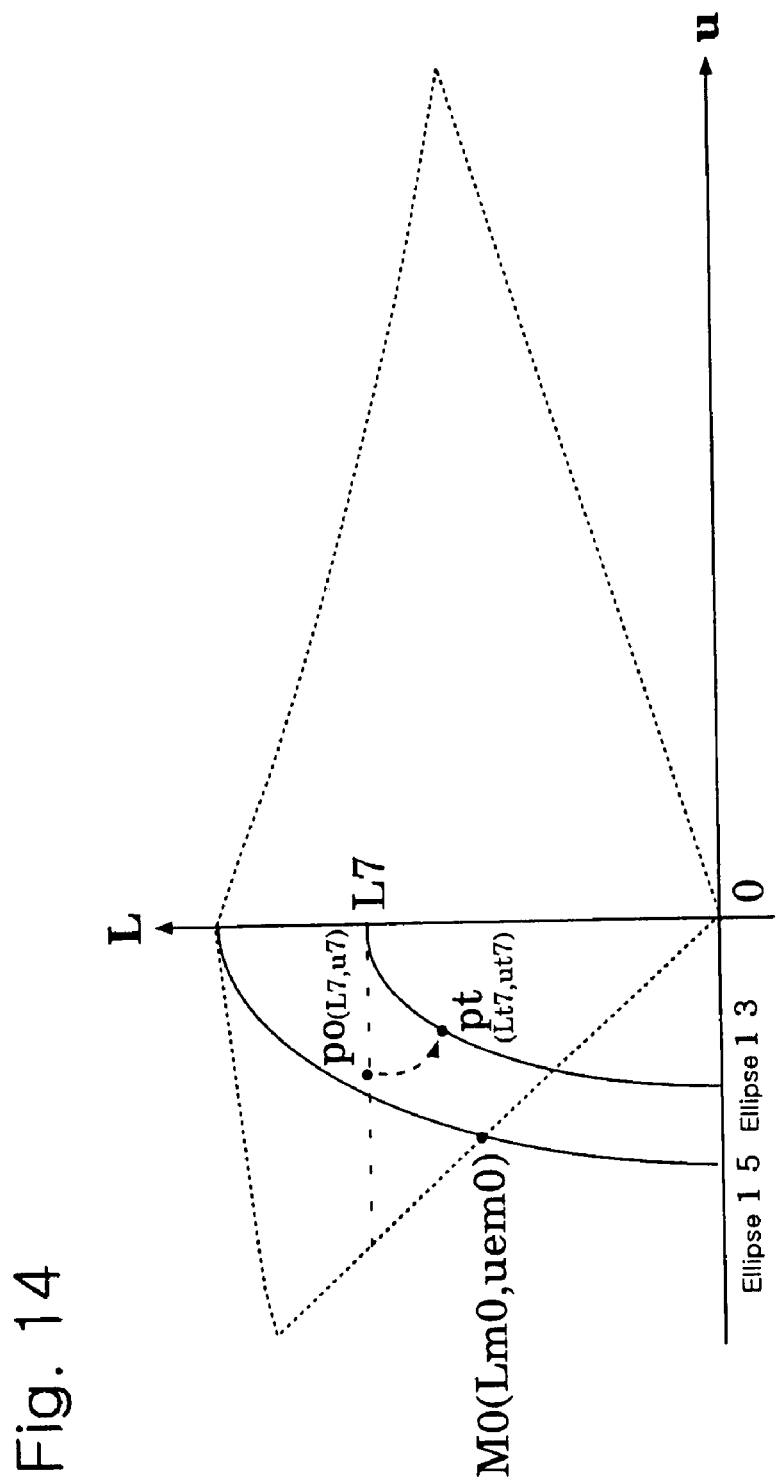
FIG. 14 shows a graph of the uL plane illustrating how 'L' value and 'u' value included in the object pixel data are converted.

FIG. 14 shows an ellipse (hereinafter referred to as an "ellipse 15") represented by the formula (15). Further, the area which the display can display is surrounded with a dotted line and shown in FIG. 14 similar to FIG. 13, and an ellipse represented by the formula (13) (hereinafter referred to as an "ellipse 13") is similarly shown.

Secondly, a point existing within the area which the display can display and having the minimum 'L' value among points on the elliptic circumference of the ellipse represented by the formula (15) is used as (Lm0, uem0), and this uem0 is determined by the following formula (16). The minimum point (Lm0, uem0) is shown as a point MO (Lm0, uem0) in FIG. 14. The method of deriving the formula (16) is as described below. The derived formula (16) is in advance input into the mathematical formula storage part 47 and stored therein. For this reason, the conversion part 44 accesses the mathematical formula storage part 47 to read out and acquire the formula (16) from the mathematical formula storage part 47, and then calculates uem0.

As GNU Octave is utilized, the formula (16) is obtained by determining the 'u' coordinate uem0 of the intersection point, where 'u' is negative, between the formula (15) and the formula (14) (This provides the minimum 'u' value which the display can display where 'u' is negative.). Specifically, as the GNU Octave is utilized, the Pumin of the formula (15) is changed at 0.2 intervals from −80 to −10, and the intersection point (L, u) between the formula (15) and the formula (14) is determined for each case. As a result, 351 sets of three values (Pumin, L, u) are obtained. Subsequently, the formula (16) which is the relational expression (approximate expression) of the two values (Pumin, u) among the three values is obtained by utilizing the GNU Octave.

$$uem0 = 0.00422958 \times (\text{Pumin})^2 + 1.11416 \times (\text{Pumin}) + 0.962955 \qquad \text{Formula (16)}$$

Thirdly, the conversion part 44 substitutes uem0 determined in the second processing into the following formula

(17) to determine uem. The method of deriving the formula (17) is as described below. The derived formula (17) is previously input into the mathematical formula storage part 47 and stored therein. For this reason, the conversion part 44 accesses the mathematical formula storage part 47 to read out and acquire the formula (17) from the mathematical formula storage part 47, and then calculates uem.

Here, the formula (17) is an approximate expression for approximating uem by using uem0 when the 'L' value (Li) of the Luv data included in the object pixel data (the pixel number i, Luv data (L, u, v)=(Li, ui, vi)) is greater than 0 and smaller than 100 (The value Li in the formula (17) is the 'L' value (Li) of the Luv data included in the object pixel data. Further, since L(Li) becomes 0 or 100 in the case of u(ui)=v (vi)=0 as mentioned above and since the processing in the case where 'u' is 0, or the processing in the case where 'v' is 0 is performed, the 'L' is greater than 0 and smaller than 100 here.) A boundary line (that is, a line approximated by the formula (14)) which the display can display on the uL plane and indicates the minimum 'L' value where 'u' is negative can be substantially approximated by a straight line which passes (L, u)=(0, 0) (that is, L=a×u, wherein 'a' is constant). When 'L' of the formula (15) is eliminated by using the formula of the straight line: L=a×u, uem0 is obtained, and when the 'L' of the formula (13) is eliminated by using the formula of the straight line, uem is obtained, and then the formula (17) is obtained from these values. In addition, the formula (17) can perform approximation very successfully with a small error.

$$uem = uem0 \times Li/100 \qquad \text{Formula (17)}$$

When the specific example of the object pixel data shown in FIG. 12 (the pixel number 7, Luv data (L, u, v)=(L7, u7, v7), wherein u7<0) is taken as an example, uem7 which is uem relating to the specific example is calculated by using the following formula (17.1).

$$uem7 = uem0 \times L7/100 \qquad \text{Formula (17.1)}$$

Then, the conversion part 44 determines the 'L' value (Lt) of the Luv data after the first conversion (for protan and deutan) of the object pixel data (the pixel number 'i', Luv data (L, u, v)=(Li, ui, vi)). The method of calculating the 'L' value (Lt) after the conversion is applied so as to decrease luminance in the color gamut which the display can display according to greenishness in certain luminance. The 'L' value (Lt) is determined such that the ratio of the amount of 'L' value decreased by the conversion (the difference between the 'L' value Lt after conversion and the 'L' value Li before conversion, that is, (Lt–Li)) to (Lm–Li) (that is, (Lt–Li)/(Lm–Li)) becomes identical with Sc (=ui/um) described above. The value (Lm–Li) is the difference between the 'L' value Lm after the conversion of a color converted into the lowest luminance color by the present conversion processing among all the colors having L=Li, and the 'L' value Li before the conversion.

Specifically, Lt is represented by a formula (18).

$$(Lt-Li)/(Lm-Li) = Sc(=ui/um) \qquad \text{Formula (18)}$$

When the formula (18) is transformed, a formula (18.1) is obtained.

$$Lt = Sc \times (Lm-Li) + Li \qquad \text{Formula (18.1)}$$

The value Lm in the formula (18.1) is the 'L' value of a point (Lm, uem) existing within the area which the display can display among the points on the elliptic circumference of the ellipse represented by the formula (13.1), and having the minimum 'L' value as mentioned above. Here, the point (Lm, uem) is the point on the elliptic circumference of the ellipse represented by the formula (13.1), the point (Lm, uem) satisfies the following formula (19).

$$Lm = Li \times (1 - uem^2/(Pumin \times Li/100)^2)^{0.5} \qquad \text{Formula (19)}$$

Then, the formula (17) is substituted for the uem of the formula (19), and the resultant formula is further substituted in the formula (18.1) to obtain a formula (20).

$$\begin{aligned}Lt &= Sc \times (Lm - Li) + Li \\ &= Li \times \left(1 - Sc \times \left(1 - (1 - uem0^2/(Pumin)^2)^{0.5}\right)\right)\end{aligned} \qquad \text{Formula (20)}$$

The conversion part 44 determines the 'L' value (Lt) of the Luv data after the first conversion (for protan and deutan) of the object pixel data (the pixel number 'i', Luv data (L, u, v)=(Li, ui, vi)) by using the formula (20). Since the formula (20) is previously input into the mathematical formula storage part 47 and stored therein, the conversion part 44 accesses the mathematical formula storage part 47 to read out and acquire the formula (20) from the mathematical formula storage part 47, and then calculates Lt (Further, the conversion part 44 accesses the parameter storage part 46 to read out and acquire the value of Pumin from the parameter storage part 46.).

Subsequently, the conversion part 44 determines the 'u' value (ut) of the Luv data after the first conversion (for protan and deutan) of the object pixel data. Since the 'L' value (Lt) and the 'u' value (ut) of the Luv data after conversion are the values of the point on the elliptic circumference of the ellipse represented by the formula (13.1), the 'u' value (ut) is calculated by using the 'L' value (Lt) determined as mentioned above and the following formula (21) (ut is smaller than 0) obtained by transforming the formula (13.1). Since the formula (21) is previously input into the mathematical formula storage part 47 and stored therein, the conversion part 44 accesses the mathematical formula storage part 47 to read out and acquire the formula (21) from the mathematical formula storage part 47, and then calculates ut (Further, the conversion part 44 accesses the parameter storage part 46 to read out and acquire the value of Pumin from the parameter storage part 46.).

$$ut = Pumin/100 \times (Li^2 - Lt^2)^{0.5} \qquad \text{Formula (21)}$$

FIG. 14 shows how the 'L' value and the 'u' value which are included in the specific example of the object pixel data (the pixel number 7, Luv data (L, u, v)=(L7, u7, v7), wherein u7<0) shown in FIG. 12 are converted (Lt7 and ut7, respectively). A point po (L, u)=(L7, u7) in FIG. 14 is a point obtained by projecting the point of the specific example (the pixel number 7, Luv data (L, u, v)=(L7, u7, v7), wherein u7<0) of the object pixel data onto the uL plane (the plane including the 'u' axis and the 'L' axis).

As shown in FIG. 14, the 'L' value (Lt7) is determined such that the ratio of the amount of 'L' value decreased by the conversion (the difference between the 'L' value Lt7 after conversion and the 'L' value L7 before conversion, that is, (Lt7–L7)) to (Lm7–L7) (that is, (Lt7–L7)/(Lm7–L7)) becomes identical with the above Sc7 (=u7/um7) on the uL plane, and the point po (L, U)=(L7, u7) is converted into a point pt (L, u)=(Lt7, ut7) on the elliptic circumference of the ellipse 13 according to the determined 'L' value (Lt7). Thus, the 'L' value and the 'u' value of the Luv data (L7, u7, v7) of the object pixel data are converted into Lt7 and ut7, respectively, and thereby a greener color is converted into lower luminance color (That is, the smaller the 'u' value is, the more the 'L' value decreases.).

Next, the conversion part 44 determines whether the 'v' value vi of the Luv image data (L, u, v)=(Li, ui, vi) of the object pixel data is positive or 0 or smaller, and when the vi is positive (>0), determines the value of the 'v' value (vt) of the Luv data after conversion by using a formula (22). Then, the conversion part 44 determines whether or not the value of the determined 'v' value (vt) is negative (vt<0), and sets 0 to vt (vt=0) when the value (vt) is determined to be negative (thereby preventing hue inversion due to the conversion from vi into vt).

On the other hand, when the 'v' value vi of the Luv image data (L, u, v)=(Li, ui, vi) of the object pixel data is 0 or smaller (0 or <0), the conversion part 44 determines the value of vt by using a formula (23). Then, the conversion part 44 determines whether or not the value of the determined 'v' value (vt) is positive (vt>0), and sets 0 to vt (vt=0) when the 'v' value (vt) is determined to be positive (thereby preventing hue inversion due to conversion from vi into vt.).

$$vt=vi-(Li-Lt) \qquad \text{Formula (22)}$$

$$vt=vi+(Li-Lt) \qquad \text{Formula (23)}$$

Since both the formulae (22) and (23) are previously input into the mathematical formula storage part 47 and stored therein, the conversion part 44 accesses the mathematical formula storage part 47 to read out and acquire either the formula (22) or (23) from the mathematical formula storage part 47, and then calculates vt.

Subsequently, the conversion part 44 checks whether or not the thus determined value of vt (the value calculated by either the formula (22) or (23), or 0) exists within the area which the display can display, and corrects the vt value as follows when the value of vt is determined not to be within the area. In accordance with the basic point of view of the correction, the minimum value and the maximum value of 'v' at L=Lt are determined based on the value of Lt after conversion, the reference axis range of v2 and v5 in FIG. 10, and the approximate expressions v1 to v6 in FIG. 11. Since data shown in FIGS. 10 and 11 are in advance input into the mathematical formula storage part 47 and stored therein, the conversion part 44 accesses the mathematical formula storage part 47 to freely read out and acquire the data from the mathematical formula storage part 47. When the value of the determined vt deviates from the range between the minimum value to the maximum value, the conversion part 44 determines that the value does not exist within the area which the display can display, and performs correction by replacing the vt value by the minimum value or the maximum value of 'v' at the Lt value after conversion (whichever is closer to vt after conversion). Specifically, (1) in the case of vt>0, the maximum value of 'v' is determined by using one of the formulae in FIG. 11, that is, the formula v1 when Lt is 0 or greater and smaller than 87.8 (0≦Lt<87.8); the formula v2 when Lt is 87.8 or greater and smaller than 97.0 (87.8≦Lt<97.0); and the formula v3 when Lt is 97.0 or greater and 100 or smaller (97.0≦Lt≦100). When vt is greater than the maximum value of 'v', the maximum value is set to the vt value. (2) In the case where vt is zero or smaller (vt≦0), the minimum value of 'v' is determined by using one of the formulae in FIG. 11, that is, the formula v4 when Lt is greater than 60.4 and 100 or smaller (60.4<Lt≦100); the formula v5 when Lt is greater than 32.4 and 60.4 or smaller (32.4<Lt≦60.4); and the formula v6 when Lt is 0 or greater and 32.4 or smaller (0≦Lt≦32.4). When vt is smaller than the minimum value of 'v', the minimum value is set to the vt value.

Thus, the Luv data (Li, ui, vi) included in the object pixel data (the pixel number 'i', Luv data (L, u, v)=(Li, ui, vi)) is converted into data after conversion (Lt, ut, vt) (hereinafter referred to data after conversion).

Then, the conversion part 44 transmits the data after conversion (Lt, ut, vt) to the data storage part 42 to cause the data storage part 42 to store the data after conversion. The order of causing the data storage part 42 to store the data after conversion (Lt, ut, vt) is the same as the order of the pixel data included in the Luv image data stored by the data storage part 42 (That is, the data after conversion (Lt, ut, vt) is stored in the data storage part 42 exactly in the order of the original pixel data included in the Luv image data stored by the data storage part 42. In addition, a storage area where the data after conversion (Lt, ut, vt) is stored by the data storage part 42 differs from the storage area of the original pixel data included in the Luv image data.). Further, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

Figure 15:
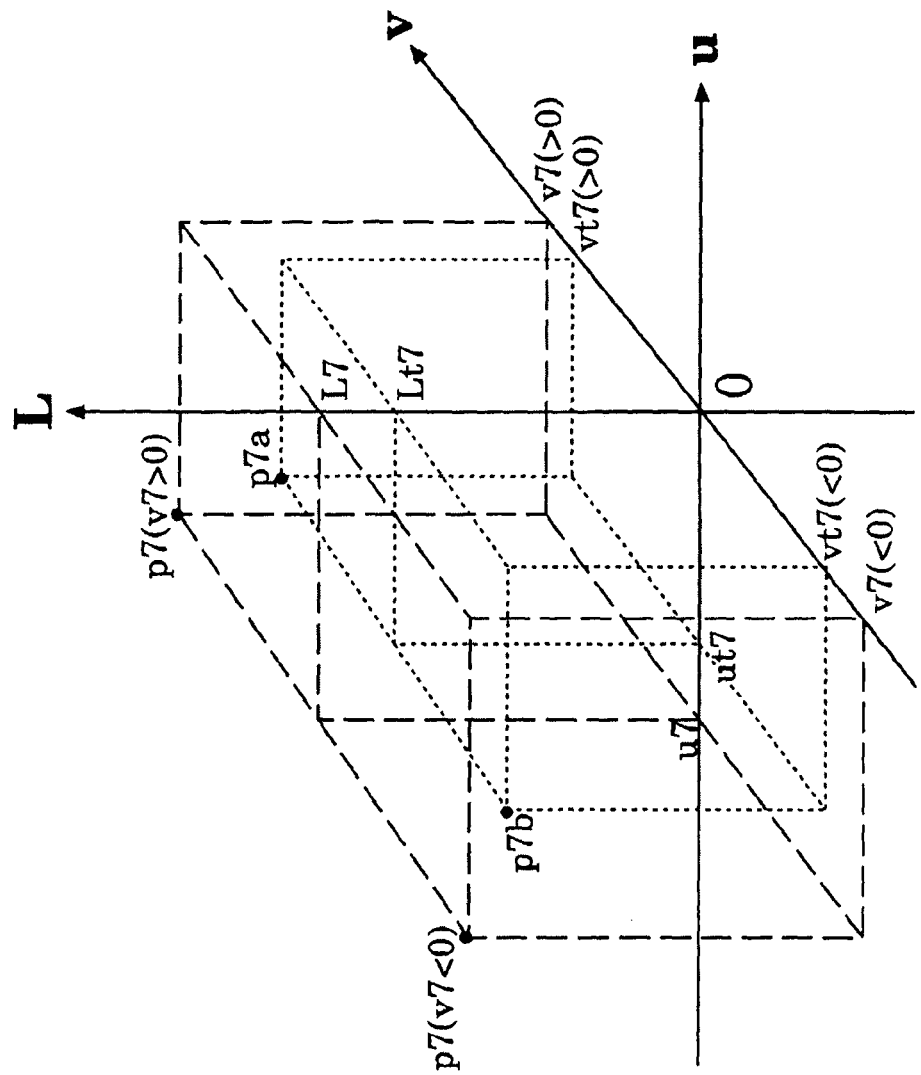
FIG. 15 shows a graph illustrating how the object pixel data are converted.

FIG. 15 shows how the specific example of the object pixel data (the pixel number 7, Luv data (L, u, v)=(L7, u7, v7), wherein u7<0) shown in FIG. 12 is converted by the conversion described above. Since how the 'u' value and the 'L' value are converted (conversion from the point po (L7, u7) to the point pt (Lt7, ut7)) is already described in detail by using FIG. 14, refer to FIG. 14 and the description thereof regarding the conversion.

In FIG. 15, a position after conversion in the case where v7 is positive (>0) is shown as a point p7a (Lt7, ut7, vt7), and a position after conversion in the case where v7 is 0 or smaller (0 or <0) is shown as a point p7b (Lt7, ut7, vt7). In FIG. 15, vt7 of the point p7a equals v7−(L7−Lt7), and vt7 of the point p7b equals v7+(L7−Lt7).

Thus, by calculating the 'v' coordinate after conversion by using the formula (22) or (23), it is possible to suppress a great change in hue before and after conversion (The conversion does not give to the user an impression of a great change in tone before and after conversion.).

(In the Case where 'u' is 0)

The conversion part 44 which does not determine that the value (ui) of 'u' is greater than 0, further determines whether or not the value (ui) of 'u' is smaller than 0, and when the value (ui) of 'u' is not determined to be smaller than 0 (that is, ui is 0.), directly transmits the Luv data (L, u, v)=(Li, ui, vi) related to the object pixel data to the data storage part 42 as data (Lt, ut, vt) after conversion, and causes the data storage part 42 to store the data (that is, when ui is 0, the Luv data (Li, ui, vi) is not changed.). The order of causing the data storage part 42 to store the data after conversion (Lt, ut, vt) is the same as the order of the pixel data included in the Luv image data stored by the data storage part 42 (That is, the data after conversion (Lt, ut, vt) is stored in the data storage part 42 exactly in the order of the original pixel data included in the Luv image data stored by the data storage part 42. A storage area where the data after conversion (Lt, ut, vt) is stored by the data storage part 42 differs from the storage area of the original pixel data included in the Luv image data.).

Then, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

As mentioned above, when the readout instruction signal for instructing the readout and transmission of the one piece of unread pixel data among the pixel data included in the Luv image data stored by the data storage part 42 is received from the conversion part 44, the object image data extraction part 43 accesses the data storage part 42 to read out and acquire one by one the unread pixel data among the pixel data included in the Luv image data stored by the data storage part 42, and then transmits the read and acquired one piece of pixel data to the conversion part 44. Accordingly, the pixel data transmitted to the conversion part 44 is processed as the object pixel data, and the pixel data included in the Luv image data stored by the data storage part 42 is processed one by one.

The object image data extraction part 43 having received the readout instruction signal from the conversion part 44 accesses the data storage part 42, and when it is determined that there is no unread pixel data among the pixel data included in the Luv image data stored by the data storage part 42 (that is, all the pixel data have been read out and there is no unread pixel data), the object image data extraction part 43 transmits a startup signal to the reading part 48.

The reading part 48 having received the startup signal from the object image data extraction part 43 accesses the data storage part 42 to read out and acquire all the ('n' pieces of) data (Lt, ut, vt) after conversion stored by the data storage part 42, and then transmits all the ('n' pieces of) read and acquired data (Lt, ut, vt) after conversion to the color space inverse transform part 51. Then, the reading part 48 accesses the data storage part 42, and erases the memory of the data storage part 42.

The color space inverse transform part 51 having received all the ('n' pieces of) data (Lt, ut, vt) after conversion from the reading part 48 (data processing part 41) converts all the ('n' pieces of) data after conversion (Lt, ut, vt) indicated as the data in the Luv color space into RGB image data. The conversion from the data (Lt, ut, vt) in the Luv color space into the RGB image data is performed by converting all the ('n' pieces of) pixel data of the data (Lt, ut, vt) after conversion into the RGB image data (Each of the 'n' pieces of pixel data is converted.). Since such a conversion method is known, the description thereof is omitted here.

The color space inverse transform part 51 having converted all the 'n' pieces of data after conversion (Lt, ut, vt) into the RGB image data transmits the 'n' pieces of converted RGB image data to the output part 61.

The output part 61 having received the 'n' pieces of converted RGB image data from the color space inverse transform part 51 displays an image on the display part 15 based on the RGB image data.

(Third Conversion (for Tritan))

The conversion part 44 having determined that the third conversion (for tritan) is specified transmits a readout instruction signal to the object image data extraction part 43 for instructing the object image data extraction part 43 to read out one piece of unread pixel data among the pixel data included in the Luv image data stored in the data storage part 42, and transmit the one piece of pixel data to the conversion part 44. The object image data extraction part 43 having received the readout instruction signal from the conversion part 44 accesses the data storage part 42 to read out and acquire the one unread pixel data among the pixel data included in the Luv image data stored in the data storage part 42 (That is, information on a pixel number 'i' and Luv data (L, u, v)=(Li, ui, vi) as the pixel data related to the pixel number 'i' (wherein 'i' is a positive integer) is regarded as one unit). Then, the object image data extraction part 43 transmits the one piece of pixel data read out and acquired from the data storage part 42 to the conversion part 44. Here, when the object image data extraction part 43 having received the readout instruction signal from the conversion part 44 determines that there is no unread pixel data among the pixel data included in the Luv image data stored in the data storage part 42 (That is, all the pixel data have been read out and there is no unread pixel data.), the object image data extraction part 43 transmits a startup signal to the reading part 48. The pixel data which is transmitted from the object image data extraction part 43 to the conversion part 44 and to be subsequently processed is referred to as "object pixel data", similar to the above first conversion.

The conversion part 44 having received the object pixel data from the object image data extraction part 43 determines first whether or not the value (vi) of 'v' of the Luv data included in the object pixel data (the pixel number "i", Luv data (L, u, v)=(Li, ui, vi)) is greater than 0, and when the value is determined to be greater, performs the following "processing in the case where the 'v' is positive". When it is not determined that the value (vi) of 'v' is greater than 0, the conversion part 44 determines whether or not the value (vi) of 'v' of the Luv data is smaller than 0, and when the value is determined to be smaller, performs the following "processing in the case where the 'v' is negative", and when it is not determined that the value is smaller than 0 (that is, the value (vi) of 'v' is 0 in this case.), no conversion is performed as described later.

Figure 16:
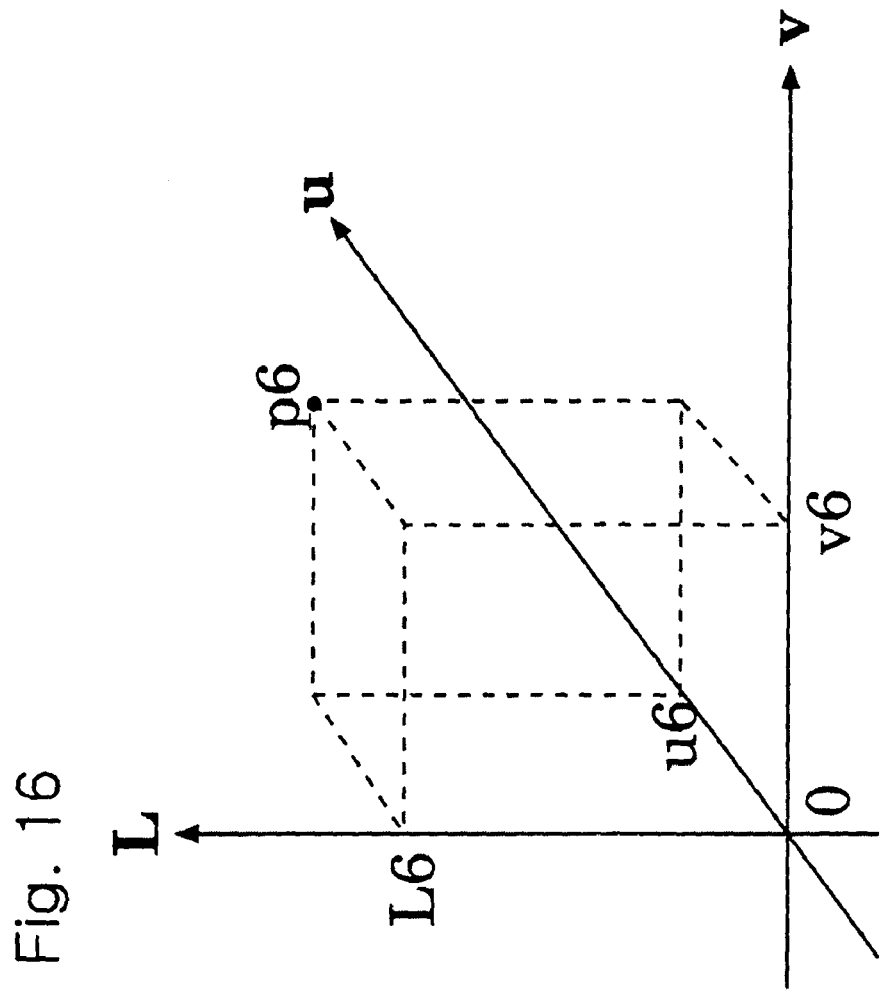
FIG. 16 is a view showing an example of the object pixel data.

In order to make an understanding easier here, as shown in FIG. 16, the object pixel data having a value of 'v' greater than 0 is used as a specific example of the object pixel data (the pixel number 6, Luv data (L, u, v)=(L6, u6, v6), wherein v6 is greater than 0 as described above. Further, a point p6 indicates the position of the object pixel data in FIG. 16.).

(Processing in the Case where 'v' is Positive)

The conversion part 44 having determined that the 'v' value (vi) is greater than 0 prepares the following formula (24) of an ellipse in the two orthogonal axes of 'v' and 'L' by using the numeric value Li of 'L' included in the Luv data (L, u, v)=(Li, ui, vi) of the Luv image data. The ellipse represented by the formula (24) exists on a 'v' plane (a plane including two axes of the 'v' axis and the 'L' axis among the 'L' axis, the 'u' axis, and the 'v' axis which are three axes intersecting orthogonally to each other as shown in FIG. 16), and the center (v, L) is (0, 0), a major axis (diameter in the 'L' axial direction) is Li, and a minor axis (diameter in the 'v' axial direction) is (Pvmax× Li/100). As described later, the value of 'v' and the value of 'L' of the object pixel data are converted such that the value of "v" and the value of 'L' of the object pixel data turn into the coordinates of points which exist on the circumference of the ellipse (on an elliptic circumference) represented by the formula (24).

$$v^2/(\text{Pvmax} \times Li/100)^2 + L^2/Li^2 = 1 \qquad \text{Formula (24)}$$

In the formula (24), Pvmax is a parameter. The user of the present device 11 previously inputs a value of Pvmax into the parameter storage part 46 via the keyboard, the touch panel, or the like (neither is shown) connected to the present device 11, and the parameter storage part 46 stores the value of Pvmax. For this reason, when the conversion part 44 prepares the formula (24), the conversion part 44 accesses the parameter storage part 46 to read out and acquire the value of Pvmax from the parameter storage part 46.

Then, since the 'L' is greater than 0 and smaller than 100, a formula (24.1) is obtained by transforming the formula (24).

The L(Li) becomes 0 or 100 in the case of u(ui)=v(vi)=0, and since the processing in the case where the 'u' is 0 or the processing in the case where the 'v' is 0 is performed in this case, the 'L' is greater than 0 and smaller than 100 here.

$$L = Li \times (1 - v^2/(Pvmax - Li/100)^2)^{0.5} \qquad \text{Formula (24.1)}$$

When the formula (24) is prepared for the specific example of the object pixel data (the pixel number 6, Luv data (L, u, v)=(L6, u6, v6) shown in FIG. 16, where v6 is greater than 0. The point p6 in FIG. 16), the following formula (24.2) is obtained.

$$v^2/(Pvmax \times L6/100)^2 + L^2/L6^2 = 1 \qquad \text{Formula (24.2)}$$

Figure 17:
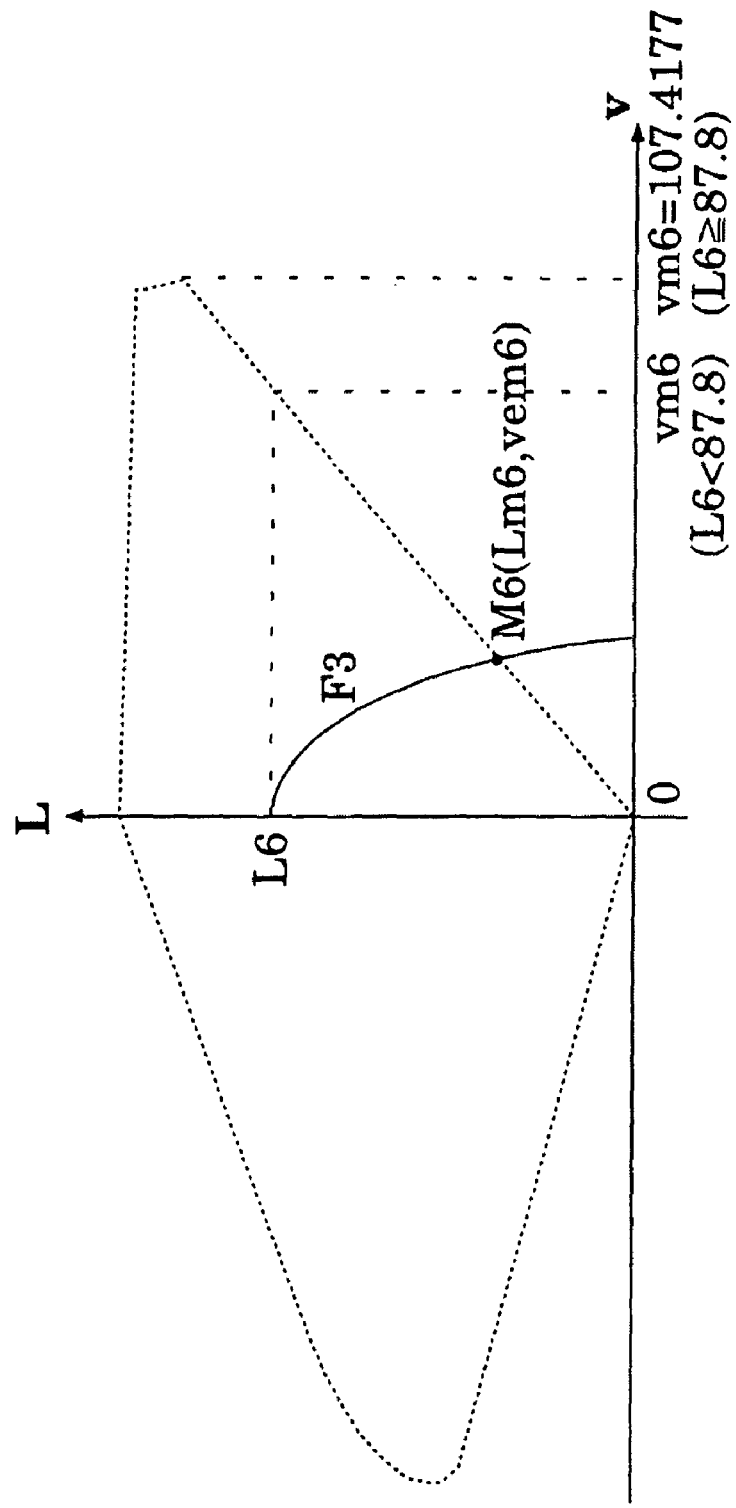
FIG. 17 shows a graph of a vL plane illustrating how 'L' value and 'v' value included in the object pixel data are converted.

FIG. 17 shows an ellipse represented by the formula (24.2). Further, the area which the display can display is surrounded with a dotted line and shown in FIG. 17. The area which the display can display is determined by the procedure of calculating the display color gamut, the procedure of calculating color coordinate values on the boundary line, and the procedure of deriving the approximate expression of the boundary line which are mentioned above. The ellipse represented by the formula (24.2) is shown with a solid line F3 in FIG. 17. Since a portion of the ellipse within the area which the display can display (that is, a portion within the area surrounded with the dotted line in FIG. 17) is involved with the processing here, only the portion which exists within the area and where 'v' is positive is shown here because the case where the 'v' is positive is processed here.

Next, the conversion part 44 determines whether or not the value (Li) of 'L' of the Luv data included in the object pixel data (the pixel number 'i', Luv data (L, u, v)=(Li, ui, vi)) is smaller than 87.8, and when the value (Li) of 'L' is determined to be smaller than 87.8, the maximum value of "v" which the display can display in the value (Li) of 'L' is used as a first reference value vm. The maximum value of the value of 'v' (here, the first reference value vm) is obtained by substituting the value (Li) of 'L' of the object pixel data for a value of 'L' in the following formula (25). The method of deriving the formula (25) is based on the procedure of calculating the display color gamut, the procedure of calculating color coordinate values on the boundary line, and the procedure of deriving the approximate expression of the boundary line which are already described, and the derived formula (25) is previously input into the mathematical formula storage part 47 and stored therein (specifically, the formula (25) is the formula of the line v1 in FIG. 11). For this reason, when the conversion part 44 determines that the value (Li) of 'L' is smaller than 87.8, the conversion part 44 accesses the mathematical formula storage part 47 to read out and acquire the formula (25) from the mathematical formula storage part 47.

$$v = 1.22208 \times L + 0.124972 \qquad \text{Formula (25)}$$

On the other hand, the conversion part 44 determines whether or not the value (Li) of 'L' of the Luv data included in the object pixel data (the pixel number 'i', Luv data (L, u, v)=(Li, ui, vi)) is smaller than 87.8, and when it is not determined that the value (Li) of 'L' is smaller than 87.8 (That is, the value (Li) of 'L' is 87.8 or greater), the first reference value vm is set to 107.4177 (the maximum value of 'v' which the display can display).

If the specific example of the object pixel (the pixel number 6, Luv data (L, u, v)=(L6, u6, v6), wherein v6>0) shown in FIG. 16 is considered, when the conversion part 44 determines that a value (L6) of 'L' is smaller than 87.8, the first reference value vm6 is calculated by using the following formula (25.1). FIG. 17 shows the thus calculated first reference value vm6.

$$vm6 = 1.22208 \times L6 + 0.124972 \qquad \text{Formula (25.1)}$$

On the other hand, when the conversion part 44 determines that the value (L6) of 'L' is 87.8 or greater (when the conversion part 44 does not determine that the 'L' value (L6) is smaller than 87.8), the first reference value vm6 is set to 107.4177. FIG. 17 shows 107.4177 set to the first reference value vm6 when it is thus determined that the value (L6) of 'L' is 87.8 or greater (when the conversion part 44 does not determine that the value (L6) of 'L' is smaller than 87.8).

Then, the conversion part 44 determines the ratio Sc (=vi/vm) of the value vi of 'v' of the Luv data included in the object pixel data (the pixel number 'i', Luv data (L, u, v)=(Li, ui, vi)) determined as above to the first reference value vm.

For example, when the specific example of object pixel data (the pixel number 6, Luv data (L, u, v)=(L6, u6, v6), wherein v6>0) shown in FIG. 16 is taken as an example, the ratio Sc6=v6/vm6 of the value v6 of 'v' of the Luv data to the first reference value vm6 is determined.

Subsequently, the conversion part 44 defines a point existing within the area which the display can display among points on the elliptic circumference of the ellipse represented by the formula (24.1), and having the minimum value of 'L' as (Lm, vem), and calculates this vem. For example, when the specific example of the object pixel data (the pixel number 6, Luv data (L, u, v)=(L6, u6, v6), wherein v6>0) shown in FIG. 16 is taken as an example, the point is shown as a point M6 (Lm6, vem6) in FIG. 17. As understood from FIG. 17, the point M6 (Lm6, vem6) is the point existing in the area (area surrounded with the dotted line) which the display can display as shown in FIG. 17 among the points on the elliptic circumference of the ellipse (indicated by the solid line F3) represented by the formula (24.1) shown in FIG. 17, and having the minimum value of 'L'. In the following, the method of calculating vem is described.

(Method of Calculating Vem)

First, a formula (26) is considered.

$$v^2/(Pvmax)^2 + L^2/(100) = 1 \qquad \text{Formula (26)}$$

Figure 18:
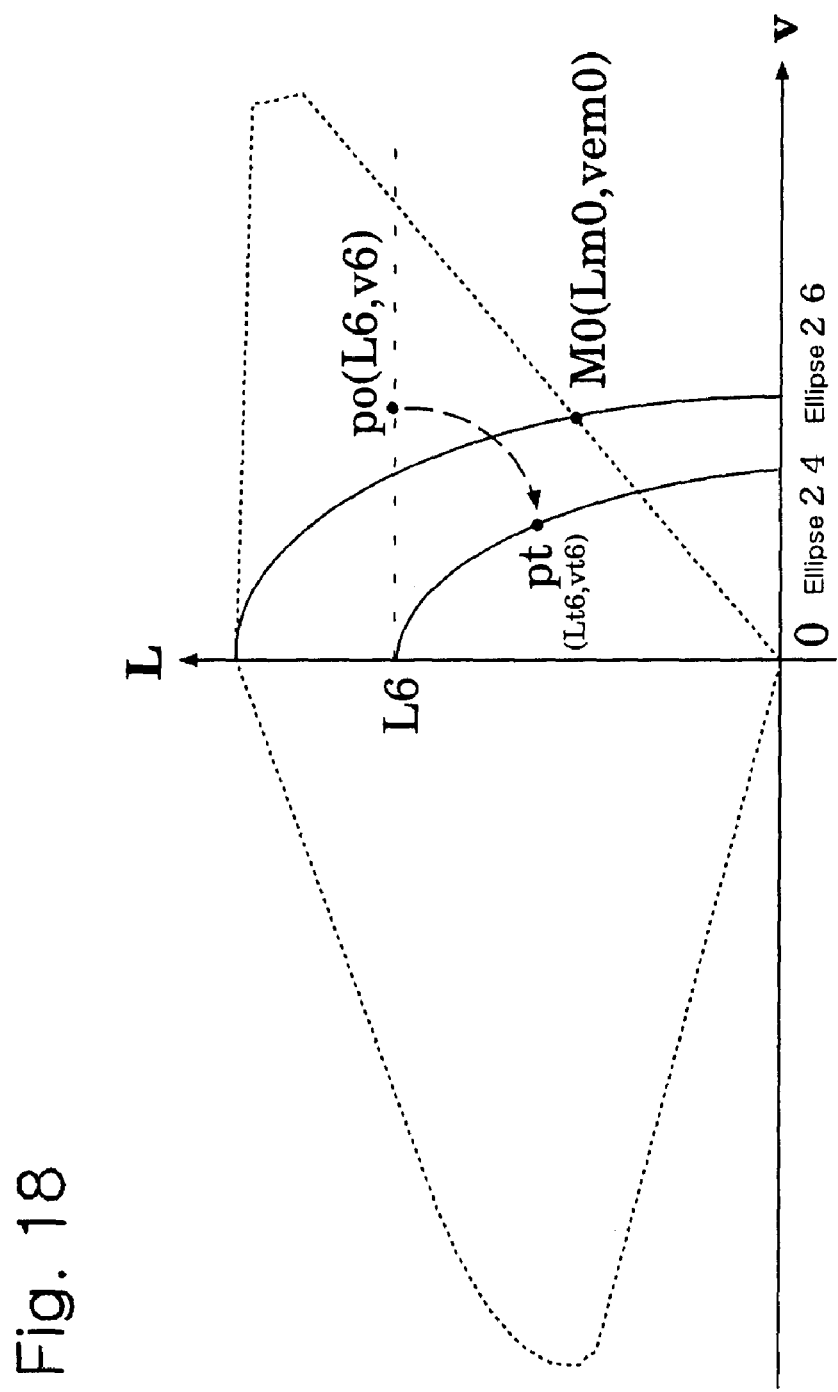
FIG. 18 shows a graph of the vL plane illustrating how 'L' value and 'v' value included in the object pixel data are converted.

FIG. 18 shows an ellipse (hereinafter referred to as "ellipse 26") represented by the formula (26). Further, the area which the display can display is surrounded with a dotted line and shown in FIG. 18, and an ellipse (hereinafter referred to as an "ellipse 24") represented by the formula (24) is similarly shown.

Secondly, when a point existing within the area which the display can display among points on the elliptic circumference of the ellipse represented by the formula (26) and having the minimum value of 'L' is defined as (Lm0, vem0), this vem0 is determined by the following formula (27). In addition, the minimum point (Lm0, vem0) is shown as a point MO (Lm0, vem0) in FIG. 18. The method of deriving the formula (27) is as described below. The derived formula (27) is in advance input into the mathematical formula storage part 47 and stored therein. For this reason, the conversion part 44 accesses the mathematical formula storage part 47 to read out and acquire the formula (27) from the mathematical formula storage part 47, and then calculates vem0.

The formula (27) is obtained by determining the 'v' coordinate vem0 of the intersection point where the 'v' is positive between the formulae (26) and (25) (This provides the maximum value of 'v' which the display can display where the 'v' is positive.) by using GNU Octave. Specifically, as the GNU Octave is utilized, Pvmax of the formula (26) is changed at 0.2 intervals from 10 to 100, and the intersection point (L, v) between the formulae (26) and (25) is determined for each case. As a result, 451 sets of three values (Pvmax, L, v) are obtained. Subsequently, the formula (27) which is the relational expression (approximate expression) of two values (Pvmax, v) in the sets is obtained by using the GNU Octave.

$$vem0 = -0.00323344 \times (Pvmax)^2 + 1.10944 \times (Pvmax) - 1.11198 \quad \text{Formula (27)}$$

Thirdly, the conversion part 44 substitutes vem0 determined in the second processing into the following formula (28) to determine vem. The method of deriving the formula (28) is as described below. The derived formula (28) is in advance input into the mathematical formula storage part 47 and stored therein. For this reason, the conversion part 44 accesses the mathematical formula storage part 47 to read out and acquire the formula (28) from the mathematical formula storage part 47, and then calculates vem.

Here, the formula (28) is an approximate expression for approximating vem by using vem0 when the value (Li) of 'L' of the Luv data included in the object pixel data (the pixel number 'i', Luv data (L, u, v)=(Li, ui, vi)) is greater than 0 and smaller than 100 (The value Li in the formula (28) is the value (Li) of 'L' of the Luv data included in the object pixel data. Further, since the L(Li) becomes 0 or 100 in the case of u(ui)=v(vi)=0, and since the processing in the case where the 'u' is 0 or the processing in the case where the 'v' is 0 is performed in this case, the 'L' is greater than 0 and smaller than 100 here.). A boundary line (that is, a line approximated by the formula (25)) which the display can display on the vL plane where the 'v' is positive and indicates the minimum value of 'L' can be substantially approximated by a straight line which passes (L, v)=(0, 0) (that is, L=a×v, wherein 'a' is constant). When the 'L' of the formula (26) is eliminated by using the formula of the straight line: L=a×v, vem0 is obtained, and when the 'L' of the formula (24) is eliminated by using the formula of the straight line, vem is obtained, and then the formula (28) is obtained from these values. In addition, the formula (28) can perform approximation very successfully with a small error.

$$vem = vem0 \times Li/100 \quad \text{Formula (28)}$$

When the specific example of the object pixel data (the pixel number 6, Luv data (L, u, v)=(L6, u6, v6), wherein v6>0) shown in FIG. 16 is taken as an example, vem6 which is vem relating to the specific example is calculated by using the following formula (28.1).

$$vem6 = vem0 \times L6/100 \quad \text{Formula (28.1)}$$

Then, the conversion part 44 determines the value (Lt) of 'L' of the Luv data after the third conversion (for tritan) of the object pixel data (the pixel number 'i', Luv data (L, u, v)=(Li, ui, vi)). The method of calculating the value (Lt) of 'L' after conversion is applied so as to decrease luminance in the color gamut which the display can display according to yellowishness in certain luminance. The value (Lt) of 'L' is determined such that the ratio of the value of 'L' decreased by the conversion (the difference between the value Lt of 'L' after conversion and the value Li of 'L' before conversion, that is, (Lt−Li)) to (Lm−Li) (that is, (Lt−Li)/(Lm−Li)) becomes identical with Sc (=vi/vm) described above. The value (Lm−Li) is the difference between the value Lm of 'L' after the conversion of a color converted into the lowest luminance color by the present conversion processing among all the colors having L=Li, and the value Li of 'L' before the conversion.

Specifically, Lt is represented by a formula (29).

$$(Lt-Li)/(Lm-Li) = Sc(=vi/vm) \quad \text{Formula (29)}$$

The formula (29) is transformed to obtain a formula (29.1).

$$Lt = Sc \times (Lm - Li) + Li \quad \text{Formula (29.1)}$$

The value Lm in the formula (29.1) is the value of 'L' of a point (Lm, vem) existing within the area which the display can display among the points on the elliptic circumference of the ellipse represented by the formula (24.1), and having the minimum value of 'L' as mentioned above. Since the point (Lm, vem) is the point on the elliptic circumference of the ellipse represented by the formula (24.1), the point (Lm, vem) satisfies the following formula (30).

$$Lm = Li \times (1 - vem^2/(Pvmax \times Li/100)^2)^{0.5} \quad \text{Formula (30)}$$

Then, the formula (28) is substituted for vem of the formula (30), and the resultant formula is further substituted into the formula (29.1) to obtain a formula (31).

$$Lt = Sc \times (Lm - Li) + Li \quad \text{Formula (31)}$$
$$= Li \times \left(1 - Sc \times \left(1 - (1 - vem0^2/(Pvmax)^2)^{0.5}\right)\right)$$

The conversion part 44 determines the value (Lt) of 'L' of the Luv data after third conversion (for tritan) of the object pixel data (the pixel number 'i', Luv data (L, u, v)=(Li, ui, vi)) by using the formula (31). Since the formula (31) is in advance input into the mathematical formula storage part 47 and stored therein, the conversion part 44 accesses the mathematical formula storage part 47 to read out and acquire the formula (31) from the mathematical formula storage part 47, and then calculates Lt (Further, the conversion part 44 accesses the parameter storage part 46 to read out and acquire the value of Pvmax from the parameter storage part 46.).

Subsequently, the conversion part 44 determines the value (vt) of 'v' of the Luv data after third conversion (for tritan) of the object pixel data. Since the value (Lt) of 'L' and the value (vt) of 'v' of the Luv data after conversion are points on the elliptic circumference of the ellipse represented by the formula (24.1), the value (vt) of 'v' is calculated by using the value (Lt) of 'L' determined as above and the following formula (32) (vt is greater than 0) obtained by transforming the formula (24.1). Since the formula (32) is in advance input into the mathematical formula storage part 47 and stored therein, the conversion part 44 accesses the mathematical formula storage part 47 to read out and acquire the formula (32) from the mathematical formula storage part 47, and then calculates vt (Further, the conversion part 44 accesses the parameter storage part 46 to read out and acquire the value of Pvmax from the parameter storage part 46.).

$$vt = \text{Pvmax}/100 \times (Li^2 - Lt^2)^{0.5} \qquad \text{Formula (32)}$$

FIG. 18 shows how the value of 'L' and the value of 'v' (Lt and vt, respectively) which are included in the specific example of the object pixel data (the pixel number 6, Luv data (L, u, v)=(L6, u6, v6), wherein v6>0) as shown in FIG. 16 are converted. A point po (L, v)=(L6, v6) in FIG. 18 is a point obtained by projecting the point of the specific example of the object pixel data (the pixel number 6, Luv data (L, u, v)=(L6, u6, v6), wherein v6>0) onto the vL plane (the plane including the 'v' axis and the 'L' axis).

As shown in FIG. 18, a value (Lt6) of 'L' is determined such that the ratio of the value of 'L' decreased by the conversion (the difference between the value Lt6 of 'L' after conversion and the value L6 of 'L' before conversion, that is (Lt6−L6)) to (Lm6−L6) (that is, (Lt6−L6)/(Lm6−L6)) becomes identical with the above Sc6 (=v6/vm6) on the vL plane, and the point po (L, u)=(L6, u6) is converted into a point pt (L, v)=(Lt7, vt7) on the elliptic circumference of the ellipse 24 according to the determined value (Lt6) of 'L'. Thus, the value of 'L' and the value of 'v' of the Luv data (L6, u6, v6) of the object pixel data are converted into Lt6 and vt6, respectively, and thereby a more yellowish color is converted into a lower luminance color (that is, the greater the value of 'v' is, the more the value of 'L' decreases.).

Next, the conversion part 44 determines whether the value ui of 'u' of the Luv image data (L, u, v)=(Li, ui, vi) of the object pixel data is positive or 0 or smaller, and determines the value of the value (ut) of 'u' of the Luv data after conversion by using the formula (33) when ui is positive (>0). Then, the conversion part 44 determines whether or not the value of the determined value (ut) of 'u' is negative (ut<0), and sets 0 to ut (ut=0) when the value (ut) of 'u' is determined to be negative (thereby preventing hue inversion due to conversion from ui into ut).

On the other hand, the conversion part 44 determines the value of ut by using a formula (34) when the value ui of 'u' of the Luv image data (L, u, v)=(Li, ui, vi) of the object pixel data is 0 or smaller (0 or <0). Then, the conversion part 44 determines whether or not the value of the determined value (ut) of 'u' is positive (ut>0), and sets 0 to ut (ut=0) when the value (ut) of 'u' is determined to be positive (thereby preventing hue inversion due to conversion from ui into ut).

$$ut = ui - (Li - Lt) \qquad \text{Formula (33)}$$

$$ut = ui + (Li - Lt) \qquad \text{Formula (34)}$$

Since both the formulae (33) and (34) are in advance input into the mathematical formula storage part 47 and stored therein, the conversion part 44 accesses the mathematical formula storage part 47 to read out and acquire either the formula (33) or (34) from the mathematical formula storage part 47, and then calculates ut.

Then, the conversion part 44 checks whether or not the thus determined value of ut (the value calculated by either the formula (33) or (34), or 0) exists within the area which the display can display, and corrects the ut value as follows when the value of ut is determined not to exist within the area. In accordance with the basic point of view of the correction, the minimum value and the maximum value of 'u' at L=Lt are determined based on the Lt value after conversion, the variation axis range of u2 and u4 in FIG. 10 (FIG. 10 shows only the reference axis range. However, the range of the area is determined by converting the entire RGB values into the Luv values, and the variation axis range is also simultaneously determined. The range of a variation axis of the 'L' axis for u2 is 53.3 to 100.0, and 87.8 to 91.2 for u4.), and the approximate expressions of u1 to u5 in FIG. 11. Since the data shown in FIGS. 10 and 11 are in advance input into the mathematical formula storage part 47 and stored therein, the data can be freely read out and acquired from the mathematical formula storage part 47 by the conversion part 44 by accessing the mathematical formula storage part 47. When the determined value ut deviates from the range from the minimum value to the maximum value, the conversion part 44 determines that the value ut does not exist within the area which the display can display, and performs correction by replacing the ut value by the minimum value or the maximum value of 'u' at the Lt value after conversion (whichever is closer to ut after conversion). Specifically, (1) in the case of ut>0, the maximum value of 'u' is determined by using one of the formulae in FIG. 11, that is, the formula u1 when Lt is 0 or greater and smaller than 53.3 (0≦Lt≦53.3); and the formula u2 when Lt is 53.3 or greater and 100.0 or smaller (53.3≦Lt≦100). When ut is greater than the maximum value of 'u', the maximum value is set to the ut value. (2) In the case where ut is 0 or smaller, the minimum value of 'u' is determined by using one of the formulae in FIG. 11, that is, the formula u3 when Lt is 91.2 or greater and 100 or smaller (91.2≦Lt≦100); the formula u4 when Lt is 87.8 or greater and smaller than 91.2 (87.8≦Lt<91.2); and the formula u5 when Lt is 0 or greater and smaller than 87.8 (0≦Lt<87.8). When ut is smaller than the minimum value of 'u', the minimum value is set to the ut value.

Thus, the Luv data (Li, ui, vi) included in the object pixel data (the pixel number 'i', Luv data (L, u, v)=(Li, ui, vi)) is converted into the data after conversion (Lt, ut, vt) (hereinafter referred to as data after conversion).

Then, the conversion part 44 transmits the data after conversion (Lt, ut, vt) to the data storage part 42 to cause the data storage part 42 to store the data after conversion. The order of causing the data storage part 42 to store the data after conversion (Lt, ut, vt) is the same as the order of the pixel data included in the Luv image data stored by the data storage part 42 (That is, the data after conversion (Lt, ut, vt) is stored in the data storage part 42 exactly in the order of the original pixel data included in the Luv image data stored by the data storage part 42. In addition, a storage area where the data after conversion (Lt, ut, vt) is stored by the data storage part 42 differs from the storage area of the original pixel data included in the Luv image data.). Further, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

Figure 19:
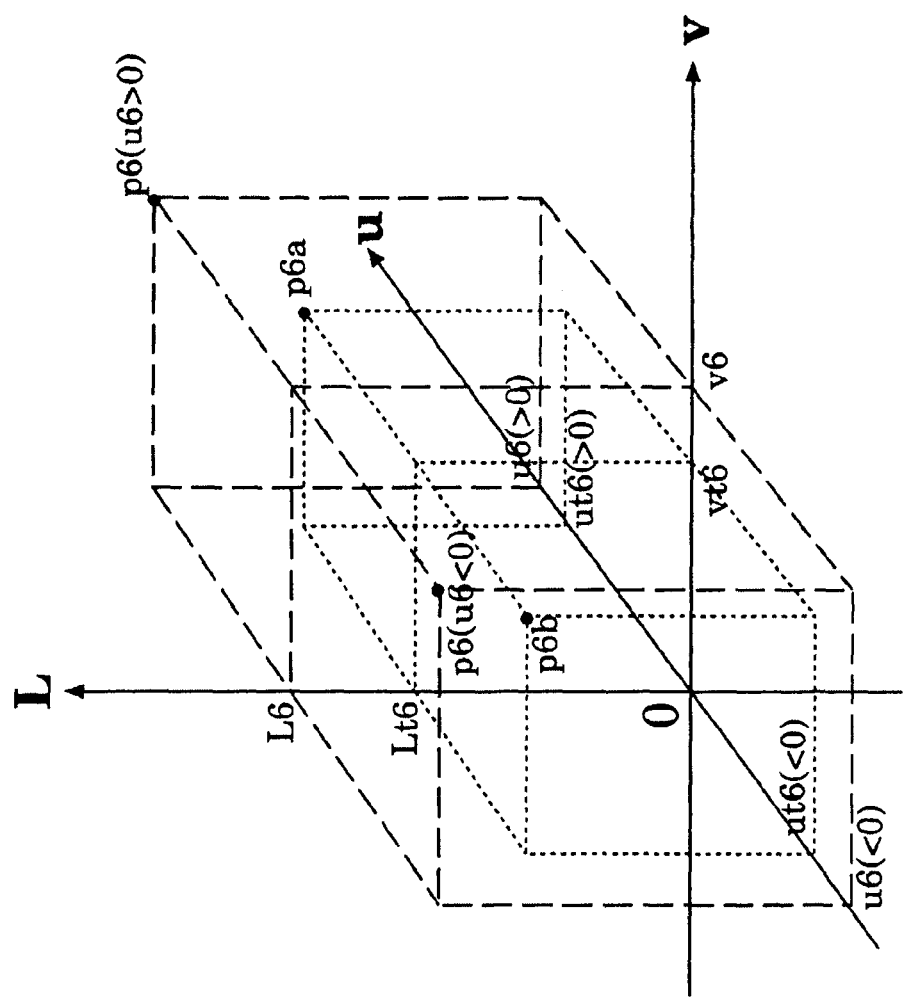
FIG. 19 shows a graph illustrating how the object pixel data are converted.

FIG. 19 shows how the specific example of the object pixel data (the pixel number 6, Luv data (L, u, v)=(L6, u6, v6), wherein v6>0) shown in FIG. 16 is converted by the conversion as described above. Since how the value of 'v' and the value of 'L' are converted (the conversion from the point po (L6, u6) to the point pt (Lt6, ut6)) is already described in detail by using FIG. 18. Refer to FIG. 18 and the description thereof regarding the conversion.

In FIG. 19, a position after conversion in the case where u6 is positive (>0) is shown as a point p6a (Lt6, ut6, vt6), and a position after conversion in the case where u6 is 0 or smaller (0 or <0) is shown as a point p6b (Lt6, ut6, vt6). In FIG. 19, ut6 of the point p6a equals u6−(L6−Lt6), and ut6 of the point p6b equals u6+(L6−Lt6).

Thus, by calculating the 'u' coordinate after conversion by using the formula (33) or (34), it is possible to suppress a great change in hue before and after conversion (The conversion does not give to the user an impression of a great change in tone before and after conversion.).

(Processing in the Case where 'v' is Negative)

The conversion part 44 not having determined that the value (vi) of 'v' is greater than 0 further determines whether or not the value (vi) of 'v' is smaller than 0, and performs "processing in the case where the 'v' is negative" described below when the value (vi) of 'v' is determined to be smaller than 0.

Figure 20:
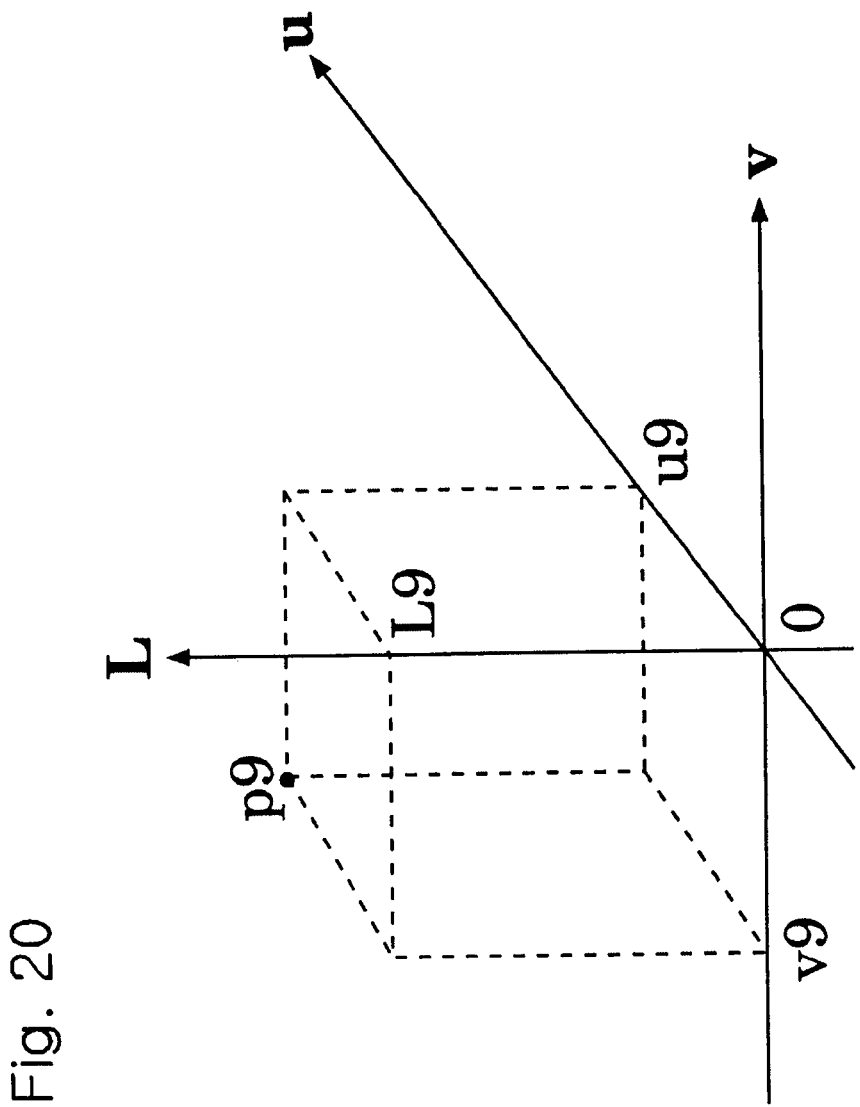
FIG. 20 is a view showing an example of the object pixel data.

The conversion part 44 having determined that the value (vi) of 'v' is smaller than 0 prepares the following formula (35) of an ellipse in the two orthogonal axes of 'v' and 'L' by using the numeric value Li of 'L' included in the Luv data (L, u, v)=(Li, ui, vi) of the Luv image data. The ellipse represented by the formula (35) exists on the vL plane (a plane including two axes of the 'v' axis and the 'L' axis among the 'L' axis, the 'u' axis, and the 'v' axis which are three axes intersecting orthogonally to each other as shown in FIG. 20), and the center (v, L) is (0,100), a major axis (the diameter in the 'L' axial direction) is (100−Li), and a minor axis (the diameter in the 'v' axial direction) is (Pvmin×(100−Li)/100). As described later, the value of 'v' and the value of 'L' of the object pixel data are converted such that the value of 'v' and the value of 'L' of the object pixel data turn into the coordinates of points which exist on the circumference of the ellipse (on an elliptic circumference) represented by the formula (35).

$$v^2/(Pvmin \times (100-Li)/100)^2 + (L-100)^2/(100-Li)^2 = 1 \quad \text{The formula (35)}$$

In the formula (35), Pvmin is a parameter. The user of the present device 11 in advance inputs a value of Pvmin into the parameter storage part 46 via the keyboard, the touch panel, or the like (none of them are shown) connected to the present device 11, and the parameter storage part 46 stores the value of Pvmin. For this reason, when the conversion part 44 prepares the formula (35), the conversion part 44 accesses the parameter storage part 46 to read out and acquire the value of Pvmin from the parameter storage part 46.

Then, since the 'L' is greater than 0 and smaller than 100, a formula (35.1) is obtained by transforming the formula (35). Further, since L(Li) becomes 0 or 100 in the case of u(ui)=v (vi)=0, and processing in the case where the 'u' is 0 or processing in the case where the 'v' is 0 is performed in this case, the 'L' is greater than 0 and smaller than 100 here.

$$L = 100 - (100-Li) \times (1 - v^2/(Pvmin \times (100-Li)/100)^2)^{0.5} \quad \text{Formula (35.1)}$$

When the formula (35) is prepared for the specific example of the object pixel data shown in FIG. 20 (the Pixel number 9, Luv data (L, u, v)=(L9, u9, v9), wherein v9 is smaller than zero. A point p9 in FIG. 20.), the following formula (35.2) is obtained.

$$v^2/(Pvmin \times (100-L9)/100)^2 + (L-100)^2/(100-L9)^2 = 1 \quad \text{Formula (35.2)}$$

Figure 21:
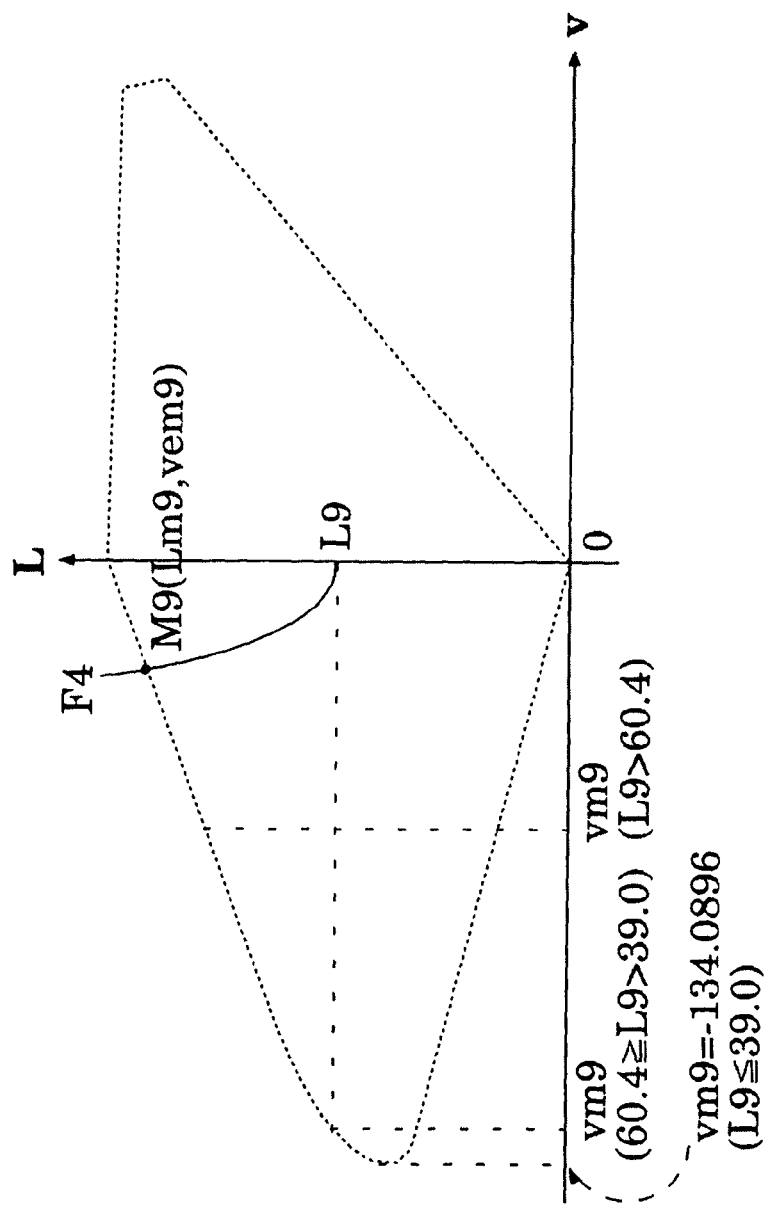
FIG. 21 shows a graph of the vL plane illustrating how 'L' value and 'v' value included in the object pixel data are converted.

FIG. 21 shows an ellipse represented by the formula (35.2). Further, the area which the display can display is surrounded with a dotted line and shown in FIG. 21. The area which the display can display is determined by the procedure of calculating the display color gamut, the procedure of calculating color coordinate values on the boundary line, and the procedure of deriving the approximate expression of the boundary line which are mentioned above. The ellipse represented by the formula (35.2) is shown with a solid line F4 in FIG. 21. Since a portion of the ellipse within the area which the display can display (that is, a portion within the area surrounded with the dotted line in FIG. 21) is involved with the processing here, only the portion which exists within the area and where the 'v' is negative is shown here because the case where the 'v' is negative is processed here.

Next, the conversion part 44 determines whether or not the value (Li) of 'L' of the Luv data included in the object pixel data (the pixel number i, Luv data (L, u, v)=(Li, ui, vi)) is greater than 60.4, and when the value (Li) of 'L' is determined to be greater than 60.4, the minimum value of 'v' which the display can display in the value (Li) of 'L' is used as a first reference value vm. The minimum value of 'v' (the first reference value vm here) is a value of 'v' obtained by substituting the value (Li) of 'L' of the object pixel data for the value of 'L' of the following formula (36). The method of deriving the formula (36) is based on the procedure of calculating the display color gamut, the procedure of calculating the color coordinate values on the boundary line, and the procedure of deriving the approximate expression of the boundary line which are already described, and the derived formula (36) is in advance input into the mathematical formula storage part 47 and stored therein (specifically, the formula (36) is the formula of the line v4 in FIG. 11). For this reason, when the conversion part 44 determines that the value (Li) of 'L' is greater than 60.4, the conversion part 44 accesses the mathematical formula storage part 47 to read and acquire the formula (36) from the mathematical formula storage part 47.

$$v = 2.78401 \times L - 278.237 \quad \text{Formula (36)}$$

Then, when the conversion part 44 does not determine that the value (Li) of 'L' of the Luv data included in the object pixel data (the pixel number i, Luv data (L, u, v)=(Li, ui, vi)) is greater than 60.4 (that is, the value (Li) of 'L' is 60.4 or smaller), the conversion part 44 further determines whether or not the value (Li) of 'L' is greater than 39.0, and when the value (Li) of 'L' is determined to be greater than 39.0, the minimum value of 'v' which the display can display in the value (Li) of 'L' is used as a first reference value vm. The minimum value of 'v' (the first reference value vm here) is a value of 'v' obtained by substituting the value (Li) of 'L' of the object pixel data for the value of 'L' of the following formula (37). The method of deriving the formula (37) is based on the procedure of calculating the display color gamut, the procedure of calculating the color coordinate values on the boundary line, and the procedure of deriving the approximate expression of the boundary line which are already described, and the derived formula (37) is in advance input into the mathematical formula storage part 47 and stored therein (specifically, the formula (37) is the formula of the line v5 in FIG. 11). For this reason, when the value (Li) of 'L' is determined not to be greater than 60.4 and to be greater than 39.0, the conversion part 44 accesses the mathematical formula storage part 47 to read out and acquire the formula (37) from the mathematical formula storage part 47.

$$v = -0.000944111 \times L^3 + 0.186393 \times L^2 10.2379 \times L + 37.5197 \quad \text{Formula (37)}$$

When the conversion part 44 does not determine that the value (Li) of 'L' of the Luv data included in the object pixel data (the pixel number 'i', Luv data (L, u, v)=(Li, ui, vi)) is greater than 60.4 (that is, the value (Li) of 'L' is 60.4 or smaller), the conversion part 44 further determines whether or not the value (Li) of 'L' is greater than 39.0, and when the value (Li) of 'L' is determined not to be greater than 39.0 (that is, the value (Li) of 'L' is 39.0 or smaller), the first reference value vm is set to −134.0896 (the minimum value of 'v' which the display can display).

If the specific example of the object pixel (the pixel number 9, Luv data (L, u, v)=(L9, u9, v9), wherein v9<0) shown in FIG. 20 is considered, when the conversion part 44 determines that the value (L9) of 'L' is greater than 60.4, the first reference value vm9 is calculated by using the following formula (36.1). FIG. 21 shows the thus calculated first reference value vm9.

$$vm9=2.78401 \times L9-278.237 \qquad \text{Formula (36.1)}$$

On the other hand, when the conversion part 44 determines that the value (L9) of 'L' is not greater than 60.4 and greater than 39.0, the first reference value vm9 is calculated by using the following formula (37.1). FIG. 21 shows the thus calculated first reference value vm9.

$$vm9=-0.000944111 \times L9^3+0.186393 \times L9^2-10.2379 \times L9+37.5197 \qquad \text{Formula (37.1)}$$

Then, when the value (L9) of 'L' is determined not to be greater than 60.4 and further determined not to be greater than 39.0 (that is, the value (Li) of 'L' is 39.0 or smaller), −134.0896 is set to the first reference value vm6. FIG. 21 also shows −134.0896 set to the first reference value vm9 when it is thus determined that the 'L' value (L9) is 39.0 or smaller.

Then, the conversion part 44 determines the ratio Sc (=vi/vm) of the value vi of 'v' of the Luv data included in the object pixel data (the pixel number 'i', Luv data (L, u, v)=(Li, ui, vi)) to the first reference value vm determined as described above.

For example, when the specific example of the object pixel data (the pixel number 9, Luv data (L, u, v)=(L9, u9, v9), wherein v9<0) shown in FIG. 20 is taken as an example, the ratio Sc9=v9/vm9 of the value v9 of 'v' of the Luv data to the determined first reference value vm9 is determined.

Subsequently, the conversion part 44 defines a point existing within the area which the display can display among points on the elliptic circumference of the ellipse represented by the formula (35.1) and having the maximum value of 'L', as (Lm, vem), and calculates this vem. For example, when the specific example of the object pixel data (the pixel number 9, Luv data (L, u, v)=(L9, u9, v9), wherein v9<0) shown in FIG. 20 is taken as an example, the point is shown as a point M9 (Lm9, vem9) in FIG. 21. As understood from FIG. 21, the point M9 (Lm9, vem9) is the point existing within the area (the area surrounded with the dotted line) shown in FIG. 21 which the display can display among the points on the elliptic circumference of the ellipse (solid line F4) represented by the formula (35.1) shown in FIG. 21, and having the maximum value of 'L'. In the following, a method of calculating vem is described.

(Method of Calculating Vem)

First, a formula (38) is considered.

$$v^2/(\text{Pvmin})^2+(L-100)^2/(100)^2=1 \qquad \text{Formula (38)}$$

Figure 22:
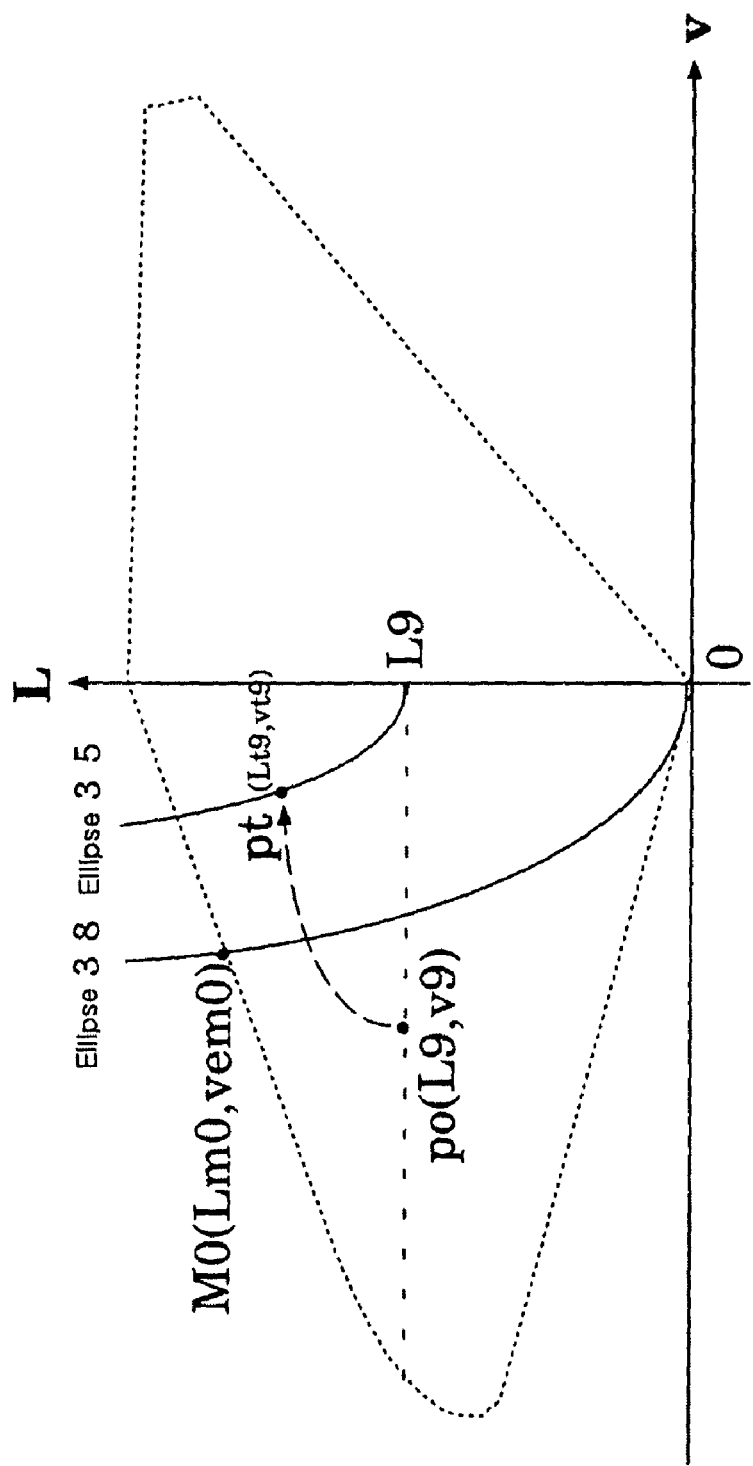
FIG. 22 shows a graph of the vL plane illustrating how 'L' value and 'v' value included in the object pixel data are converted.

FIG. 22 shows an ellipse (hereinafter referred to as an "ellipse 38") represented by the formula (38). The area which the display can display is surrounded with a dotted line and shown in FIG. 22 similar to FIG. 21, and an ellipse (hereinafter referred to as an "ellipse 35") represented by the formula (35) is shown similarly.

Secondly, when a point existing within the area which the display can display among points on the elliptic circumference of the ellipse represented by the formula (38) and having the maximum value of 'L' is defined as (Lm0, vem0), this vem0 is determined by the following formula (39). The maximum point (Lm0, vem0) is shown as a point M0 (Lm0, vem0) in FIG. 22. The method of deriving the formula (39) is as described below. The derived formula (39) is in advance input into the mathematical formula storage part 47 and stored therein. For this reason, the conversion part 44 accesses the mathematical formula storage part 47 to read out and acquire the formula (39) from the mathematical formula storage part 47, and then calculates vem0.

The formula (39) is obtained by determining the "v" coordinate vem0 of the intersection point where the 'v' is negative between the formulae (38) and (36) (This provides the minimum value of 'v' which the display can display where the 'v' is negative.) by using GNU Octave. Specifically, as GNU Octave is utilized, Pvmin of the formula (38) is changed at 0.2 intervals from −100 to −10, and the intersection point (L, v) between the formulae (38) and (36) is determined for each case. As a result, 451 sets of three values (Pvmin, L, v) are obtained. Subsequently, a formula (39) which is the relational expression (approximate expression) of two values (Pvmin, v) among them is obtained by using the GNU Octave.

$$vem0=0.000945382 \times (\text{Pvmin})^2+1.04221 \times (\text{Pvmin})+0.515752 \qquad \text{Formula (39)}$$

Thirdly, the conversion part 44 substitutes vem0 determined in the second processing into the following formula (40) to determine vem. The method of deriving the formula (40) is as described below. The derived formula (40) is in advance input into the mathematical formula storage part 47 and stored therein. For this reason, the conversion part 44 accesses the mathematical formula storage part 47 to read out and acquire the formula (40) from the mathematical formula storage part 47, and then calculates vem.

Here, the formula (40) is an approximate expression for approximating vem by using vem0 when the value (Li) of 'L' of the Luv data included in the object pixel data (the pixel number 'i', Luv data (L, u, v)=(Li, ui, vi)) is greater than 0 and smaller than 100 (Li in the formula (40) is the value (Li) of 'L' of the Luv data included in the object pixel data. Further, L(Li) is 0 or 100 in the case of u(ui)=v(vi)=0, and since the processing in the case where the 'u' is 0, or the processing in the case where the 'v' is 0 is performed in this case, the 'L' is greater than 0 and smaller than 100 here.). A boundary line (that is, a line approximated by the formula (36)) which the display can display on the vL plane where the 'v' is negative and indicates the maximum value of 'L' can be substantially approximated by a straight line which passes (L, u)=(100, 0) (that is, L=a×v+100, wherein 'a' is constant). When the 'L' of the formula (38) is eliminated by using the formula of the straight line: L=a×v+100, vem0 is obtained, and when the 'L' of the formula (35) is eliminated by using the formula of the straight line, vem is obtained, and then the formula (40) is obtained from these values. In addition, the formula (40) can perform approximation very successfully with a small error.

$$vem=vem0 \times (100-Li)/100 \qquad \text{Formula (40)}$$

When the specific example (the pixel number 9, Luv data (L, u, v)=(L9, u9, v9), wherein v9<0) of the object pixel data shown in FIG. 20 is taken as an example, vem9 which is vem relating to the specific example is calculated by using the following formula (40.1).

$$vem9=vem0 \times (100-L9)/100 \qquad \text{Formula (40.1)}$$

Then, the conversion part 44 determines the 'L' value (Lt) of the Luv data after third conversion (for tritan) of the object pixel data (the pixel number 'i', Luv data (L, u, v)=(Li, ui, vi)). The method of calculating the value (Lt) of 'L' after the conversion is applied so as to increase luminance in the color gamut which the display can display according to bluishness in certain luminance. The value (Lt) of 'L' is determined such that the ratio of the value of 'L' increased by the conversion (the difference between the value Lt of 'L' after conversion and the value Li of 'L' before conversion, that is, (Lt−Li)) to (Lm−Li) (that is, (Lt−Li)/(Lm−Li)) becomes identical with Sc (=vi/vm) described above. The value (Lm−Li) represents the difference between the value Lm of 'L' after the conversion of a color converted into the highest luminance color by the present conversion processing among all the colors having L=Li, and the value Li of 'L' before the conversion.

Specifically, Lt is represented by a formula (41).

$$(Lt-Li)/(Lm-Li)=Sc(=vi/vm) \quad \text{Formula (41)}$$

A formula (41.1) is obtained by transforming the formula (41).

$$Lt=Sc \times (Lm-Li)+Li \quad \text{Formula (41.1)}$$

The value Lm in the formula (41.1) is the value of 'L' of a point (Lm, vem) existing within the area which the display can display among the points on the elliptic circumference of the ellipse represented by the formula (35.1), and having the maximum value of 'L' as mentioned above. Since the point (Lm, vem) is the point on the elliptic circumference of the ellipse represented by the formula (35.1), the point (Lm, vem) satisfies the following formula (42).

$$Lm=100-(100-Li)\times(1-vem^2/(Pvmin\times(100-Li)/100)^2)^{0.5} \quad \text{Formula (42)}$$

Then, the formula (40) is substituted for vem of the formula (42), and the resultant formula is further substituted into the formula (41.1) to obtain a formula (43).

$$Lt = Sc \times (Lm - Li) + Li$$
$$= Li + (100 - Li) \times Sc \times \left(1 - (1 - vem0^2/(Pvmin)^2)^{0.5}\right) \quad \text{Formula (43)}$$

The conversion part 44 determines the value (Lt) of 'L' of the Luv data after the third conversion (for tritan) of the object pixel data (the pixel number 'i', Luv data (L, u, v)=(Li, ui, vi)) by using that formula (43). Since the formula (43) is in advance input into the mathematical formula storage part 47 and stored therein, the conversion part 44 accesses the mathematical formula storage part 47 to read out and acquire the formula (43) from the mathematical formula storage part 47, and then calculates Lt (Further, the conversion part 44 accesses the parameter storage part 46 to read out and acquire the value of Pvmin from the parameter storage part 46.).

Subsequently, the conversion part 44 determines the value (vt) of 'v' of the Luv data after the third conversion (for tritan) of the object pixel data. Since the value (Lt) of 'L' and the value (vt) of 'v' of the Luv data after conversion are points on the elliptic circumference of the ellipse represented by the formula (35.1), the value (vt) of 'v' is calculated by using the value (Lt) of 'L' determined as above and the following formula (44) (vt is smaller than 0) obtained by transforming the formula (35.1). Since the formula (44) is in advance input into the mathematical formula storage part 47 and stored therein, the conversion part 44 accesses the mathematical formula storage part 47 to read out and acquire the formula (44) from the mathematical formula storage part 47, and then calculates vt (Further, the conversion part 44 accesses the parameter storage part 46 to read out and acquire the value of Pvmin from the parameter storage part 46.).

$$vt=Pvmin/100 \times ((1-Li)^2-(Lt-100)^2)^{0.5} \quad \text{Formula (44)}$$

FIG. 22 shows how the value of 'L' and the value of 'v' (Lt and vt, respectively) which are included in the specific example of the object pixel data (the pixel number 9, Luv data (L, u, v)=(L9, u9, v9), wherein v9<0) shown in FIG. 20 are converted. A point po (L, v)=(L9, v9) in FIG. 22 is a point obtained by projecting the point of the specific example of the object pixel data (the pixel number 9, Luv data (L, u, v)=(L9, u9, v9), wherein v9<0) onto the vL plane (the plane including the 'v' axis and the 'L' axis).

As shown in FIG. 22, a value (Lt9) of 'L' is determined such that the ratio of the value of 'L' increased by the conversion (the difference between the value Lt9 of 'L' after conversion and the value L9 of 'L' before conversion, that is (Lt9−L9)) to (Lm9−L9) (that is, (Lt9−L9)/(Lm9−L9)) becomes identical with the above Sc9 (=v9/vm9) on the vL plane, and the point po (L, u)=(L9, u9) is converted into a point pt (L, v)=(Lt9, vt9) on the elliptic circumference of the ellipse 35 according to the determined value (Lt9) of 'L'. Thus, the value of 'L' and the value of 'v' of the Luv data (L9, u9, v9) of the object pixel data are converted into Lt9 and vt9, respectively, and thereby a more bluish color is converted into a higher luminance color (that is, the smaller the 'v' value is, the more the 'L' value increases.).

Next, the conversion part 44 determines whether the value ui of 'u' of the Luv image data (L, u, v)=(Li, ui, vi) of the object pixel data is positive or 0 or smaller, and determines the value of the value (ut) of 'u' of the Luv data after conversion by using the formula (45) when ui is positive (>0). Then, the conversion part 44 determines whether or not the value of the determined value (ut) of 'u' is negative (ut<0), and sets 0 to ut (ut=0) when the value (ut) of 'u' is determined to be negative (thereby preventing hue inversion due to conversion from ui into ut).

On the other hand, when the value ui of 'u' of the Luv image data (L, u, v)=(Li, ui, vi) of the object pixel data is 0 or smaller (0 or <0), the conversion part 44 determines the value of ut by using a formula (46). Then, the conversion part 44 determines whether or not the value of the determined value (ut) of 'u' is positive (ut>0), and sets 0 to ut (ut=0) when the value (ut) of 'u' is determined to be positive (thereby preventing hue inversion due to conversion from ui into ut.).

$$ut=ui-(Lt-Li) \quad \text{Formula (45)}$$

$$ut=ui+(Lt-Li) \quad \text{Formula (46)}$$

Since both the formulae (45) and (46) are in advance input into the mathematical formula storage part 47 and stored therein, the conversion part 44 accesses the mathematical formula storage part 47 to read out and acquire either the formula (45) or (46) from the mathematical formula storage part 47, and then calculates ut.

Then, the conversion part 44 checks whether or not the thus determined value of ut (the value calculated by either the formula (45) or (46), or 0) exists within the area which the display can display, and corrects the ut value as follows when the ut value is determined not to exist within the area. In accordance with the basic point of view of the correction, the minimum value and the maximum value of 'u' at L=Lt are determined based on the Lt value after conversion, the variation axis range of u2 and u4 in FIG. 10 (FIG. 10 shows only the reference axis range. However, the range of the area is determined by converting the entire RGB values into the Luv values, and the variation axis range is also simultaneously determined. The range of a variation axis of the 'L' axis for u2 is 53.3 to 100.0, and 87.8 to 91.2 for u4.), and the approximate expressions of u1 to u5 in FIG. 11. Since the data shown in FIGS. 10 and 11 are in advance input into the mathematical formula storage part 47 and stored therein, the conversion part 44 can access the mathematical formula storage part 47 to freely read out and acquire the data from the mathematical formula storage part 47. When the determined ut value deviates from the range from the minimum value to the maximum value, the conversion part 44 determines that the ut value does not exist within the area which the display can display, and performs correction by replacing the ut value by the minimum value or the maximum value of 'u' at the Lt value after conversion (whichever is closer to ut after conversion). Specifically, (1) in the case of ut>0, the maximum value of 'u' is determined by using one of the formulae in FIG. 11, that is, the formula u1 when Lt is 0 or greater and smaller than 53.3 ($0 \leq Lt < 53.3$); and the formula u2 when Lt is 53.3 or greater and 100.0 or smaller ($53.3 \leq Lt \leq 100$). When ut is greater than the maximum value of 'u', the maximum value is set to the ut value. (2) In the case where ut is 0 or smaller, the minimum value of 'u' is determined by using one of the formulae in FIG. 11, that is, the formula u3 when Lt is 91.2 or greater and 100 or smaller ($91.2 \leq Lt \leq 100$), the formula u4 when Lt is 87.8 or greater and smaller than 91.2 ($87.8 \leq Lt < 91.2$), and the formula u5 when Lt is 0 or greater and smaller than 87.8 ($0 \leq Lt < 87.8$). When ut is smaller than the minimum value, the minimum value is set to the ut value.

Thus, the Luv data (Li, ui, vi) included in the object pixel data (the pixel number 'i', Luv data (L, u, v)=(Li, ui, vi)) is converted into data after conversion (Lt, ut, vt) (hereinafter referred to as data after conversion).

Then, the conversion part 44 transmits the data after conversion (Lt, ut, vt) to the data storage part 42 to cause the data storage part 42 to store the data after conversion. The order of causing the data storage part 42 to store the data after conversion (Lt, ut, vt) is the same as the order of the pixel data included in the Luv image data stored by the data storage part 42 (That is, the data after conversion (Lt, ut, vt) is stored in the data storage part 42 exactly in the order of the original pixel data included in the Luv image data stored by the data storage part 42. In addition, a storage area where the data after conversion (Lt, ut, vt) is stored by the data storage part 42 differs from the storage area of the original pixel data included in the Luv image data.). Further, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

Figure 23:
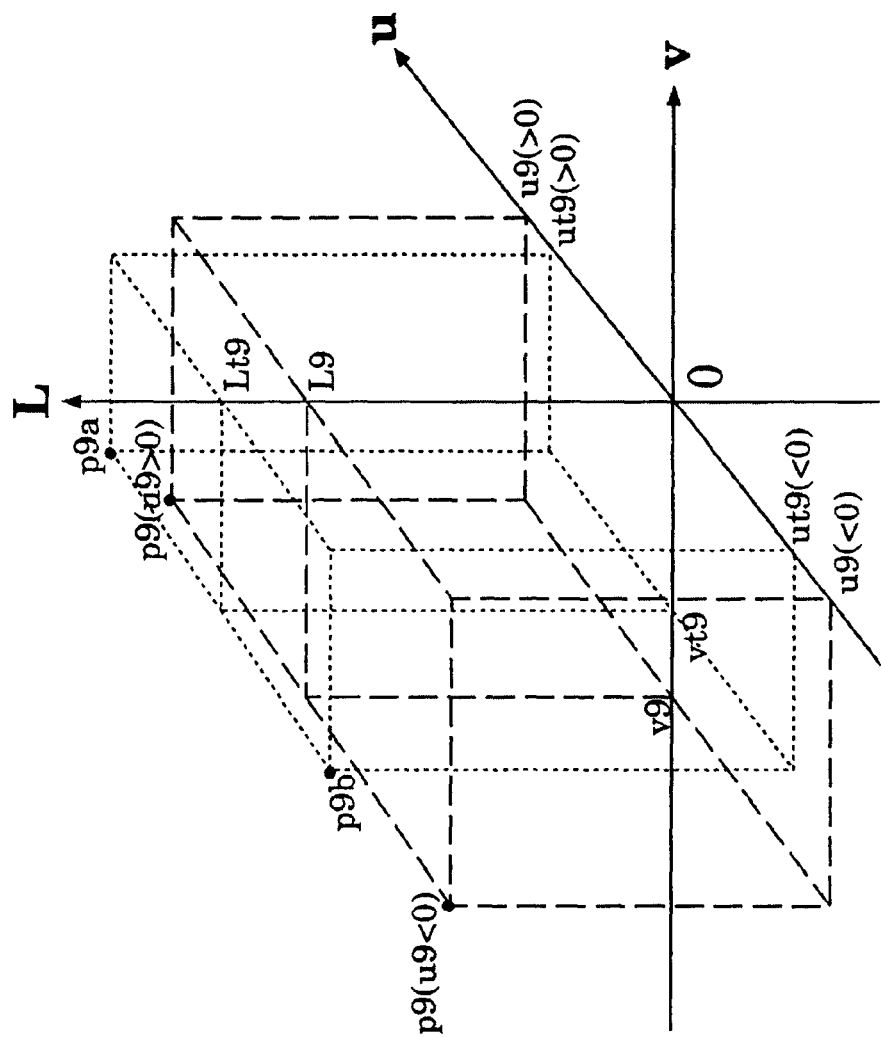
FIG. 23 shows a graph illustrating how the object pixel data are converted.

FIG. 23 shows how the specific example of the object pixel data (the pixel number 9, Luv data (L, u, v)=(L9, u9, v9), wherein v9<0) shown in FIG. 20 is converted by the conversion described above. Since how the value of 'v' and the value of 'L' are converted (the conversion from the point po (L9, v9) to the point pt (Lt9, vt9)) is already described in detail by using FIG. 22, refer to FIG. 22 and the description thereof regarding the conversion.

In FIG. 23, a position after conversion in the case where u9 is positive (>0) is shown as a point p9a (Lt9, ut9, vt9), and a position after conversion in the case where the u9 is 0 or smaller (0 or <0) is shown as a point p9b (Lt9, ut9, vt9). In FIG. 23, the ut9 of the point p9a equals u9−(Lt9−L9), and the ut9 of the point p9b equals u9+(Lt9−L9).

Thus, by calculating the 'u' coordinate after conversion by using the formula (45) or (46), it is possible to suppress a great change in hue before and after conversion (The conversion does not give to the user an impression of a great change in tone before and after conversion.).

(In the Case where 'v' is 0)

The conversion part 44 not having determined that the value (vi) of 'v' is greater than 0 further determines whether or not the value (vi) of 'v' is smaller than 0, and when not determining the value (vi) of 'v' to be smaller than 0 (That is, the vi is 0.), the conversion part 44 transmits the unchanged Luv data (L, u, v)=(Li, ui, vi) related to the object pixel data to the data storage part 42 as the data (Lt, ut, vt) after conversion to cause the data storage part 42 to store the Luv data (That is, in the case where the vi is 0, the Luv data (Li, ui, vi) is not changed.). The order of causing the data storage part 42 to store the data after conversion (Lt, ut, vt) is the same as the order of the pixel data included in the Luv image data stored by the data storage part 42 (That is, the data after conversion (Lt, ut, vt) is stored unchanged in the data storage part 42 exactly in the order of the original pixel data included in the Luv image data stored by the data storage part 42. In addition, a storage area where the data after conversion (Lt, ut, vt) is stored by the data storage part 42 differs from the storage area of the original pixel data included in the Luv image data.).

Then, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

As mentioned above, when the readout instruction signal for instructing the readout and transmission of the one piece of unread pixel data among the pixel data included in the Luv image data stored by the data storage part 42 is received from the conversion part 44, the object image data extraction part 43 accesses the data storage part 42 to read out and acquire one by one the unread pixel data among the pixel data included in the Luv image data stored by the data storage part 42, and then transmits the read and acquired one piece of pixel data to the conversion part 44. Accordingly, the pixel data transmitted to the conversion part 44 is processed as the object pixel data, and the pixel data included in the Luv image data stored by the data storage part 42 are processed one by one.

The object image data extraction part 43 having received the readout instruction signal from the conversion part 44 accesses the data storage part 42, and when it is determined that there is no unread pixel data among the pixel data included in the Luv image data stored in the data storage part 42 (that is, all the pixel data have been read out and there is no unread pixel data), the object image data extraction part 43 transmits a startup signal to the reading part 48.

The reading part 48 having received the startup signal from the object image data extraction part 43 accesses the data storage part 42 to read out and acquire all the ('n' pieces of) data (Lt, ut, vt) after conversion stored by the data storage part 42, and then transmits all the ('n' pieces of) read and acquired data (Lt, ut, vt) after conversion to the color space inverse transform part 51. Then, the reading part 48 accesses the data storage part 42, and erases the memory of the data storage part 42.

The color space inverse transform part 51 having received all the ('n' pieces of) data (Lt, ut, vt) after conversion from the reading part 48 (data processing part 41) converts all the ('n' pieces of) data after conversion (Lt, ut, vt) indicated as the data in the Luv color space into RGB image data. The conversion from the data (Lt, ut, vt) in the Luv color space into the RGB image data is performed by converting all the ('n' pieces of) pixel data of the data (Lt, ut, vt) after conversion into the RGB image data (Each of the 'n' pieces of pixel data is converted.). Since such a conversion method is known, the description thereof is omitted here.

The color space inverse transform part 51 having converted all the 'n' pieces of data after conversion (Lt, ut, vt) into the RGB image data transmits the 'n' pieces of converted RGB image data to the output part 61.

The output part 61 having received the 'n' pieces of converted RGB image data from the color space inverse transform part 51 displays an image on the display part 15 based on the RGB image data.

Subsequently, the operation of the present device 11 is described.

Figure 24:
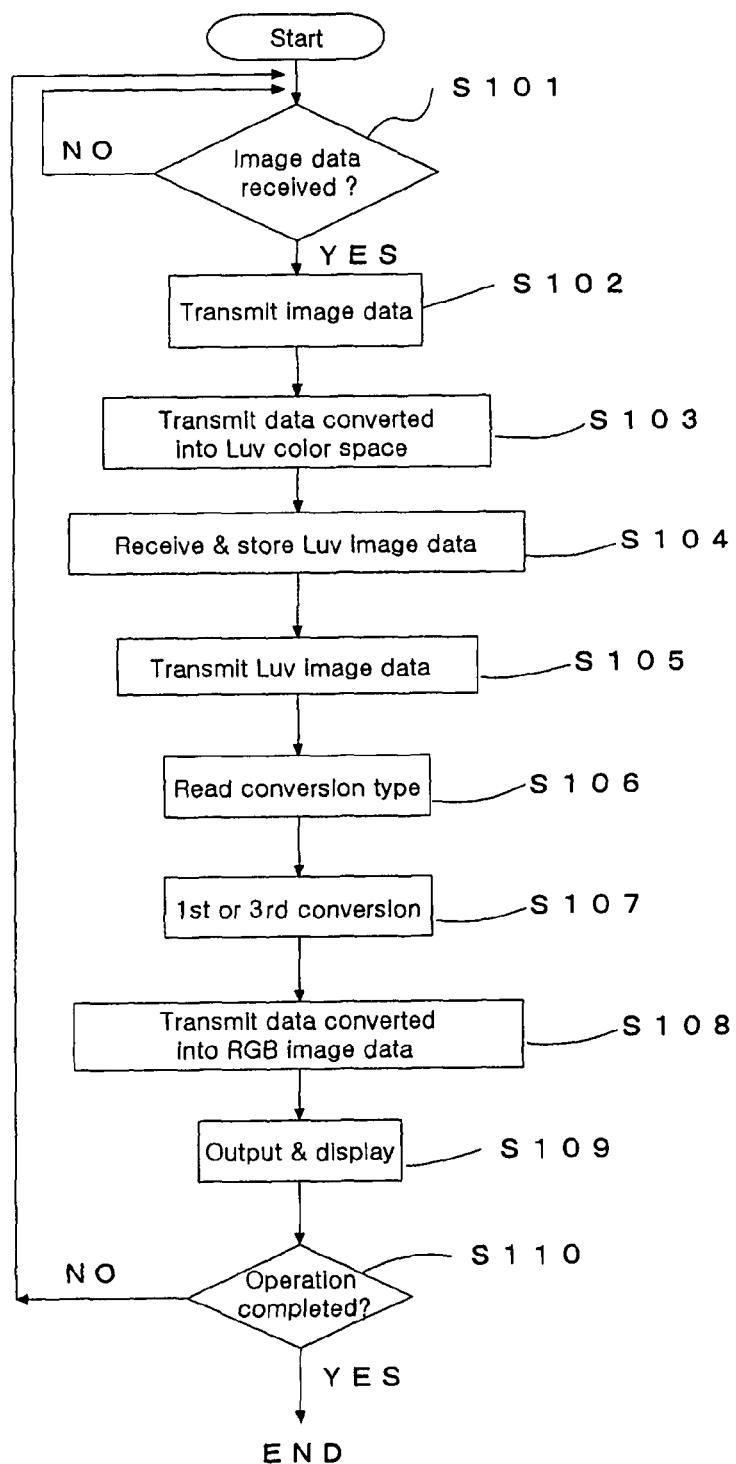
FIG. 24 shows a flowchart illustrating operations of the present device.

FIG. 24 is a flowchart for explaining the operation of the present device 11. The operation of the present device 11 is described with reference to FIG. 24.

First, the reception part 21 determines whether or not image data is received from the digital camera part 13 (S101), and when it is determined that the image data is received (YES), the reception part 21 transmits the received image data to the color space conversion part 31 (S102). When the reception part 21 does not determine in S101 that image data is received (NO), the operation returns to S101 again.

The color space conversion part 31 having received the RGB image data transmitted from the reception part 21 in S102 converts the RGB image data into Luv image data, and then transmits the converted Luv image data to the data processing part 41 (S103).

In S103, the data storage part 42 of the data processing part 41 receives the Luv image data transmitted from the color space conversion part 31, and the data storage part 42 having received the Luv image data stores the received Luv image data (S104). After S104, the data storage part 42 transmits the received Luv image data to the conversion part 44 (S105).

The conversion part 44 having received the Luv image data transmitted from the data storage part 42 in S105 accesses the conversion type storage part 45 to read out the conversion type stored in the conversion type storage part 45 (S106), determines whether either the first conversion (for protan and deutan) or the third conversion (for tritan) is specified, and then performs the conversion which is determined to be specified (specifically, either the first conversion (for protan and deutan) or the third conversion (for tritan)) (S107). The operation of the conversion (the first conversion (for protan and deutan) or the third conversion (for tritan)) in S107 is to be described in detail later.

All ('n' pieces) of data (Lt, ut, vt) subjected to the conversion (first conversion (for protan and deutan) or the third conversion (for tritan)) in S107 are transmitted from the reading part 48 of the data processing part 41 to the color space inverse transform part 51. The color space inverse transform part 51 having received all the ('n' pieces of) data (Lt, ut, vt) after conversion converts all the ('n' pieces of) data after conversion (Lt, ut, vt) indicated as data in the Luv color space into RGB image data, and then transmits the 'n' pieces of converted RGB image data to the output part 61 (S108).

The output part 61 having received the 'n' pieces of converted RGB image data transmitted from the color space inverse transform part 51 in S108 displays an image on the display part 15 based on the RGB image data (S109).

After S109, it is determined whether or not the operation is completed (S110). When it is determined that the operation is completed (YES), the operation ends (END), and when it is not determined that the operation is completed (NO), the operation returns to S101 again.

Figure 25:
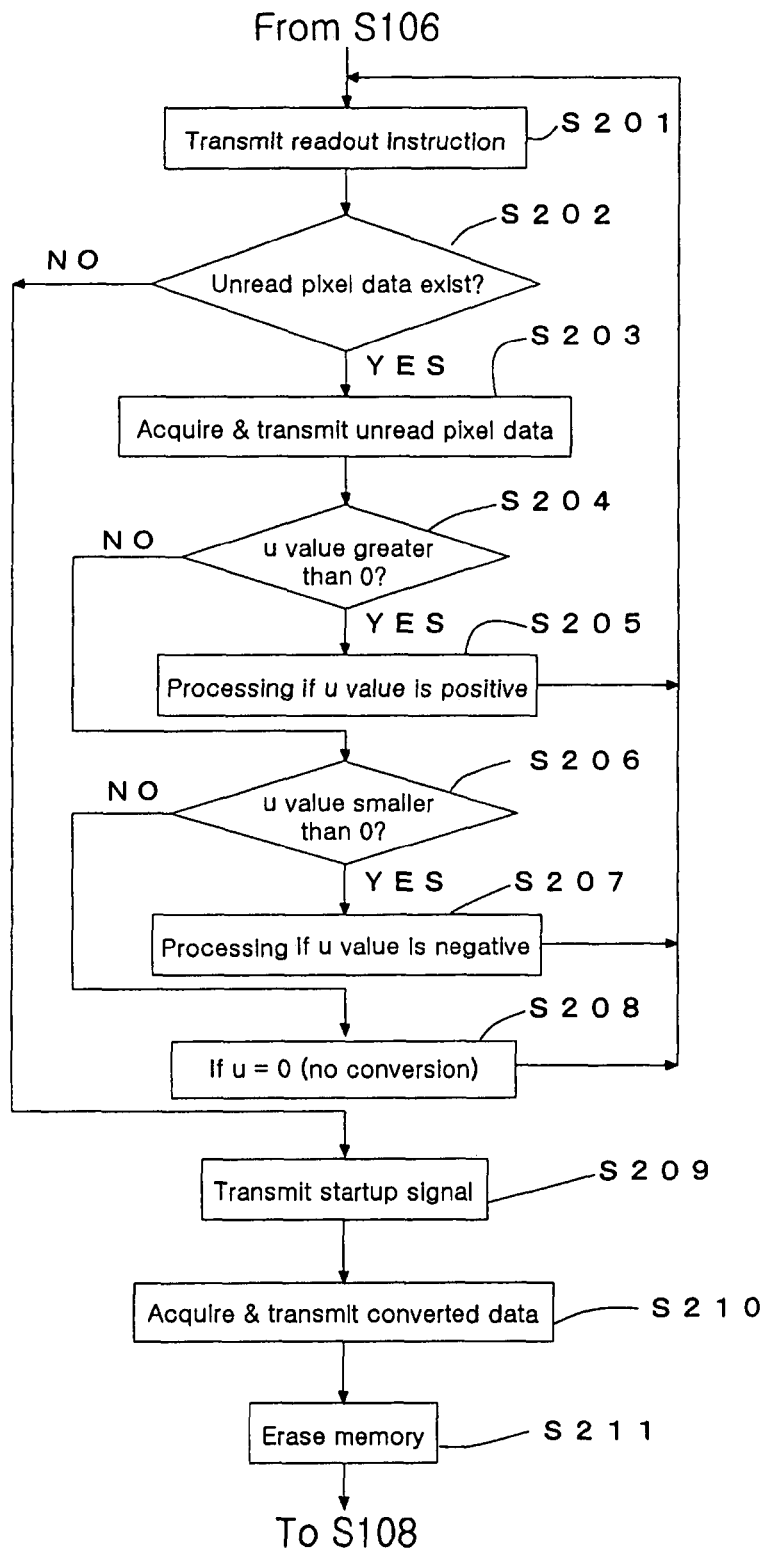
FIG. 25 shows a flowchart illustrating operations in S107 when the first conversion (for protan and deutan) is determined to be assigned in S106.

FIG. 25 is a flowchart for explaining an operation performed when it is determined that the first conversion (for protan and deutan) is specified in S106 in the operation of S107. The operation of the present device 11 (particularly data processing part 41) in S107 related to the first conversion (for protan and deutan) is described with reference to FIG. 25.

The conversion part 44 having determined that the first conversion (for protan and deutan) is specified transmits a readout instruction signal to the object image data extraction part 43 for instructing the object image data extraction part 43 to read out one piece of unread pixel data among the pixel data included in the Luv image data stored by the data storage part 42, and transmits the one piece of pixel data to the object image data extraction part 43 (S201).

The object image data extraction part 43 having received the readout instruction signal transmitted from the conversion part 44 in S201, accesses the data storage part 42 to determine whether or not there exists unread pixel data among the pixel data included in the Luv image data stored by the data storage part 42 (S202). When the object image data extraction part 43 determines that there exists the pixel data which is not yet read in S202 (YES), the object image data extraction part 43 reads out and acquires one piece of unread pixel data among the pixel data included in the Luv image data stored by the data storage part 42, and then transmits the read and acquired pixel data from the data storage part 42 to the conversion part 44 (S203. The pixel data which is transmitted from the object image data extraction part 43 to the conversion part 44 and to be processed thereinafter is referred to as "object pixel data".). On the other hand, when the object image data extraction part 43 does not determine in S202 that there exists unread pixel data (NO), the object image data extraction part 43 transmits a startup signal to the reading part 48 (S209).

The conversion part 44 having received the object pixel data transmitted from the object image data extraction part 43 in S203 determines whether or not the value (ui) of 'u' of the Luv data included in the object pixel data (the pixel number 'i', Luv data (L, u, v)=(Li, ui, vi)) is greater than 0 (S204), and performs the "processing in the case where the 'u' is positive" (S205) when the value (ui) of 'u' is determined to be greater (YES). The operation of the "processing in the case where the 'u' is positive" in S205 is to be described later in detail.

When the conversion part 44 does not determine in S204 that the value (ui) of 'u' of the Luv data included in the object pixel data is greater than 0 (NO), the conversion part 44 determines whether or not the value (ui) of 'u' of the Luv data is smaller than 0 (S206), and performs the "processing in the case where the 'u' is negative" (S207) when the value (ui) of 'u' is determined to be smaller (YES). The operation of the "processing in the case where the 'u' is negative" in S207 is to be described later in detail.

When the conversion part 44 does not determine that the value (ui) of 'u' of the Luv data included in the object pixel data is smaller than 0 in S206 (NO. That is, the value (ui) of 'u' is 0 in this case.), the conversion part 44 performs the "processing in the case where the 'u' is 0" (S208). The operation of the "processing in the case where the 'u' is 0" in S208 is to be described later in detail.

As described above, when the object image data extraction part 43 does not determine in S202 that there exists pixel data which is not yet read out (NO), the object image data extraction part 43 transmits the startup signal to the reading part 48 in S209. The reading part 48 having received the startup signal sent in S209 accesses the data storage part 42 to read out and acquire all the ('n' pieces of) data (Lt, ut, vt) after conversion stored in the data storage part 42, and transmits all the ('n' pieces of) read and acquired data (Lt, ut, vt) after conversion to the color space inverse transform part 51 (S210). After S210, the reading part 48 accesses the data storage part 42, and erase the memory of the data storage part 42 (S211). After S211, the operation proceeds to S108.

Figure 26:
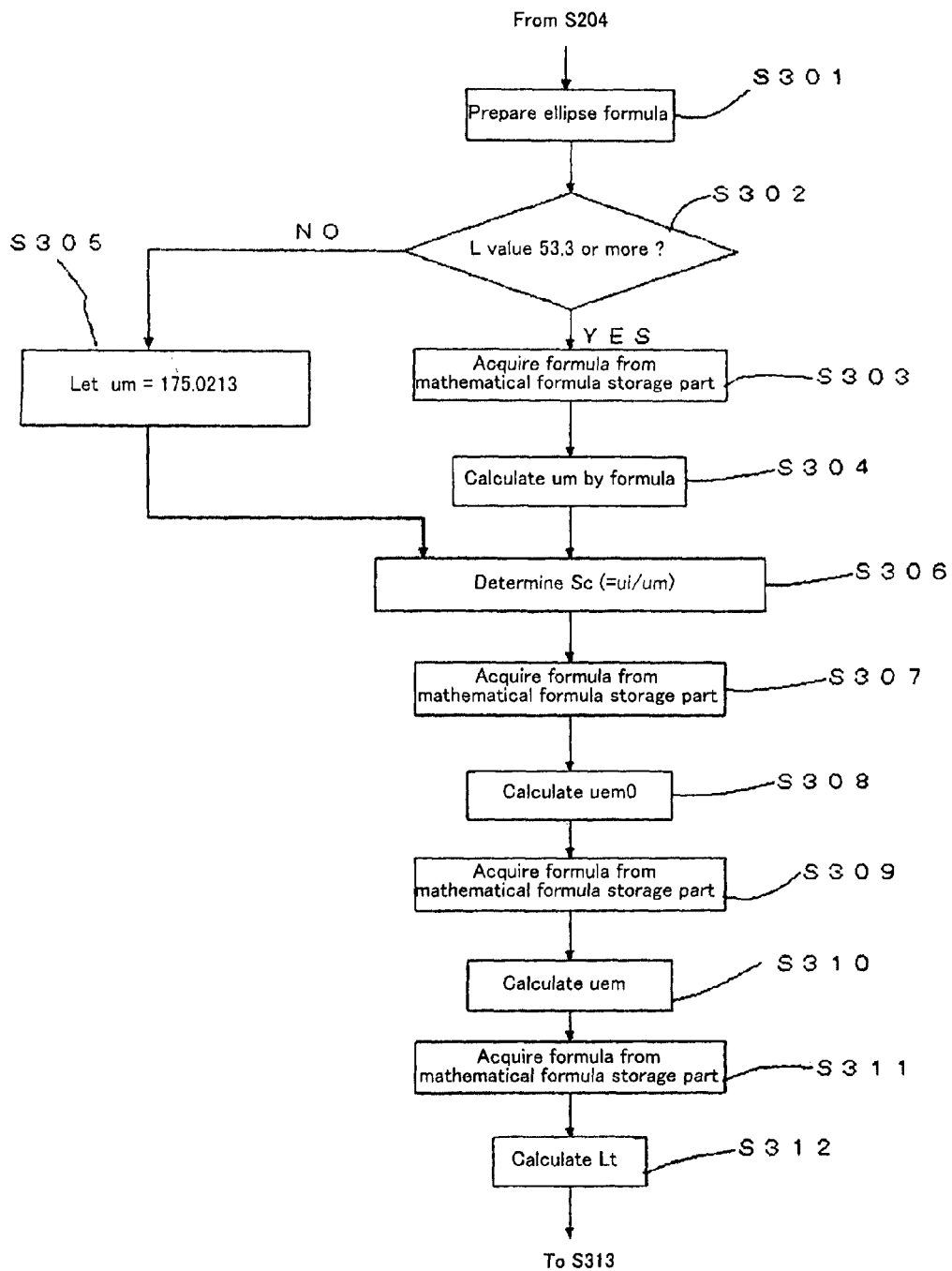
FIG. 26 shows a flowchart illustrating operations of "processing in the case that 'u' is positive" in S205.

FIG. 26 is a flowchart for explaining the operation of the above "processing in the case where the 'u' is positive" in S205. The operation of the "processing in the case where the 'u' is positive" in S205 is described with reference to FIG. 26.

The conversion part 44 having determined in S204 that the value (ui) of 'u' of the Luv data included in the object pixel data is greater than 0 (YES) prepares formulae (specifically, the above formulae (1) and (1.1)) of an ellipse in the two orthogonal axes of 'u' and 'L' axes by using a numeric value Li of 'L' included in the Luv data (L, u, v)=(Li, ui, vi) of the object pixel data (S301). When the conversion part 44 prepares the formulae of the ellipse, the conversion part 44 accesses the parameter storage part 46 to read out and acquire a value of Pumax suitably from the parameter storage part 46.

Next, the conversion part 44 determines whether or not the value (Li) of 'L' of the Luv data included in the object pixel data (the pixel number 'i', Luv data (L, u, v)=(Li, ui, vi)) is 53.3 or greater (S302), when the value (Li) of 'L' is determined to be 53.3 or greater (YES), the conversion part 44 accesses the mathematical formula storage part 47 to read out and acquire the above formula (2) from the mathematical formula storage part 47 (S303). Then, the conversion part 44 calculates a value of 'u' by substituting the value (Li) of 'L' of the object pixel data for the value of 'L' in the formula (2) acquired in S303 (S304), and stores the calculated value of 'u' (the maximum value of 'u' which the display can display in the value (Li) of 'L') as a first reference value um.

On the other hand, when the conversion part 44 does not determine in S302 that the value (Li) of 'L' of the Luv data included in the object pixel data (the pixel number 'i', Luv data (L, u, v)=(Li, ui, vi)) is 53.3 or greater (NO), the conversion part 44 stores 175.0213 as the first reference value um (S305).

After S304 or S305, the conversion part 44 determines the ratio Sc (=ui/um) of the value ui of 'u' of the Luv data included in the object pixel data (the pixel number 'i', Luv data (L, u, v)=(Li, ui, vi)) to the first reference value um determined in S304 or S305 (S306).

After S306, the conversion part 44 accesses the mathematical formula storage part 47 to read out and acquire the formula (4) from the mathematical formula storage part 47 (S307), and further reads out and acquires the value of Pumax from the parameter storage part 46, and then calculates uem0 (S308). The value uem0 is the 'u' coordinate of a point (Lm0, uem0) existing within the area which the display can display among points on the elliptic circumference of the ellipse represented by the formula (3), and having the maximum value of 'L' as described above.

After S308, the conversion part 44 accesses the mathematical formula storage part 47 to read out and acquire the formula (5) from the mathematical formula storage part 47 (S309), and then calculates uem by substituting uem0 calculated in S308 and the value (Li) of 'L' of the Luv data included in the object pixel data into the formula (5) acquired in S309 (s310).

After S310, the conversion part 44 accesses the mathematical formula storage part 47 to read out and acquire the formula (9) from the mathematical formula storage part 47 (S311), and further reads out and acquires a value of Pumax from the parameter storage part 46. Then, the conversion part 44 determines the value (Lt) of 'L' of the Luv data after the first conversion (for protan and deutan) of the object pixel data by substituting the value (Li) of 'L' of the Luv data included in the object pixel data, Sc calculated in S306, and uem0 calculated in S308 into the formula (9) acquired in S311 (S312).

Figure 27:
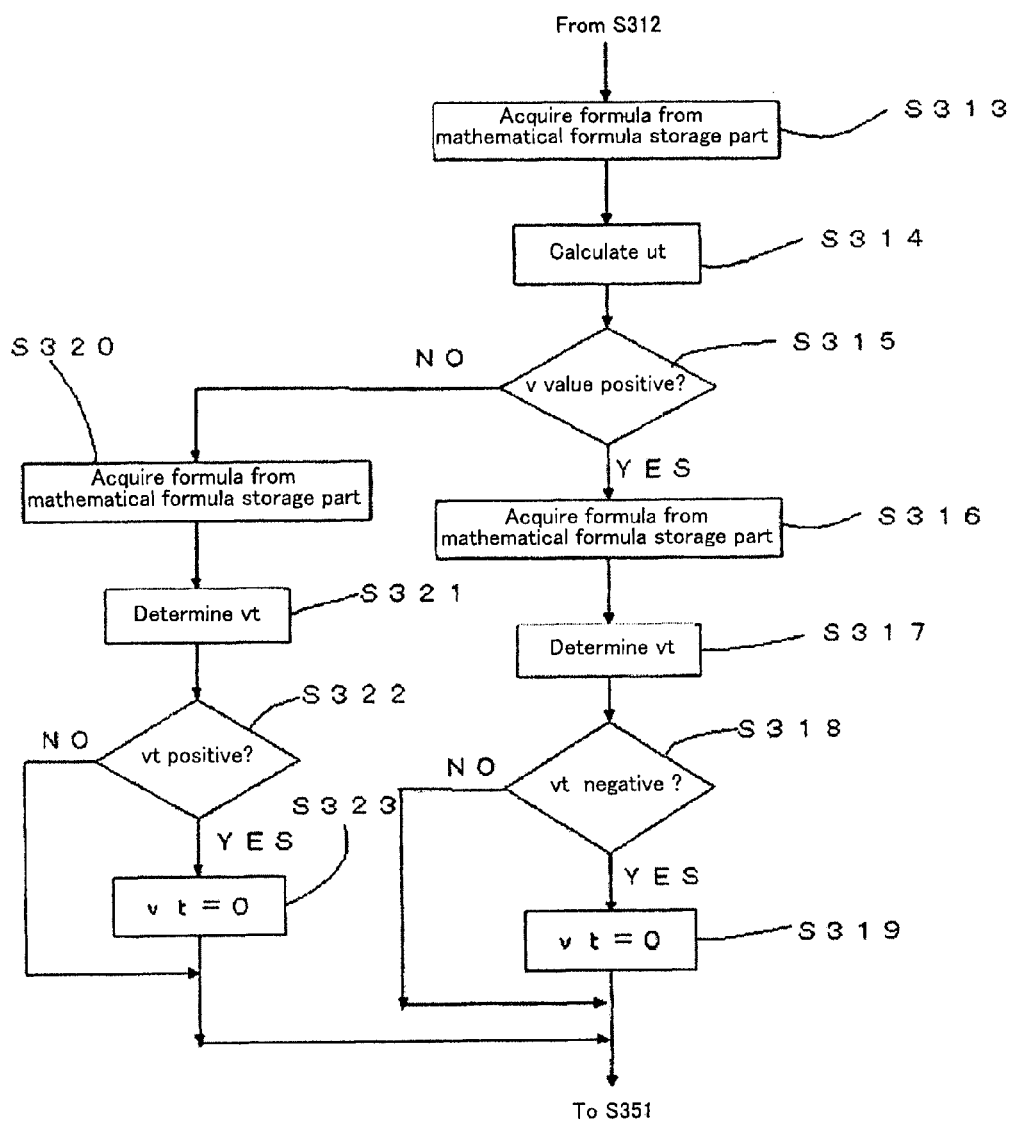
FIG. 27 shows a flowchart illustrating operations in S313 and later among the operations of "processing in the case that 'u' is positive" in S205.

FIG. 27 is a flowchart for explaining an operation after S313 in the operation of the "processing in the case where the 'u' is positive" in S205. The operation of the "processing in the case where 'u' is positive" after S313 is described with reference to FIG. 27.

After calculating the value (Lt) of 'L' in S312, the conversion part 44 accesses the mathematical formula storage part 47 to read out and acquire the above formula (10) from the mathematical formula storage part 47 (s313), and further reads out and acquires a value of Pumax from the parameter storage part 46. Then, the conversion part 44 determines the value (ut) of 'u' of the Luv data after the first conversion (for protan and deutan) of the object pixel data by substituting the value (Lt) of 'L' calculated in s312, and the value (Li) of 'L' of the Luv data included in the object pixel data into the formula (10) (S314).

After S314, the conversion part 44 determines whether or not the value vi of 'v' of the Luv image data (L, u, v)=(Li, ui, vi) of the object pixel data is positive (S315), and when the vi is positive (>0) (YES), the conversion part 44 accesses the mathematical formula storage part 47 to read out and acquire the above formula (11) from the mathematical formula storage part 47 (S316). Then, the conversion part 44 determines a vt value by substituting the value vi of 'v' and the value Li of 'L' of the Luv image data (Li, ui, vi) of the object pixel data, and Lt calculated in S312 into the formula (11) (S317). Thereinafter, the conversion part 44 determines whether or not the value of the value (vt) of 'v' calculated in S317 is negative (vt<0) (S318), and sets 0 to vt (vt=0) when it is determined that the value (vt) of 'v' is negative (YES) (S319). When the conversion part 44 does not determine that the value of value (vt) of 'v' calculated in S317 is negative (vt<0) in S318 (NO), the conversion part 44 leaves the value (vt) of 'v' calculated in S317 as is (without changing the value (vt) of 'v').

On the other hand, when the conversion part 44 does not determine in S315 that the value vi of 'v' of the Luv image data (L, u, v)=(Li, ui, vi) of the object pixel data is positive (>0) (NO. That is, the vi is 0 or smaller (0 or <0)), the conversion part 44 accesses the mathematical formula storage part 47 to read out and acquire the formula (12) from the mathematical formula storage part 47 (S320), and determines a vt value by substituting the value vi of 'v' and the value Li of 'L' of the Luv image data (Li, ui, vi) of the object pixel data, and Lt calculated in S312 into the formula (12) (S321). Thereinafter, the conversion part 44 determines whether or not the value (vt) of 'v' calculated in S321 is positive (vt>0) (S322), and sets 0 to vt (vt=0) when the value (vt) of 'v' is determined to be positive (YES) (S323). When the conversion part 44 does not determine that the value (vt) of 'v' calculated in S321 is positive (vt>0) in S322 (NO), the conversion part 44 leaves the value (vt) of 'v' calculated in S321 as it is (without changing the value (vt) of 'v').

Figure 28:
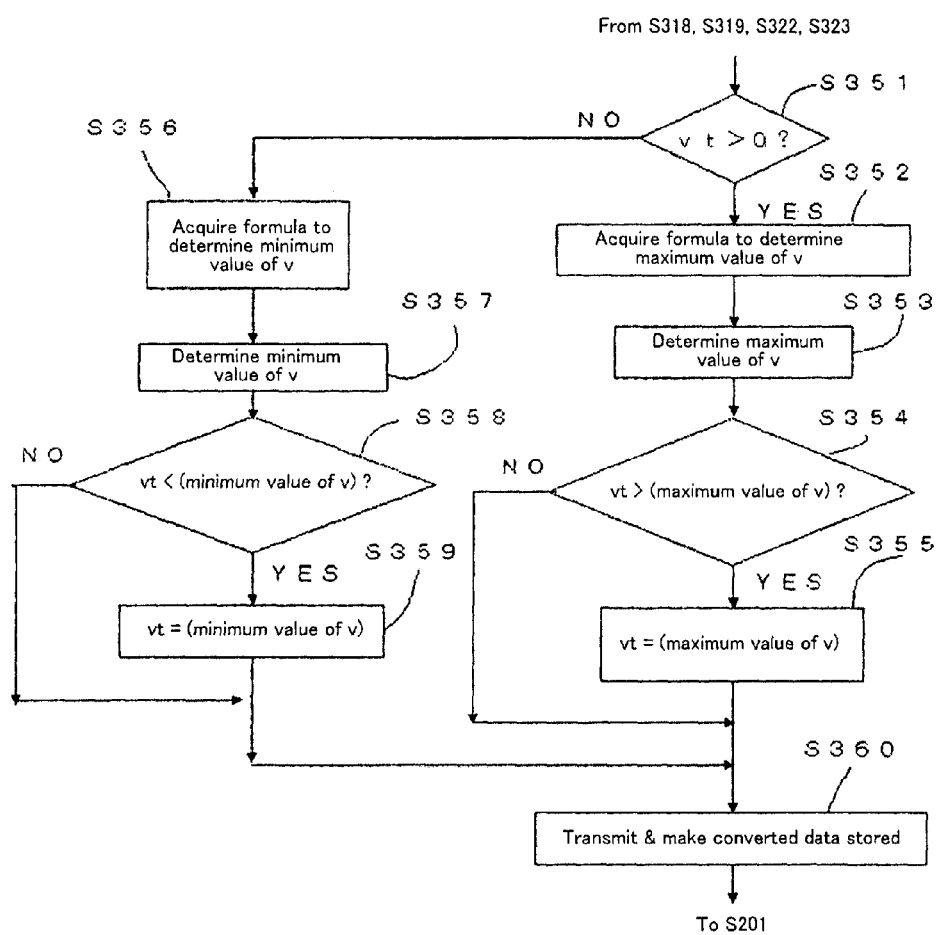
FIG. 28 shows a flowchart illustrating operations in S351 and later among the operations of "processing in the case that 'u' is positive" in S205.

FIG. 28 is a flowchart for explaining an operation after S351 in the operation of the "processing in the case where the 'u' is positive" in S205. The operation of the "processing in the case where the 'u' is positive" after S351 is described with reference to FIG. 28.

After the value (vt) of 'v' is determined as described above (after one of the cases of S319, the value (vt) of 'v' being not determined to be negative (vt<0) in S318, S323, or the value (vt) of 'v' being not determined to be positive (vt>0) in S322), the conversion part 44 determines whether or not the value (vt) of 'v' is greater than 0 (vt>0) (S351), and when the value (vt) of 'v' is determined to be greater than 0 (vt>0) (YES), the conversion part 44 accesses the mathematical formula storage part 47 to read out and acquire the formula for determining the maximum value of 'v' in L=Lt from the mathematical formula storage part 47 (S352). Specifically, one of the formulae in FIG. 11 is read out and acquired, that is, the formula of v1 when Lt is 0 or greater and smaller than 87.8 ($0 \leq Lt < 87.8$); the formula of v2 when Lt is 87.8 or greater and smaller than 97.0 ($87.8 \leq Lt < 97.0$); and the formula of v3 when Lt is 97.0 or greater and 100 or smaller ($97.0 \leq Lt \leq 100$). The formula read and acquired in S352 is used and Lt is substituted for 'L' of the formula to obtain the maximum value of 'v' (S353). Then, it is determined whether or not the vt is greater than the maximum value of 'v' calculated in S353 (S354), and when the vt is determined to be greater than the maximum value of 'v' (YES), the maximum value of 'v' determined in S353 is set to the vt (S355). When it is not determined that the vt is greater than the maximum value of 'v' in S354, the vt is not changed (NO).

On the other hand, when it is not determined that the vt is greater than 0 (vt>0) in S351 (NO), the conversion part 44 accesses the mathematical formula storage part 47 to read out and acquire the formula for determining the minimum value of 'v' at L=Lt from the mathematical formula storage part 47 (S356). Specifically, one of the formulae in FIG. 11 is read out and acquired in S356, that is, the formula of v4 when the Lt is greater than 60.4 and 100 or smaller ($60.4 < Lt \leq 100$); the formula of v5 when the Lt is greater than 32.4 and 60.4 or smaller ($32.4 < Lt \leq 60.4$); and the formula of v6 when the Lt is 0 or greater and 32.4 or smaller ($0 \leq Lt \leq 32.4$). The formula read out and acquired in S356 is used to determine the minimum value of 'v' by substituting the Lt for 'L' of the formula (S357). Then, it is determined whether or not the vt is smaller than the minimum value of 'v' calculated in S357 (S358), and when the vt is determined to be smaller than the minimum value of "v" (YES), the minimum value of "v" determined in S357 is set to the vt (S359). When it is not determined that the vt is smaller than the minimum value of 'v' in s358 (NO), the vt is not changed.

The Luv data (Li, ui, vi) included in the object pixel data (the pixel number 'i', Luv data (L, u, v)=(Li, ui, vi)) is converted into the data after conversion (Lt, ut, vt), as described above.

Then, the conversion part 44 transmits the data after conversion (Lt, ut, vt) to the data storage part 42 to cause the data storage part 42 to store the data after conversion (S360).

Thus, the operation of the "processing in the case where the 'u' is positive" in S205 relating to one object pixel data ends.

Returning to S201 after S360, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

Figure 29:
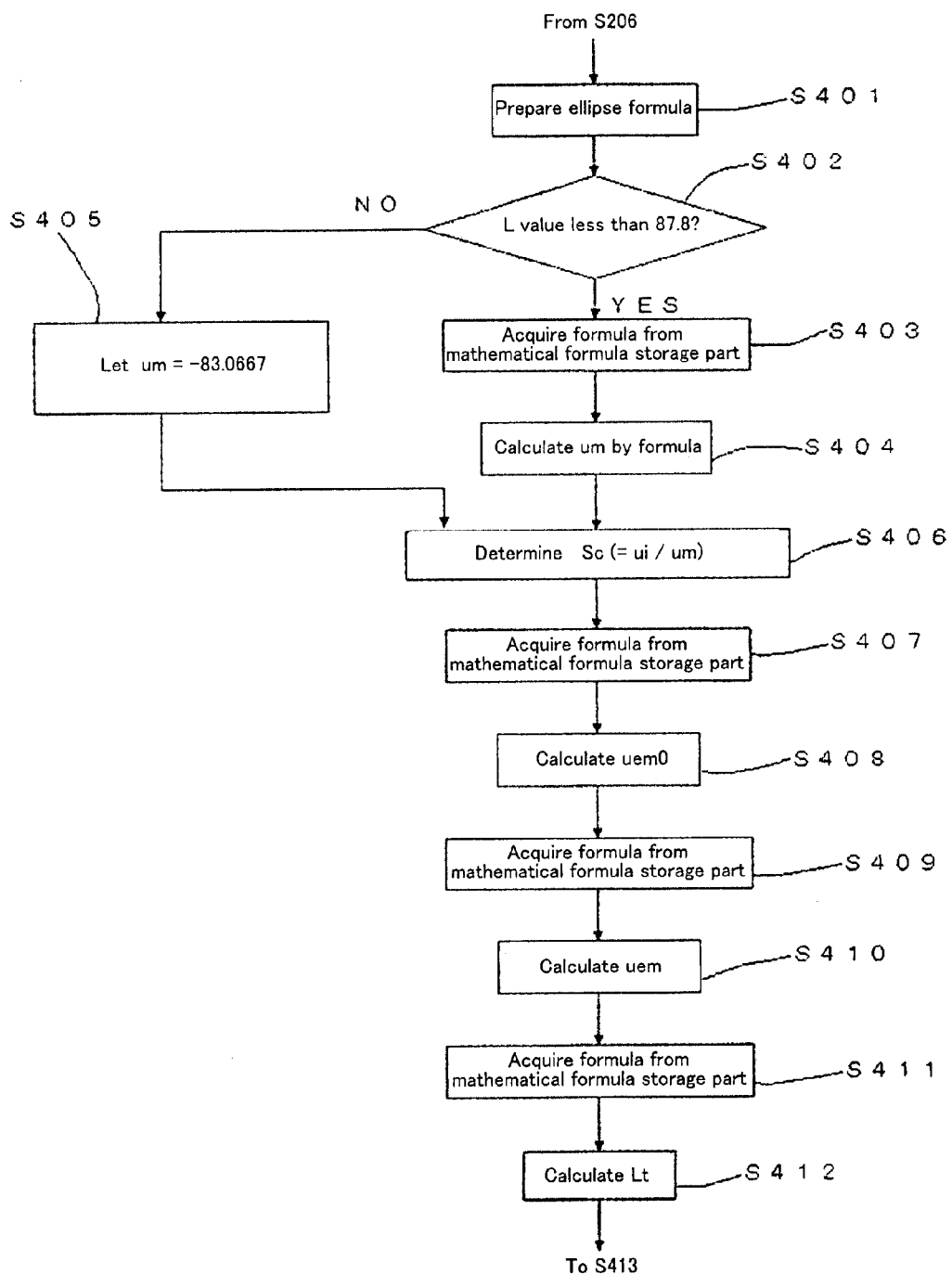
FIG. 29 shows a flowchart illustrating operations of "processing in the case that 'u' is negative" in S207.

FIG. 29 is a flowchart for explaining the operation of the "processing in the case where the 'u' is negative" in S207. The operation of the "processing in the case where the 'u' is negative" in S207 is described with reference to FIG. 29.

The conversion part 44 having determined that the value (ui) of 'u' of the Luv data included in the object pixel data is smaller than 0 (YES) in S206 prepares the formula (specifically the formulae (13) and (13.1)) of the ellipse in the two orthogonal axes of 'u' and 'L' axes by using the numeric value Li of 'L' included in the Luv data (L, u, v)=(Li, ui, vi) of the object pixel data (S401). When the conversion part 44 prepares the formula of the ellipse, the conversion part 44 accesses the parameter storage part 46 to read out and acquire a value of Pumin suitably from the parameter storage part 46.

Next, the conversion part 44 determines whether or not the value (Li) of 'L' of the Luv data included in the object pixel data (the pixel number 'i', Luv data (L, u, v)=(Li, ui, vi)) is smaller than 87.8 (S402). When it is determined that the value (Li) of 'L' is smaller than 87.8 (YES), the conversion part 44 accesses the mathematical formula storage part 47 to read out and acquire the formula (14) from the mathematical formula storage part 47 (S403). Then, the conversion part 44 calculates a value of 'u' by substituting the value (Li) of 'L' of the object pixel data for the value of 'L' in the formula (14) acquired in S403 (S404), and stores the calculated value of 'u' (the minimum value of 'u' which the display can display in the value (Li) of 'L') as the first reference value um.

On the other hand, when the conversion part 44 determines in S402 that the value (Li) of 'L' of the Luv data included in the object pixel data (the pixel number 'i', Luv data (L, u, v)=(Li, ui, vi)) is not smaller than 87.8 (NO), the conversion part 44 stores −83.0667 (the minimum value 'u' which the display can display) as the first reference value um (S405).

After S404 or S405, the conversion part 44 determines the ratio Sc (=ui/um) of the value ui of 'u' of the Luv data included in the object pixel data (the pixel number 'i', Luv data (L, u, v)=(Li, ui, vi)) to the first reference value um determined in S404 or S405 (S406).

After S406, the conversion part 44 accesses the mathematical formula storage part 47 to read out and acquire the formula (16) from the mathematical formula storage part 47 (S407) and further reads out and acquires the value of Pumin from the parameter storage part 46, and then calculates uem0 (S408). As mentioned above, uem0 is the 'u' coordinate of the point (Lm0, uem0) existing within the area which the display can display among the points on the elliptic circumference of the ellipse represented by the formula (15), and having the minimum value of 'L'.

After S408, the conversion part 44 accesses the mathematical formula storage part 47 to read out and acquire the formula (17) from the mathematical formula storage part 47 (S409), and then calculates uem by substituting uem0 calculated in S408 and the value (Li) of 'L' of the Luv data included in the object pixel data into the formula (17) acquired in S409 (S410).

After S410, the conversion part 44 accesses the mathematical formula storage part 47 to read out and acquire the formula (20) from the mathematical formula storage part 47 (S411), and further reads out and acquires the value of Pumin from the parameter storage part 46. Then, the conversion part 44 determines the value (Lt) of 'L' of the Luv data after the first conversion (for protan and deutan) of the object pixel data by substituting the value (Lt) of 'L' of the Luv data included in the object pixel data, Sc calculated in S406, and uem0 calculated in S408 into the formula (20) acquired in S411 (S412).

Figure 30:
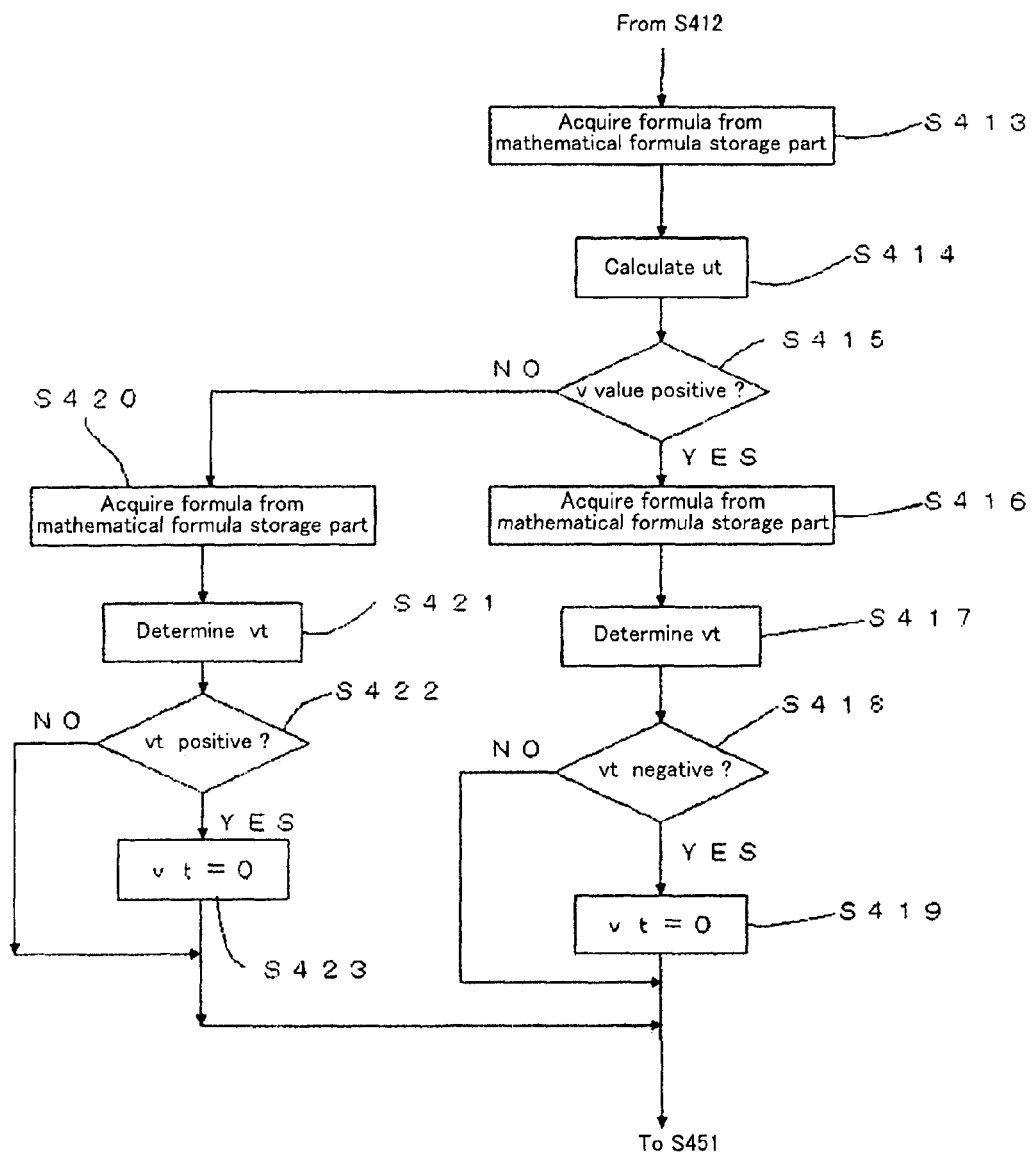
FIG. 30 shows a flowchart illustrating operations in S413 and later among the operations of "processing in the case that 'u' is negative" in S207.

FIG. 30 is a flowchart for explaining an operation after S413 in the operation of the "processing in the case where the 'u' is negative" in S207. The operation of the "processing in the case where the 'u' is negative" after S413 is described with reference to FIG. 30.

After calculating the value (Lt) of 'L' in S412, the conversion part 44 accesses the mathematical formula storage part 47 to read out and acquire the formula (21) from the mathematical formula storage part 47 (S413), and further reads out and quires the value of Pumin from the parameter storage part 46. Then, the conversion part 44 determines the value (ut) of 'u' of the Luv data after the first conversion (for protan and deutan) of the object pixel data by substituting the value (Lt) of 'L' calculated in S412 and the value (Li) of 'L' of the Luv data included in the object pixel data into the formula (21) (S414).

After S414, the conversion part 44 determines whether or not the value vi of 'v' of the Luv image data (L, u, v)=(Li, ui, vi) of the object pixel data is positive (S415), and when the vi is positive (>0) (YES), the conversion part 44 accesses the mathematical formula storage part 47 to read out and acquire the formula (22) from the mathematical formula storage part 47 (S416). Then, the conversion part 44 determines a value of vt by substituting the value vi of 'v' and the value Li of 'L' of the Luv image data (Li, ui, vi) of the object pixel data, and Lt calculated in S412 into the formula (22) (S417). Subsequently, the conversion part 44 determines whether or not the value of the value (vt) of 'v' calculated in S417 is negative (vt<0) (S418), and sets 0 to the vt (vt=0) when it is determined that the value of vt is negative (YES) (S419). When the conversion part 44 does not determine that the value (vt) of 'v' calculated in S417 is negative (vt<0) in S418 (NO), the value (vt) of 'v' calculated in S417 is left as is (the value (vt) of 'v' is not changed).

On the other hand, when the conversion part 44 does not determine in S415 that the value vi of 'v' of the Luv image data (L, u, v)=(Li, ui, vi) of the object pixel data is positive (>0) (NO. That is, the vi is 0 or smaller (0 or <0).), the conversion part 44 accesses the mathematical formula storage part 47 to read out and acquire the formula (23) from the mathematical formula storage part 47 (S420), and determines a value of vt by substituting the value vi of 'v' and the value Li of 'L' of the Luv image data (Li, ui, vi) of the object pixel data, and Lt calculated in S412 into the formula (23) (S421). Subsequently, the conversion part 44 determines whether or not the value (vt) of 'v' calculated in S421 is positive (vt>0) (S422), and sets 0 to the vt (vt=0) when the value (vt) of 'v' is determined to be positive (YES) (S423). When the conversion part 44 does not determine that the value (vt) of 'v' calculated in S421 is positive (vt>0) in S422 (NO), the value (vt) of 'v' calculated in S421 is left as is (the value (vt) of 'v' is not changed).

Figure 31:
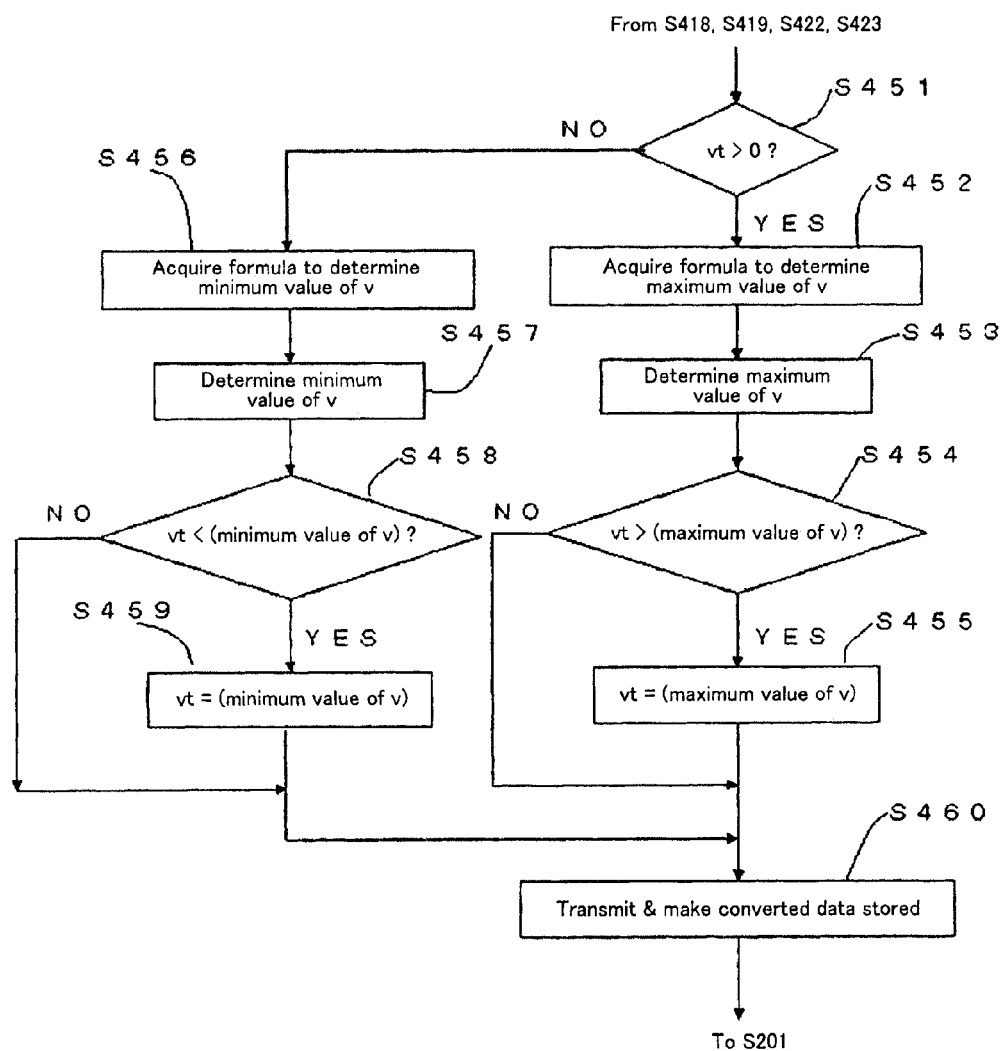
FIG. 31 shows a flowchart illustrating operations in S451 and later among the operations of "processing in the case that 'u' is negative" in S207.

FIG. 31 is a flowchart for explaining an operation after S451 in the operation of the "processing in the case where the 'u' is negative" in S207. The operation of the "processing in the case where the 'u' is negative" after S451 is described with reference to FIG. 31.

After determining the value (vt) of 'v' as mentioned above (after any one of the cases of S419; the value (vt) of 'v' being not determined to be negative (vt<0) in S418 (NO); S423; or the value (vt) of 'v' being not determined to be positive (vt>0) in S422 (NO)), the conversion part 44 determines whether or not the vt is greater than 0 (vt>0) (S451), and when the vt is determined to be greater than 0 (vt>0) (YES), the conversion part 44 accesses the mathematical formula storage part 47 to read out and acquire the formula for determining the maximum value of 'v' in L=Lt from the mathematical formula storage part 47 (S452). Specifically, one of the formulae in FIG. 11 is read out and acquired in S452, that is, the formula of v1 when the Lt is 0 or greater and smaller than 87.8 (0≦Lt<87.8); the formula of v2 when the Lt is 87.8 or greater and smaller than 97.0 (87.8≦Lt<97.0); and the formula of v3 when the Lt is 97.0 or greater and 100 or smaller (97.0≦Lt≦100). The formula read out and acquired in S452 is used to determine the maximum value of 'v' by substituting Lt for 'L' of the formula (S453). Subsequently, it is determined whether or not the vt is greater than the maximum value of 'v' calculated in S453 (S454), and when the vt is determined to be greater than the maximum value of 'v' (YES), the maximum value of 'v' determined in S453 is set to the vt (S455). When it is not determined that the vt is greater than the maximum value of 'v' in S454 (NO), the vt is not changed.

On the other hand, when it is not determined that the vt is greater than 0 (vt>0) in S451 (NO), the conversion part 44 accesses the mathematical formula storage part 47 to read out and acquire the formula for determining the minimum value of 'v' in L=Lt from the mathematical formula storage part 47 (S456). Specifically, one of the formulae in FIG. 11 is read out and acquired in S456, that is, the formula of v4 when the Lt is greater than 60.4 and 100 or smaller (60.4<Lt≦100); the formula of v5 when the Lt is greater than 32.4 and 60.4 or smaller (32.4<Lt≦60.4); or the formula of v6 when the Lt is 0 or greater and 32.4 or smaller (0≦Lt≦32.4). The formula read out and acquired in S456 is used to determine the minimum value of 'v' by substituting Lt for 'L' of the formula (S457). Subsequently, it is determined whether or not the vt is smaller than the minimum value of 'v' calculated in S457 (S458), and when it is determined that the vt is smaller than the minimum value of 'v' (YES), the minimum value of 'v' determined in S457 is set to the vt (S459). When it is not determined that the vt is smaller than the minimum value of 'v' in S458 (NO), the vt is not changed.

As described above, the Luv data (Li, ui, vi) included in the object pixel data (the pixel number 'i', Luv data (L, u, v)=(Li, ui, vi)) is converted into the data after conversion (Lt, ut, vt).

Then, the conversion part 44 transmits the data after conversion (Lt, ut, vt) to the data storage part 42 to cause the data storage part 42 to store the data after conversion (S460).

Thus, the operation of the "processing in the case where the 'u' is negative" in S207 relating to the one piece of object pixel data ends.

Returning to S201 after S460, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

Figure 32:
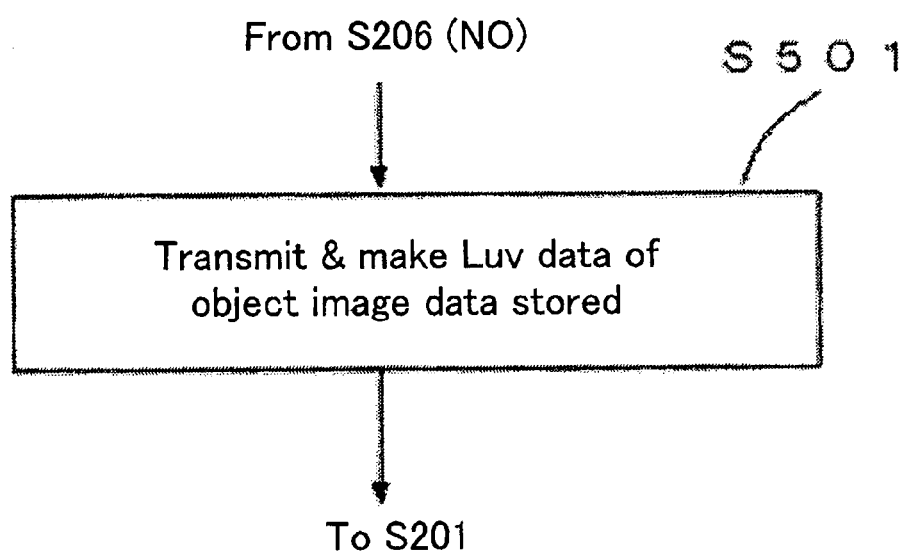
FIG. 32 shows a flowchart illustrating operations of "processing in the case that 'u' is 0" in S208.

FIG. 32 is a flowchart for explaining the operation of the "processing in the case where the 'u' is 0" in S208. The operation of the "processing in the case where the 'u' is 0" in S208 is described with reference to FIG. 32.

When the conversion part 44 does not determine that the value (ui) of 'u' of the Luv data included in the object pixel data is smaller than 0 in S206 (NO. That is, the value (ui) of 'u' is 0 in this case.), the conversion part 44 transmits, without any change, the Luv data (L, u, v)=(Li, ui, vi) related to the object pixel data to the data storage part 42 as the data (Lt, ut, vt) after conversion, and causes the data storage part 42 to store the Luv data (S501). That is, when the value (ui) of 'u' is 0, the unchanged Luv data (Li, ui, vi) of the object pixel data is stored in the data storage part 42 as the data (Lt, ut, vt) after conversion.

Thereby, the operation of the "processing in the case where the 'u' is 0" in S208 relating to the one piece of object pixel data ends.

Returning to S201 after S501, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

Figure 33:
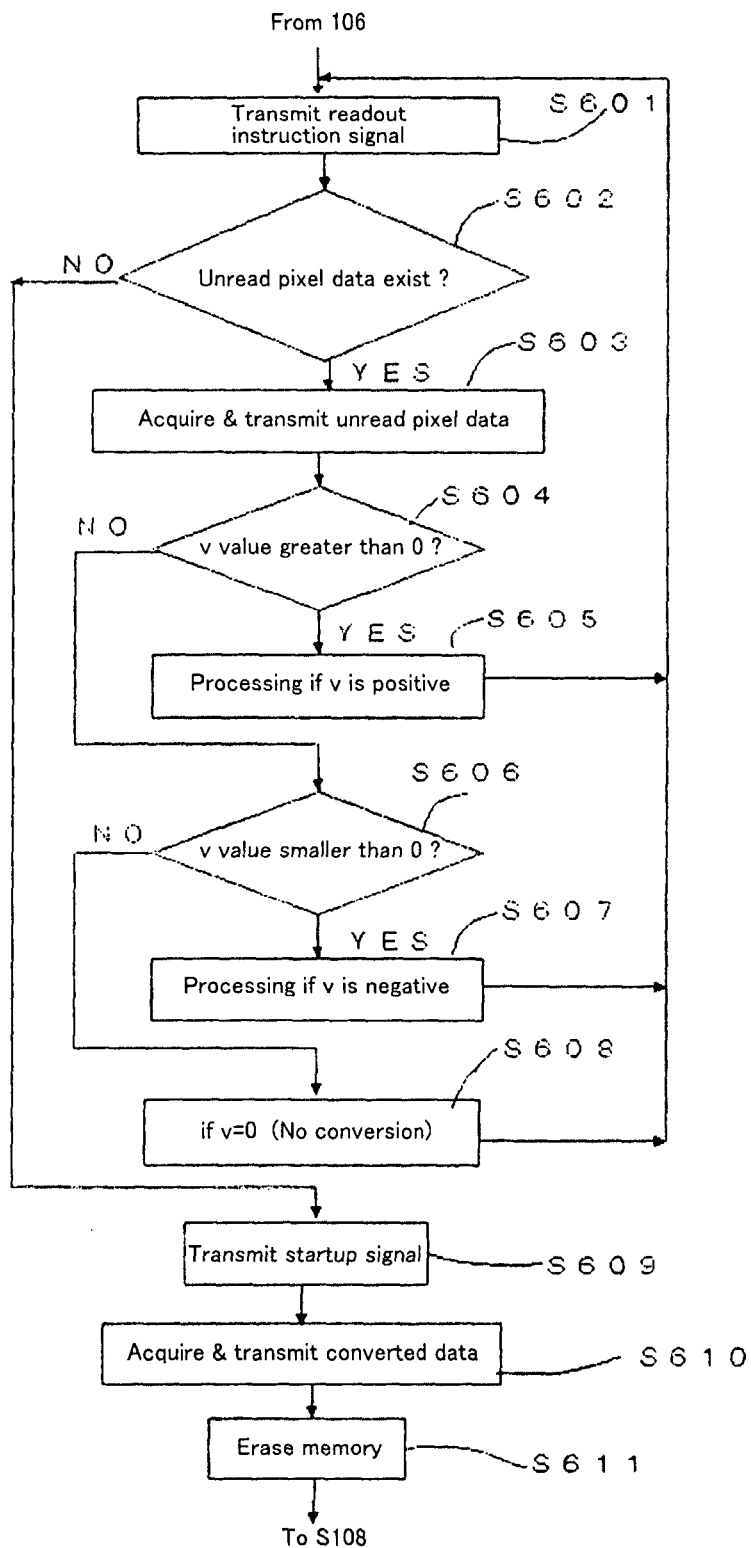
FIG. 33 shows a flowchart illustrating operations in S107 when the third conversion (for tritan) is determined to be assigned in S106.

FIG. 33 is a flowchart for explaining an operation in the above operation of S107 performed when it is determined in S106 that the third conversion (for tritan) is specified. The operation of the present device 11 (especially data processing part 41) of S107 related to the third conversion (for tritan) is described with reference to FIG. 33.

The conversion part 44 having determined that the third conversion (for tritan) is specified transmits a readout instruction signal to the object image data extraction part 43 for instructing the object image data extraction part 43 to read out one piece of unread pixel data among the pixel data included in the Luv image data stored by the data storage part 42, and transmit the one piece of pixel data to the conversion part 44 (S601).

The object image data extraction part 43 having received the readout instruction signal transmitted from the conversion part 44 in S601 accesses the data storage part 42, and determines whether or not there exists unread pixel data among the pixel data included in the Luv image data stored by the data storage part 42 (S602). When the object image data extraction part 43 determines that there exists the pixel data which is not yet read out in S602 (YES), the object image data extraction part 43 reads out and acquires unread pixel data among the pixel data included in the Luv image data stored by the data storage part 42. Then, the object image data extraction part 43 transmits one piece of pixel data read out and acquired from the data storage part 42 to the conversion part 44 (S603. The pixel data which is transmitted from the object image data extraction part 43 to the conversion part 44 and to be processed thereinafter is referred to as "object pixel data"). On the other hand, when the object image data extraction part 43 does not determine that there exists pixel data which is not yet read out in S602 (NO), the object image data extraction part 43 transmits a startup signal to the reading part 48 (S609).

The conversion part 44 having received the object pixel data transmitted from the object image data extraction part 43 in S603 determines whether or not the value (vi) of 'v' of the Luv data included in the object pixel data (the pixel number 'i', Luv data (L, u, v)=(Li, ui, vi)) is greater than 0 (S604), and performs the "processing in the case where the 'v' is positive" when it is determined that the value of 'v' is greater (YES) (S605). The operation of the "processing in the case where the 'v' is positive" in S605 is to be described later in detail.

When the conversion part 44 does not determine in S604 that the value (vi) of 'v' of the Luv data included in the object pixel data is greater than 0 (NO), the conversion part 44 determines whether or not the value (vi) of 'v' of the Luv data is smaller than 0 (S606), and performs the "processing in the case where the 'v' is negative" (S607) when it is determined that the value of 'v' of the Luv data is smaller (YES). The operation of the "processing in the case where the 'v' is negative" in S607 is to be described later in detail.

When the conversion part 44 does not determine that the value (vi) of 'v' of the Luv data included in the object pixel data is smaller than 0 in S606 (NO. That is, the value (vi) of 'v' is 0 in this case.), the conversion part 44 performs the "processing in the case where the 'v' is 0" (S608). The operation of the "processing in the case where the 'v' is 0" in S608 is to be described later in detail.

As mentioned above, when the object image data extraction part 43 does not determine in S602 that there exists pixel data which is not yet read out (NO), the object image data extraction part 43 transmits the startup signal to the reading part 48 in S609. Then, the reading part 48 having received the startup signal transmitted in S609 accesses the data storage part 42 to read out and acquire all the ('n' pieces of) data (Lt, ut, vt) after conversion stored by the data storage part 42, and transmits all the ('n' pieces of) read and acquired data (Lt, ut, vt) after conversion to the color space inverse transform part 51 (S610). After S610, the reading part 48 accesses the data storage part 42, and erases the memory of the data storage part 42 (S611). The operation proceeds to S108 after S611.

Figure 34:
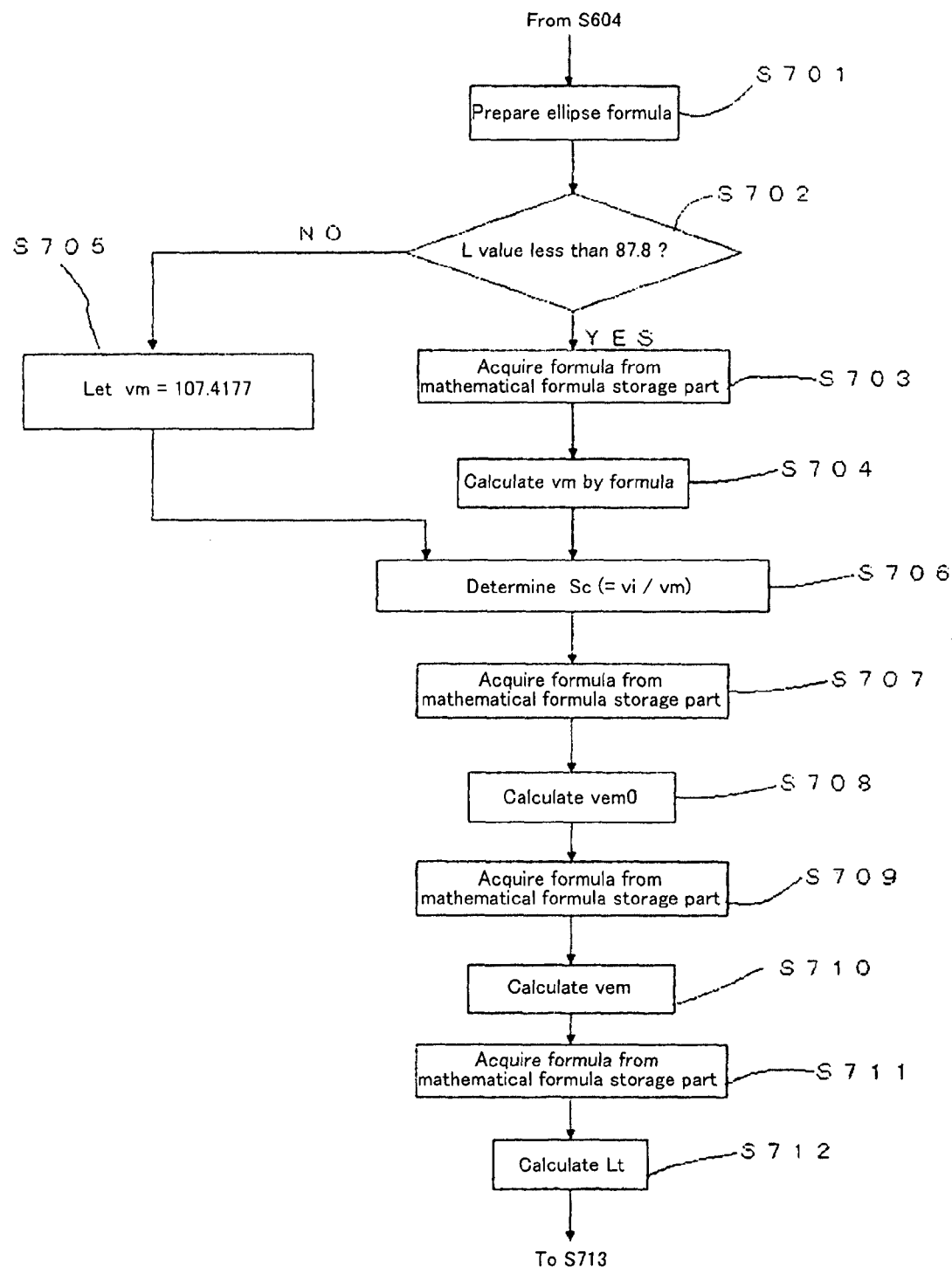
FIG. 34 shows a flowchart illustrating operations of "processing in the case that 'v' is positive" in S605.

FIG. 34 is a flowchart for explaining the operation of the "processing in the case where the 'v' is positive" in S605. The operation of the "processing in the case where the 'v' is positive" in S605 is described with reference to FIG. 34.

The conversion part 44 having determined in S604 that the value (vi) of 'v' of the Luv data included in the object pixel data is greater than 0 (YES) prepares formulae (specifically the formulae (24) and (24.1)) of the ellipse in the two orthogonal axes of 'v' and 'L' axes by using the numeric value Li of 'L' included in the Luv data (L, u, v)=(Li, ui, vi) of the object pixel data (S701). When the conversion part 44 prepares the formulae of the ellipse, the conversion part 44 accesses the parameter storage part 46 to read out and acquire the value of Pvmax suitably from the parameter storage part 46.

Next, the conversion part 44 determines whether or not the value (Li) of 'L' of the Luv data included in the object pixel data (the pixel number 'i', Luv data (L, u, v)=(Li, ui, vi)) is smaller than 87.8 (S702), and when it is determined that the value (Li) of 'L' is smaller than 87.8 (YES), the conversion part 44 accesses the mathematical formula storage part 47 to read out and acquire the formula (25) from the mathematical formula storage part 47 (S703). Then, the conversion part 44 calculates a value of 'v' by substituting the value (Li) of 'L' of the object pixel data for the value of 'L' in the formula (25) acquired in S703 (S704), and stores the calculated value of 'v' (the maximum value of 'v' which the display can display at the value (Li) of 'L') as the first reference value vm.

On the other hand, when the conversion part 44 does not determine in S702 that the value (Li) of 'L' of the Luv data included in the object pixel data (the pixel number 'i', Luv data (L, u, v)=(Li, ui, vi)) is smaller than 87.8 (NO), the conversion part 44 stores 107.4177 as the first reference value vm (S705).

After S704 or S705, the conversion part 44 determines the ratio Sc (=vi/vm) of the value vi of 'v' of the Luv data included in the object pixel data (the pixel number 'i', Luv data (L, u, v)=(Li, ui, vi)) to the first reference value vm determined in S704 or S705 (S706).

After S706, the conversion part 44 accesses the mathematical formula storage part 47 to read out and acquire the formula (27) from the mathematical formula storage part 47 (S707), further reads out and acquires the value of Pvmax from the parameter storage part 46, and then calculates vem0 (S708). As mentioned above, vem0 is the 'v' coordinate of the point (Lm0, vem0) existing within the area which the display can display among the points on the elliptic circumference of the ellipse represented by the formula (26), and having the minimum value of 'L'.

After S708, the conversion part 44 accesses the mathematical formula storage part 47 to read out and acquire the formula (28) from the mathematical formula storage part 47 (S709), and then calculates vem by substituting vem0 calculated in S708 and the value (Li) of 'L' of the Luv data included in the object pixel data into the formula (28) acquired in S709 (S710).

After S710, the conversion part 44 accesses the mathematical formula storage part 47 to read out and acquire the formula (31) from the mathematical formula storage part 47 (S711), and further reads out and acquires the value of Pvmax from the parameter storage part 46.

Then, the conversion part 44 determines the value (Lt) of 'L' of the Luv data after the third conversion (for tritan) of the object pixel data by substituting the value (Li) of 'L' of the Luv data included in the object pixel data, Sc calculated in S706, and vem0 calculated in S708 into the formula (31) acquired in S711 (S712).

Figure 35:
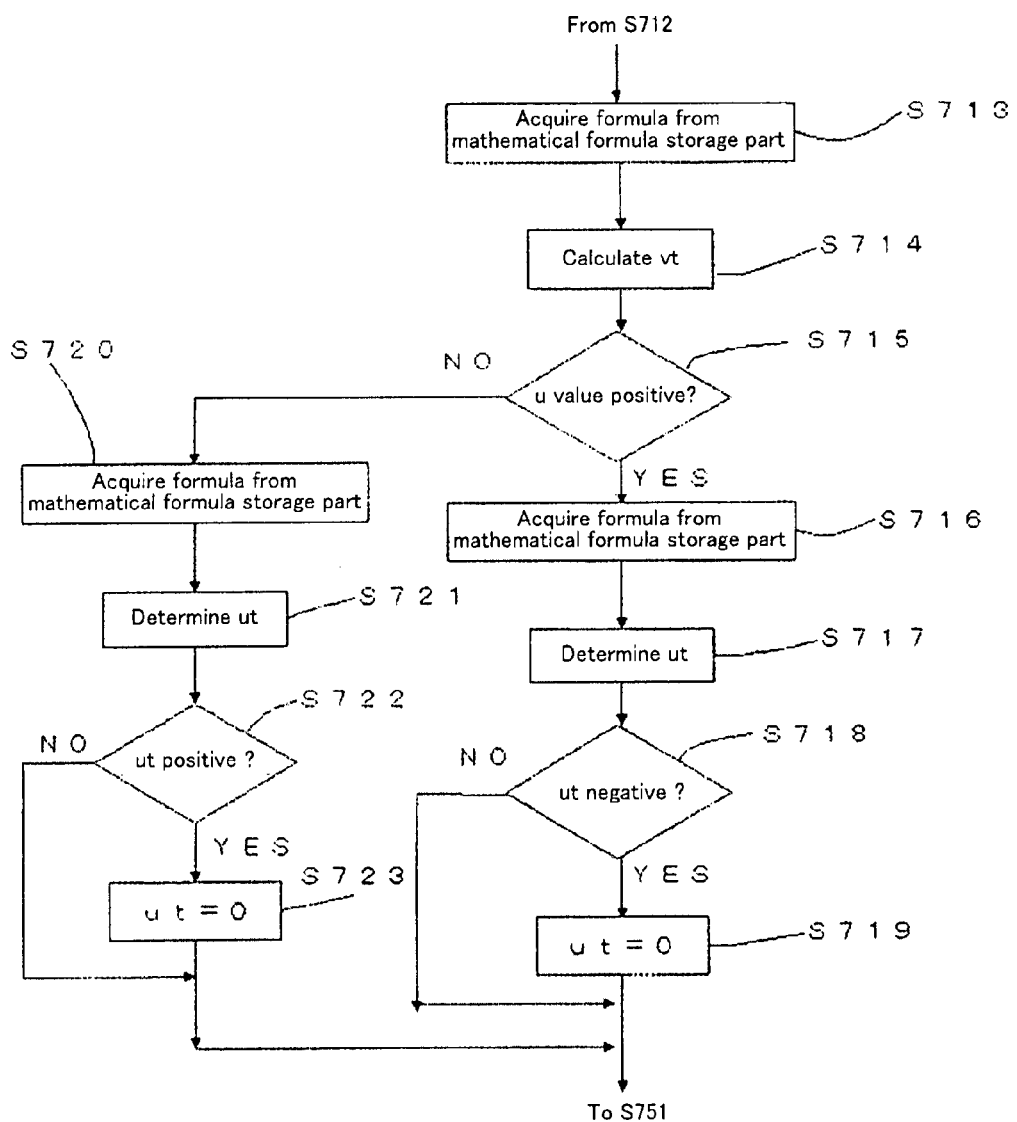
FIG. 35 shows a flowchart illustrating operations in S713 and later among the operations of "processing in the case that 'v' is positive" in S605.

FIG. 35 is a flowchart for explaining an operation after S713 in the operation of the "processing in the case where the 'v' is positive" in S605. The operation of the "processing in the case where the 'v' is positive" after S713 is described with reference to FIG. 35.

After calculating the value (Lt) of 'L' in S712, the conversion part 44 accesses the mathematical formula storage part 47 to read out and acquire the formula (32) from the mathematical formula storage part 47 (S713), and further reads out and acquires the value of Pvmax from the parameter storage part 46. Then, the conversion part 44 determines the value (vt) of 'v' of the Luv data after the third conversion (for tritan) of the object pixel data by substituting the value (Lt) of 'L' calculated in S712 and the value (Li) of 'L' of the Luv data included in the object pixel data into the formula (32) (S714).

After S714, the conversion part 44 determines whether or not the value ui of 'u' of the Luv image data (L, u, v)=(Li, ui, vi) of the object pixel data is positive (S715), and when the value ui of 'u' is positive (>0) (YES), the conversion part 44 accesses the mathematical formula storage part 47 to read out and acquire the formula (33) from the mathematical formula storage part 47 (S716), and determines the value of ut by substituting the value ui of 'u' and the value Li of 'L' of the Luv image data (Li, ui, vi) of the object pixel data, and Lt calculated in S712 into the formula (33) (S717). Subsequently, the conversion part 44 determines whether or not the value of the value (ut) of 'u' calculated in S717 is negative (ut<0) (S718), and sets 0 to the ut (ut=0) when it is determined that the value (ut) of 'u' is negative (YES) (S719). When the conversion part 44 does not determine in S718 that the value of the value (ut) of 'u' calculated in S717 is negative (ut<0) (NO), the value of the value (ut) of 'u' calculated in S717 is left as it is (the value (ut) of 'u' is not changed).

On the other hand, when the conversion part 44 does not determine in S715 that the value ui of 'u' of the Luv image data (L, u, v)=(Li, ui, vi) of the object pixel data is positive (>0) (NO. That is, the value ui of 'u' is 0 or smaller (0 or <0)), the conversion part 44 accesses the mathematical formula storage part 47 to read out and acquire the formula (34) from the mathematical formula storage part 47 (S720), and determines a value of ut by substituting the value ui of 'u' and the value Li of 'L' of the Luv image data (Li, ui, vi) of the object pixel data, and Lt calculated in S712 into the formula (34) (S721). Subsequently, the conversion part 44 determines whether or not the value of the value (ut) of 'u' calculated in S721 is positive (ut>0) (S722), and set 0 to the ut (ut=0) when the value (ut) of 'u' is determined to be positive (YES) (S723). When the conversion part 44 does not determine in S722 that the value (ut) of 'u' calculated in S721 is positive (ut>0) (NO), the value (ut) of 'u' calculated in S721 is left as is (the value (ut) of 'u' is not changed).

Figure 36:
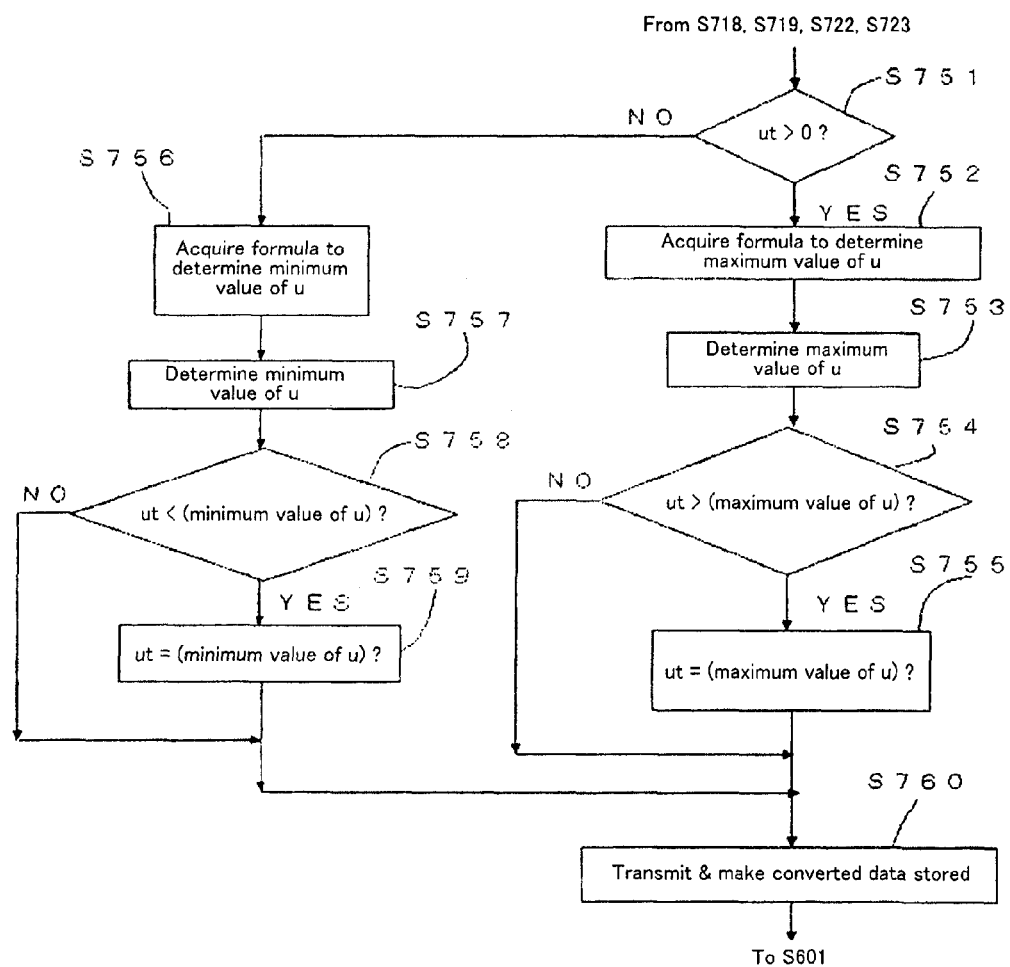
FIG. 36 shows a flowchart illustrating operations in S751 and later among the operations of "processing in the case that 'v' is positive" in S605.

FIG. 36 is a flowchart for explaining an operation after S751 in the operation of the "processing in the case where the 'v' is positive" in S605. The operation of the "processing in the case where the 'v' is positive" after S751 is described with reference to FIG. 36.

After determining the value (ut) of 'u' as mentioned above (after any one of the cases of S719, the value (ut) of 'u' being determined to be negative (ut<0) in S718 (NO), S723, or the value (ut) of 'u' not being determined to be positive (ut>0) in S722 (NO)), the conversion part 44 determines whether or not the ut is greater than 0 (ut>0) (S751), and when it is determined that the ut is greater than 0 (ut>0) (YES), the conversion part 44 accesses the mathematical formula storage part 47 to read out and acquire the formula for determining the maximum value of 'u' at L=Lt from the mathematical formula storage part 47 (S752). Specifically, the conversion part 44 reads out and acquires in S752 one of the formulae in FIG. 11, that is, the formula of u1 when the Lt is 0 or greater and smaller than 53.3 (0≦Lt<53.3); and the formula of u2 when the Lt is 53.3 or greater and 100.0 or smaller (53.3≦Lt≦100). The formula read out and acquired in S752 is used to determine the maximum value of 'u' by substituting Lt for 'L' of the formula (S753). Subsequently, the conversion part 44 determines whether or not the ut is greater than the maximum value of 'u' calculated in S753 (S754), and sets the maximum value of 'u' determined in S753 to the ut (S755) when it is determined that the ut is greater than the maximum value of 'u' (YES). When it is not determined that the ut is greater than the maximum value of 'u' in S754 (NO), the ut is not changed.

On the other hand, when it is not determined that the ut is greater than 0 (ut>0) in S751 (NO), the conversion part 44 accesses the mathematical formula storage part 47 to read out and acquire the formula for determining the minimum value of 'u' at L=Lt from the mathematical formula storage part 47 (S756). Specifically, one of the formulae in FIG. 11 is read out and acquired in S756, that is, the formula of u3 when the Lt is 91.2 or greater and 100 or smaller (91.2≦Lt≦100); the formula of u4 when the Lt is 87.8 or greater and smaller than 91.2 (87.8≦Lt≦91.2); and the formula of u5 when the Lt is 0 or greater and smaller than 87.8 (0≦Lt<87.8). The formula read out and acquired in S756 is used to determine the minimum value of 'u' by substituting Lt for 'L' of the formula (S757). Subsequently, it is determined whether or not the ut is smaller than the minimum value of 'u' calculated in S757 (S758), and when it is determined that the ut is smaller than the minimum value of 'u' (YES), the minimum value of 'u' determined in S757 is set to the ut (S759). When it is not determined that the ut is smaller than the minimum value of 'u' in S758 (NO), the ut is not changed.

Thus, the Luv data (Li, ui, vi) included in the object pixel data (the pixel number 'i', Luv data (L, u, v)=(Li, ui, vi)) is converted into the data after conversion (Lt, ut, vt).

Then, the conversion part 44 transmits the data after conversion (Lt, ut, vt) to the data storage part 42 to cause the data storage part 42 to store the data after conversion (S760).

The operation of the "processing in the case where the 'v' is positive" in S605 relating to the one piece of object pixel data ends as described above.

Returning to S601 after S760, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

Figure 37:
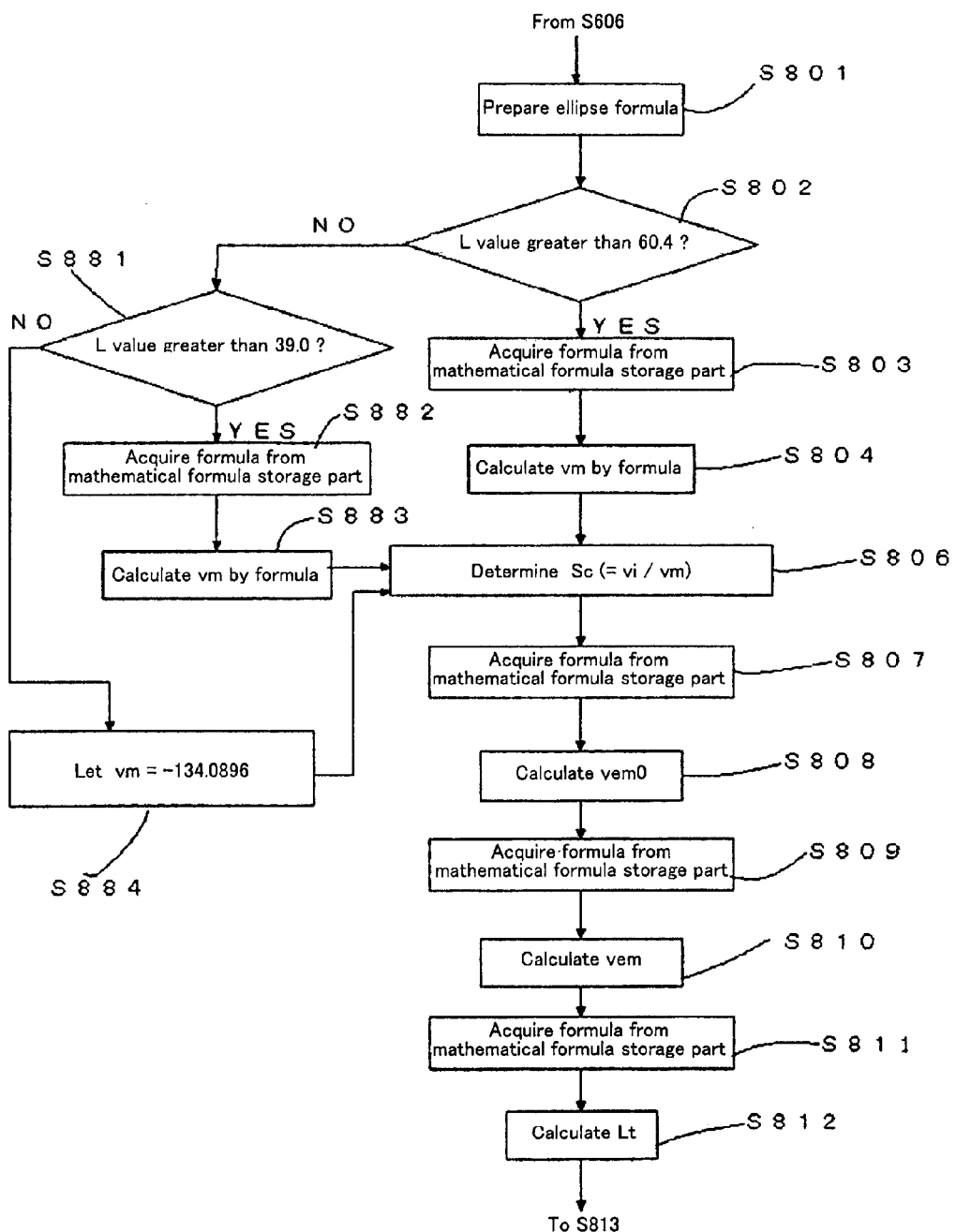
FIG. 37 shows a flowchart illustrating operations of "processing in the case that 'v' is negative" in S607.

FIG. 37 is a flowchart for explaining the operation of the "processing in the case where the 'v' is negative" in S607. The operation of the "processing in the case where the 'v' is negative" in S607 is described with reference to FIG. 37.

The conversion part 44 having determined in S606 that the value (vi) of 'v' of the Luv data included in the object pixel data is smaller than 0 (YES) prepares the formulae (specifically, the formulae (35) and (35.1)) of the ellipse in the two orthogonal axes of 'v' and 'L' axes by using the numeric value Li of 'L' included in the Luv data (L, u, v)=(Li, ui, vi) of the object pixel data (S801). When the conversion part 44 prepares the formulae of the ellipse, the conversion part 44 accesses the parameter storage part 46 to read out and acquire the value of Pvmin suitably from the parameter storage part 46.

Next, the conversion part 44 determines whether or not the value (Li) of 'L' of the Luv data included in the object pixel data (the pixel number 'i', Luv data (L, u, v)=(Li, ui, vi)) is greater than 60.4 (S802), and when the value (Li) of 'L' is determined to be greater than 60.4 (YES), the conversion part 44 accesses the mathematical formula storage part 47 to read out and acquire the formula (36) from the mathematical formula storage part 47 (S803). Then, the conversion part 44 calculates a value of 'v' by substituting the value (Li) of 'L' of the object pixel data for the value of 'L' in the formula (36) acquired in S803 (S804), and stores the calculated value of 'v' (the minimum value of 'v' which the display can display at the value (Li) of 'L') as the first reference value vm.

On the other hand, when the conversion part 44 does not determine that the value (Li) of 'L' of the Luv data included in the object pixel data (the pixel number 'i', Luv data (L, u, v)=(Li, ui, vi)) is greater than 60.4 in S802 (NO), it is determined whether or not the value (Li) of 'L' is greater than 39.0 (S881), and when the value (Li) of 'L' is determined to be greater than 39.0 (YES), the conversion part 44 accesses the mathematical formula storage part 47 to read out and acquire the formula (37) from the mathematical formula storage part 47 (S882). Then, the conversion part 44 substitutes the value (Li) of 'L' of the object pixel data for the value of 'L' in the formula (37) acquired in S882 to calculate a value of 'v' (S883), and stores the calculated value of 'v' (the minimum value of 'v' which the display can display at the value (Li) of 'L') as the first reference value vm.

When it is not determined that the value (Li) of 'L' is greater than 39.0 in S881 (NO), the conversion part 44 stores −134.0896 (the minimum value of 'v' which the display can display) as the first reference value vm (S884).

After S804, S883, or S884, the conversion part 44 determines the ratio Sc (=vi/vm) of the value vi of 'v' of the Luv data included in the object pixel data (the pixel number 'i', Luv data (L, u, v)=(Li, ui, vi)) to the first reference value vm determined in S804, S883, or S884 (S806).

After S806, the conversion part 44 accesses the mathematical formula storage part 47 to read out and acquire the formula (39) from the mathematical formula storage part 47 (S807), and further reads out and acquires the value of Pvmin from the parameter storage part 46, and then calculates vem0 (S808). As mentioned above, vem0 is the 'v' coordinate of the point (Lm0, vem0) existing within the area which the display can display among the points on the elliptic circumference of the ellipse represented by the formula (38), and having the maximum value of 'L'.

After S808, the conversion part 44 accesses the mathematical formula storage part 47 to read out and acquire the formula (40) from the mathematical formula storage part 47 (S809), and calculates vem by substituting vem0 calculated in S808, and the value (Li) of 'L' of the Luv data included in the object pixel data into the formula (40) acquired in S809 (S810).

After S810, the conversion part 44 accesses the mathematical formula storage part 47 to read out and acquire the formula (43) from the mathematical formula storage part 47 (S811), and further reads out and acquires the value of Pvmin from the parameter storage part 46. Then, the conversion part 44 calculates the value (Lt) of 'L' of the Luv data after the third conversion (for tritan) of the object pixel data by substituting the value (Li) of 'L' of the Luv data included in the object pixel data, Sc calculated in S806, and vem0 calculated in S808 into the formula (43) acquired in S811 (S812).

Figure 38:
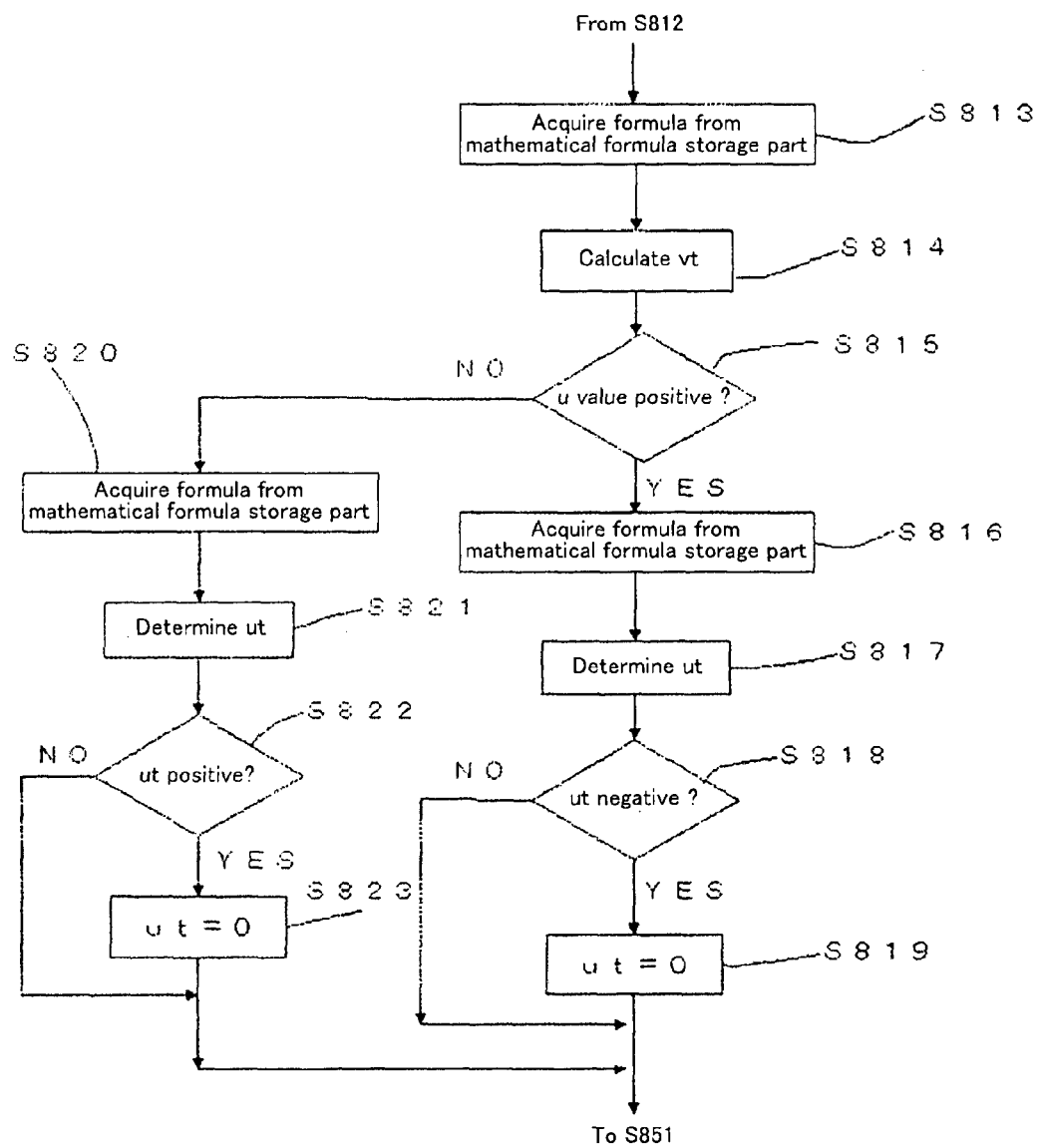
FIG. 38 shows a flowchart illustrating operations in S813 and later among the operations of "processing in the case that 'v' is negative" in S607.

FIG. 38 is a flowchart for explaining an operation after S813 in the operation of the "processing in the case where the 'v' is negative" in S607. The operation of the "processing in the case where the 'v' is negative" after S813 is described with reference to FIG. 38.

After calculating the value (Lt) of 'L' in S812, the conversion part 44 accesses the mathematical formula storage part 47 to read out and acquire the formula (44) from the mathematical formula storage part 47 (S813), and further reads out and acquires the value of Pvmin from the parameter storage part 46. Then, the conversion part 44 determines the value (vt) of 'v' of the Luv data after the third conversion (for tritan) of the object pixel data by substituting the value (Lt) of 'L' calculated in S812 and the value (Li) of 'L' of the Luv data included in the object pixel data into the formula (44) (S814).

After S814, the conversion part 44 determines whether or not the value ui of 'u' of the Luv image data (L, u, v)=(Li, ui, vi) of the object pixel data is positive (S815), and when the value ui of 'u' is positive (>0) (YES), the conversion part 44 accesses the mathematical formula storage part 47 to read out and acquire the formula (45) from the mathematical formula storage part 47 (S816). Then, the conversion part 44 determines a value of ut by substituting the value ui of 'u' and the value Li of 'L' of the Luv image data (Li, ui, vi) of the object pixel data, and Lt calculated in S812 into the formula (45) (S817). Subsequently, the conversion part 44 determines whether or not the value of the value (ut) of 'u' calculated in S817 is negative (ut<0) (S818), and sets 0 to the ut (ut=0) when the value (ut) of 'u' is negative (YES) (S819). When the conversion part 44 does not determine that the value of the value (ut) of 'u' calculated in S817 is negative (ut<0) in S818 (NO), the value (ut) of 'u' calculated in S817 is left as is (the value (ut) of 'u' is not changed).

On the other hand, when the conversion part 44 does not determine in S815 that the value ui of 'u' of the Luv image data (L, u, v)=(Li, ui, vi) of the object pixel data is positive (>0) (NO. That is, the value ui of 'u' is 0 or smaller (0 or <0).), the conversion part 44 accesses the mathematical formula storage part 47 to read out and acquire the formula (46) from the mathematical formula storage part 47 (S820), and then determines a value of ut by substituting the value ui of 'u' and the value Li of 'L' of the Luv image data (Li, ui, vi) of the object pixel data, and Lt calculated in S812 into the formula (46) (S821). Subsequently, the conversion part 44 determines whether or not the value (ut) of 'u' calculated in S821 is positive (ut>0) (S822), and sets 0 to the ut (ut=0) when the value (ut) of 'u' is determined to be positive (YES) (S823). When the conversion part 44 does not determine that the value (ut) of 'u' calculated in S821 is positive (ut>0) in S822 (NO), the value (ut) of 'u' calculated in S821 is left as it is (the value (ut) of 'u' is not changed).

Figure 39:
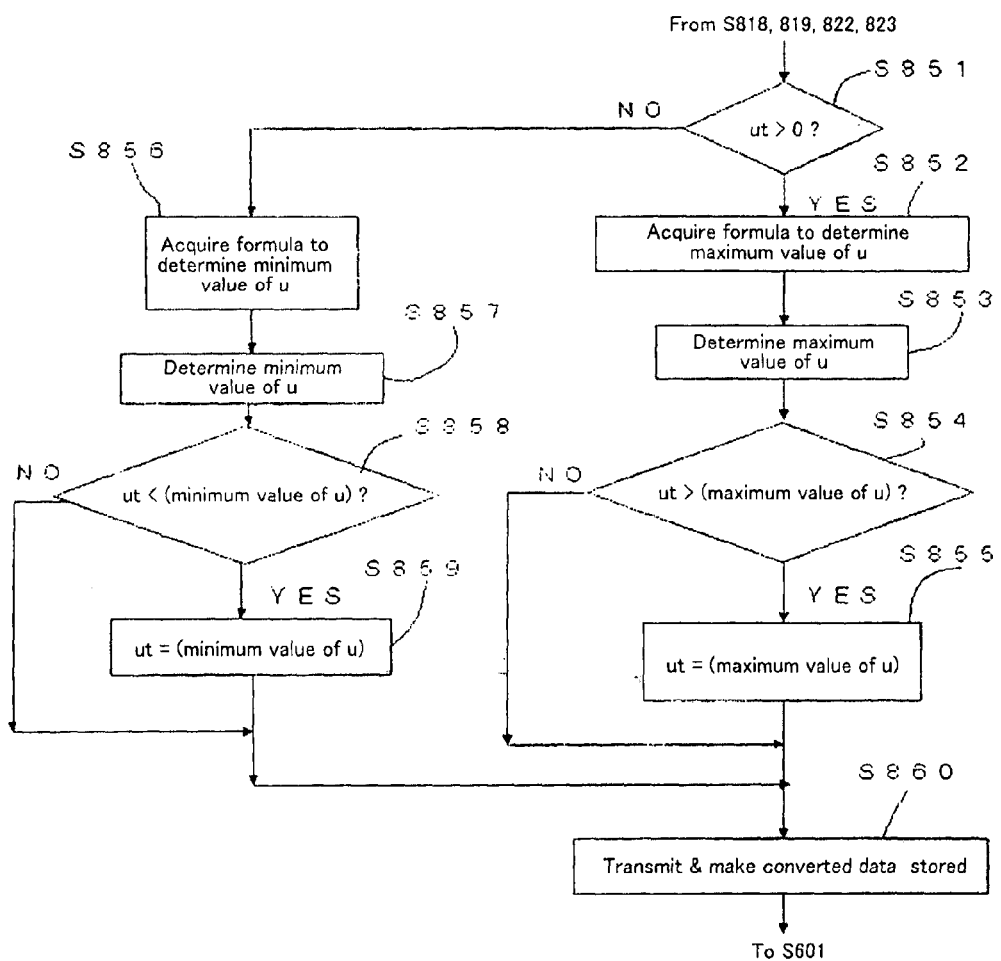
FIG. 39 shows a flowchart illustrating operations in S851 and later among the operations of "processing in the case that 'v' is negative" in S607.

FIG. 39 is a flowchart for explaining an operation after S851 in the operation of the "processing in the case where the 'v' is negative" in S607. The operation of the "processing in the case where the 'v' is negative" after S851 is described with reference to FIG. 39.

After determining the value (ut) of 'u' as mentioned above (after any one of the cases of S819, the value (ut) of 'u' not being determined to be negative (ut<0) in S818 (NO), S823, or the value (ut) of 'u' not being determined to be positive (ut>0) in S822 (NO)), the conversion part 44 determines whether or not the ut is greater than 0 (ut>0) (S851), and when the ut is determined to be greater than 0 (ut>0) (YES), the conversion part 44 accesses the mathematical formula storage part 47 to read out and acquire the formula for determining the maximum value of 'u' at L=Lt from the mathematical formula storage part 47 (S852). Specifically, one of the formulae in FIG. 11 is read out and acquired in S852, that is, the formula of u1 when the Lt is 0 or greater and smaller than 53.3 (0≦Lt<53.3) and the formula of u2 when the Lt is 53.3 or greater and 100.0 or smaller (53.3≦Lt≦100). The formula read out and acquired in S852 is used to determine the maximum value of 'u' by substituting Lt for 'L' of the formula (S853). Subsequently, it is determined whether or not the ut is greater than the maximum value of 'u' calculated in S853 (S854), and sets the maximum value of 'u' determined in S853 to the ut when it is determined that the ut is greater than the maximum value of 'u' (YES) (S855). When it is not determined that the ut is greater than the maximum value of 'u' in S854 (NO), the ut is not changed.

On the other hand, when it is not determined that the ut is greater than 0 (ut>0) in S851 (NO), the conversion part 44 accesses the mathematical formula storage part 47 to read out and acquire the formula for determining the minimum value of 'u' at L=Lt from the mathematical formula storage part 47 (S856). Specifically, one of the formulae in FIG. 11 is read out and acquired in S856, that is, the formula of u3 when Lt is 91.2 or greater and 100 or smaller (91.2≦Lt≦100), the formula of u4 when the Lt is 87.8 or greater and smaller than 91.2 (87.8≦Lt<91.2), and the formula of u5 when the Lt is 0 or greater and smaller than 87.8 (0≦Lt<87.8). The formula read out and acquired in S856 is used to determine the minimum value of 'u' by substituting Lt for 'L' of the formula (S857). Subsequently, it is determined whether or not the ut is smaller than the minimum value of 'u' calculated in S857 (S858), and when the ut is determined to be smaller than the minimum value of 'u' (YES), the minimum value of 'u' determined in S857 is set to the ut (S859). When it is not determined that the ut is smaller than the minimum value of 'u' in S858 (NO), the ut is not changed.

Thus, the Luv data (Li, ui, vi) included in the object pixel data (the pixel number 'i', Luv data (L, u, v)=(Li, ui, vi)) is converted into the data after conversion (Lt, ut, vt).

Then, the conversion part 44 transmits the data after conversion (Lt, ut, vt) to the data storage part 42 to cause the data storage part 42 to store the data after conversion (S860).

The operation of the "processing in the case where the 'v' is negative" in S607 relating to the one piece of object pixel data ends as described above.

Returning to S601 after S860, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

Figure 40:
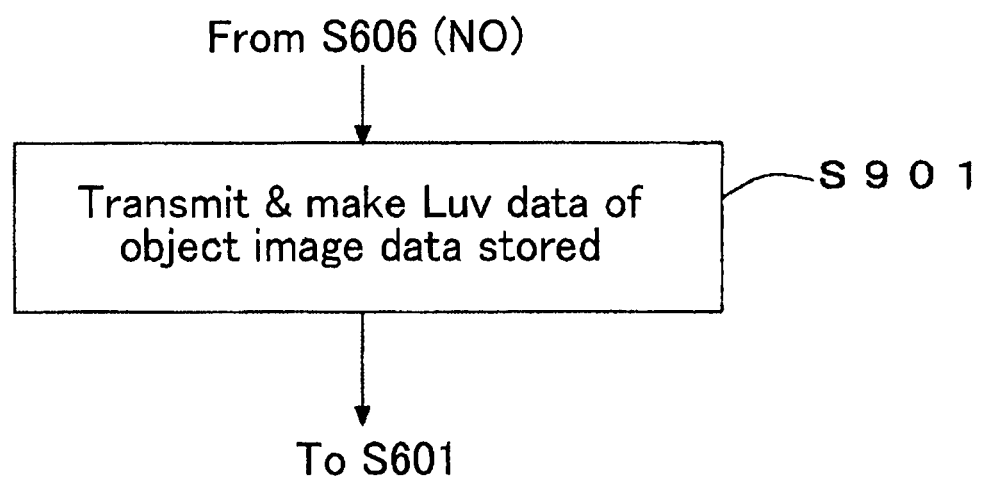
FIG. 40 shows a flowchart illustrating operations of "processing in the case that 'v' is 0" in S608.

FIG. 40 is a flowchart for explaining the operation of the "processing in the case where the 'v' is 0" in S608. The operation of the "processing in the case where the 'v' is 0" in S608 is described with reference to FIG. 40.

When the conversion part 44 does not determine that the value (vi) of 'v' of the Luv data included in the object pixel data is smaller than 0 in S606 (NO. That is, the value (vi) of 'v' is 0 in this case.), the conversion part 44 transmits the unchanged Luv data (L, u, v)=(Li, ui, vi) related to the object pixel data to the data storage part 42 as the data (Lt, ut, vt) after conversion, and causes the data storage part 42 to store the Luv data (S901). That is, when the value (vi) of 'v' is 0, the Luv data (Li, ui, vi) of the object pixel data is stored without any change by the data storage part 42 as the data (Lt, ut, vt) after conversion.

Thereby, the operation of the "processing in the case where the 'v' is 0" in S608 relating to the one piece of object pixel data ends.

Returning to S601 after S901, the conversion part 44 transmits a readout instruction signal to the object image data extraction part 43 for instructing the object image data extraction part 43 to read out and transmit one piece of unread pixel data among the pixel data included in the Luv image data stored by the data storage part 42 (Thereby, the next pixel data included in the Luv image data stored by the data storage part 42 turns into object pixel data, and is processed.).

As described above, the present device 11 is the pixel processor comprising the data processing part 41 as a color vision conversion processing means for performing color vision conversion processing which is processing of changing the component in the direction of the luminance axis (changed into Lt) according to the component in the direction of a selected axis of either the first axis ('u' axis) or the second axis ('v' axis) among the component Li in the direction of the luminance axis, the component ui in the first axial direction, and the component vi in the second axial direction which are included in the pixel data indicated as positional data in the Luv color space which is a uniform color space indicated by three orthogonal coordinate axes of the luminance axis ('L' axis) representing luminance, the first axis ('u' axis) and the second axis ('v' axis) which are two axes representing the chromaticness index.

When performing the first conversion (for protan and deutan), the first axis ('u' axis) is used as the selected axis, and when performing the third conversion (for tritan), the second axis ("v" axis) is used as the selected axis.

Then, when performing the first conversion (for protan and deutan), the color vision conversion processing is performed such that the component in the direction of the luminance axis (the 'L' axis) is decreased in either of the case where the component in the direction of the selected axis (the first axis (the 'u' axis)) is greater than 0 being a first predetermined value, or the case where the component in the direction of the selected axis (the first axis (the 'u' axis)) is smaller than 0 being the first predetermined value (here, the case where the component is smaller than 0 being the first predetermined value), and in the other case (here, the case where the component is greater than 0 being the first predetermined value), the component in the direction of the luminance axis (the 'L' axis) is increased.

When performing the first conversion (for protan and deutan), the selected axis (the first axis (the 'u' axis)) is the axis indicating a red component in a positive direction and indicating a green component in a negative direction. The color vision conversion processing is performed such that the component being the direction of the luminance axis (the 'L' axis) is increased when the red component in the component in the direction of the selected axis (the first axis (the 'u' axis)) is greater than 0 being the first predetermined value, and the component in the direction of the luminance axis (the 'L' axis) is decreased when the red component is smaller than 0 being the first predetermined value.

When performing the third conversion (for tritan), the color vision conversion processing is performed such that the component in the direction of the luminance axis (the 'L' axis) is decreased in either of the case where the component in the direction of the selected axis (the second axis (the "v" axis)) is greater than 0 being the first predetermined value, or the case where the component in the direction of the selected axis (the second axis (the "v" axis)) is smaller than 0 being the first predetermined value (here, the case where the component is greater than 0 being the first predetermined value). The component in the direction of the luminance axis (the 'L' axis) is increased in the other case (here, the case where the component is smaller than 0 being the first predetermined value).

When performing the third conversion (for tritan), the selected axis (the second axis (the 'v' axis)) is the axis indicating the yellow component in the positive direction and indicating the blue component in the negative direction. The color vision conversion processing is performed such that the component in the direction of the luminance axis (the 'L' axis) is decreased when the yellow component in the component in the direction of the selected axis (the second axis (the "v" axis)) is greater than 0 being the first predetermined value, and the component in the direction of the luminance axis (the 'L' axis) is increased when the yellow component is smaller than 0 being the first predetermined value.

The component in the direction of the selected axis after color vision conversion processing is determined by converting the component in the direction of the selected axis before color vision conversion processing with a monotone increasing function which monotonically increases the absolute value of the component in the direction of the selected axis after color vision conversion processing with respect to the absolute value of the component in the direction of the selected axis before color vision conversion processing. Each case is described below.

In the case of u>0 in the first conversion (for protan and deutan), the component ut in the direction of the selected axis (the first axis (the 'u' axis)) after color vision conversion processing is determined as follows by using the component ui in the direction of the selected axis (the first axis (the 'u' axis)) before color vision conversion processing. Since Sc equals ui/um (Sc=ui/um), when um is greater than 0 (um>0) as above, Sc increases in direct proportion to ui. Since the component Lt in the direction of the luminance axis (the 'L' axis) after color vision conversion processing is determined by Lt=Sc×(Lm−Li)+Li in this case, if the component Li in the direction of the luminance axis (the 'L' axis) before color vision conversion processing is constant, Lm is also constant (Since Lm is the 'L' coordinate of the point (Lm, uem) existing within the area which the display can display among the points on the elliptic circumference of the ellipse represented by the formula (1.1), and having the maximum value of 'L', if Li is constant, Lm is also constant.). Then, in the case of u>0 in the first conversion (for protan and deutan), (Lm−Li) is greater than 0. Then, when ui increases (the absolute value increases in the positive direction), Sc increases, and thereby Lt also increases. Then, since ut is determined by ut=Pumax/100×((1−Li)$^2$−(Lt−100)$^2$)$^{0.5}$, if Li is constant, ut increases due to an increase in Lt (Pumax>0, 0<Lt<100). That is, in the case of u>0 in the first conversion (for protan and deutan), the component ut in the direction of the selected axis (the first axis (the 'u' axis)) after color vision conversion processing is determined by converting the component ui in the direction of the selected axis (the first axis (the 'u' axis)) before color vision conversion processing by using the monotone increasing function which monotonically increases the absolute value of the component ut in the direction of the selected axis (the first axis (the 'u' axis)) after color vision conversion processing with respect to the absolute value of component ui in the direction of the selected axis (the first axis (the 'u' axis)) before color vision conversion processing.

In the case of u<0 in the first conversion (for protan and deutan), the component ut in the direction of the selected axis (the first axis (the 'u' axis)) after color vision conversion processing is determined as follows by using the component ui in the direction of the selected axis (the first axis (the 'u' axis)) before color vision conversion processing. Since Sc equals ui/um (Sc=ui/um), when um is smaller than 0 (um<0) as above, Sc increases in direct proportion as ui becomes smaller (the absolute value increases in the negative direction). Since the component Lt in the direction of the luminance axis (the 'L' axis) after color vision conversion processing is determined by Lt=Sc×(Lm−Li)+Li in this case, if the component Li in the direction of the luminance axis (the 'L' axis) before color vision conversion processing is constant, Lm is also constant (Since Lm is the 'L' coordinate of the point (Lm, uem) existing within the area which the display can display among the points on the elliptic circumference of the ellipse represented by the formula (13.1), and having the minimum value of 'L', if Li is constant, Lm is also constant.). Then, since (Lm−Li) is smaller than 0 ((Lm−Li)<0) in the first conversion (for protan and deutan) in the case of u<0, Sc increases as ui becomes smaller (the absolute value increases in the negative direction), and thereby Lt also decreases. Then, since ut is determined by ut=Pumin/100×(Li$^2$−Lt$^2$)$^{0.5}$, if Li is constant, ut decreases (the absolute value increases in the negative direction) due to a decrease in Lt (Pumin<0, 0<Lt<100). That is, in the case of u<0 in the first conversion (for protan and deutan), the component ut in the direction of the selected axis (the first axis (the 'u' axis)) after color vision conversion processing is determined by converting the component ui in the direction of the selected axis (the first axis (the 'u' axis)) before color vision conversion processing by using the monotone increasing function which monotonically increases the absolute value of the component ut in the direction of the selected axis (the first axis (the 'u' axis)) after color vision conversion processing with respect to the absolute value of the component ui in the direction of the selected axis (the first axis (the 'u' axis)) before color vision conversion processing.

In the case of v>0 in the third conversion (for tritan), the component vt in the direction of the selected axis (the second axis (the "v" axis)) after color vision conversion processing is determined as follows by using the component vi in the direction of the selected axis (the second axis (the 'v' axis)) before color vision conversion processing. Since Sc equals vi/vm (Sc=vi/vm), in the case of vm>0 as above, Sc increases in direct proportion to vi. Since the component Lt in the direction of the luminance axis (the 'L' axis) after color vision conversion processing is determined by Lt=Sc×(Lm−Li)+Li in this case, if the component Li in the direction of the luminance axis (the 'L' axis) before color vision conversion processing is constant, Lm is also constant (Since Lm is the 'L' coordinate of the point (Lm, vem) existing within the area which the display can display among the points on the elliptic circumference of the ellipse represented by the formula (24.1), and having the minimum value of 'L', if Li is constant, Lm is also constant.). Then, in the case of v>0 in the third conversion (for tritan), since (Lm−Li) is smaller than 0 ((Lm−Li)<0), when vi increases (the absolute value increases in the positive direction), Sc increases, and thereby Lt decreases. Then, since vt is determined by vt=Pvmax/100×(Li$^2$−Lt$^2$)$^{0.5}$, if Li is constant, vt increases due to a decrease in Lt (Pvmax>0, 0<Lt<100). That is, in the case of v>0 in the third conversion (for tritan), the component vt in the direction of the selected axis (the second axis (the 'v' axis)) after color vision conversion processing is determined by converting the component vi in the direction of the selected axis (the second axis (the 'v' axis)) before color vision conversion processing by using a monotone increasing function which monotonically increases the absolute value of the component vt in the direction of the selected axis (the second axis (the 'v' axis)) after color vision conversion processing with respect to the absolute value of the component vi in the direction of the selected axis (the second axis (the 'v' axis)) before color vision conversion processing.

In the case of v<0 in the third conversion (for tritan), the component vt in the direction of the selected axis (the second axis (the 'v' axis)) after color vision conversion processing is determined as follows by using the component vi in the direction of the selected axis (the second axis (the 'v' axis)) before color vision conversion processing. In the case of vm<0 as above, since Sc equals vi/vm (Sc=vi/vm), Sc increases in direct proportion as vi becomes smaller (the absolute value increases in the negative direction). Since the component Lt in the direction of the luminance axis (the 'L' axis) after color vision conversion processing is determined by Lt=Sc×(Lm−Li)+Li in this case, if the component Li in the direction of the luminance axis (the 'L' axis) before color vision conversion processing is constant, Lm is also constant (Since Lm is the 'L' coordinate of the point (Lm, vem) existing within the area which the display can display among the points on the elliptic circumference of the ellipse represented by the formula (35.1), and having the maximum value of 'L', if Li is constant, Lm is also constant). Then, in the case of v<0 in the third conversion (for tritan), since (Lm−Li) is greater than 0 ((Lm−Li)>0), Sc increases as vi becomes smaller (the absolute value increases in the negative direction), and thereby Lt increases. Then, since vt is determined by vt=Pvmin/100×((1−Li)$^2$−(Lt−100)$^2$)$^{0.5}$, if Li is constant, vt decreases (the absolute value increases in the negative direction) due to an increase in Lt (Pvmin<0, 0<Lt<100). That is, in the case of v<0 in the third conversion (for tritan), the component vt in the direction of the selected axis (the second axis (the "v" axis)) after color vision conversion processing is determined by converting the component vi in the direction of the selected axis (the second axis (the 'v' axis)) before color vision conversion processing by using the monotone increasing function which monotonically increases the absolute value of the component vt in the direction of the selected axis (the second axis (the 'v' axis)) after color vision conversion processing with respect to the absolute value of the component vi in the direction of the selected axis (the second axis (the 'v' axis)) before color vision conversion processing.

In the first conversion (for protan and deutan), among the selected data sets (Li, ui) which are the data sets of the component Li in the direction of the luminance axis (the 'L' axis) and the component ui in the direction of the selected axis (the first axis (the 'u' axis)) included in the pixel data, either the selected data set in which the component in the direction of the selected axis (the first axis (the 'u' axis)) is greater than 0 being a second specified value, or the selected data set in which the component in the direction of the selected axis (the first axis (the 'u' axis)) is smaller than 0 being the second specified value (here, the selected data set greater than 0 being the second specified value) is converted so as to satisfy one of functions (here the convex function) among the convex function (the ellipse of the formula (1) represented by the solid line F1 in FIG. 5) and the concave function (the ellipse of the formula (13) represented by the solid line F2 in FIG. 13) which exist in the selected plane (the uL plane), and the other selected data set (here, the selected data set smaller than 0 being the second predetermined value) is converted so as to satisfy the other function (here, the concave function) when the selected axis (the first axis (the 'u' axis)) is taken as a horizontal axis and the luminance axis (the 'L' axis) is taken as a vertical axis on a selected plane (the uL plane) including the selected axis (the first axis (the 'u' axis)) and the luminance axis (the 'L' axis).

Then, when the component Li in the direction of the luminance axis (the 'L' axis) is the same, the convex function and the concave function are formed by: the first elliptic circumference (the solid line F1 in FIG. 5) which exists in the area greater than 0 being the second predetermined value and which is formed by part of the elliptic circumference of the first ellipse (the ellipse represented by the formula (1)) having the center on a straight line (here, the 'L' axis) on which the component in the direction of the selected axis (the first axis ('u' axis)) indicates 0 being the second predetermined value; and the second elliptic circumference (the solid line F2 in FIG. 13) which exists in the range smaller than 0 being the second predetermined value and which is formed by part of the elliptic circumference of the second ellipse (the ellipse represented by the formula (13)) having the center on the straight line (here, the 'L' axis) on which the component in the direction of the selected axis (the first axis (the 'u' axis)) indicates 0 being the second predetermined value. Further, one end of the first elliptic circumference (the solid line F1 in FIG. 5) and one end of the second elliptic circumference (the solid line F2 in FIG. 13) are connected at 0 (u=0) being the second predetermined value.

In the third conversion (for tritan), among the selected data sets (Li, vi) which are the data sets of the component Li in the direction of the luminance axis (the 'L' axis) and the component vi in the direction of the selected axis (the second axis ('v' axis)) included in the pixel data, either the selected data set in which the component in the direction of the selected axis (the second axis (the 'v' axis)) is greater than 0 being second specified value, or the selected data set in which the component in the direction of the selected axis (the second axis (the 'v' axis)) is smaller than 0 being the second specified value (here, the selected data set having a value greater than 0 being the second specified value) is converted so as to satisfy one of the functions (here the concave function) among the convex function (the ellipse of the formula (35) represented by the solid line F4 in FIG. 21), and the concave function (the ellipse of the formula (24) represented by the solid line F3 in FIG. 17) which exist in the selected plane (the vL plane) and the other selected data set (here, the selected data set smaller than 0 as the second predetermined value) is converted so as to satisfy the other function (here, the convex function) when the selected axis (the second axis (the 'v' axis)) is taken as the horizontal axis, and the luminance axis (the 'L' axis) is taken as the vertical axis on the selected plane (the vL plane) including the selected axis (the second axis (the 'v' axis)) and the luminance axis (the 'L' axis).

Then, when the component Li in the direction of the luminance axis (the 'L' axis) is the same, the convex function and the concave function are formed by: the first elliptic circumference (the solid line F3 in FIG. 17) which exists in the area greater than 0 being the second predetermined value and which is formed by part of the elliptic circumference of the first ellipse (the ellipse represented by the formula (24)) having the center on a straight line (here, the 'L' axis) on which the component in the direction of the selected axis (the second axis (the 'v' axis)) indicates 0 being the second predetermined value; and the second elliptic circumference (the solid line F4 in FIG. 21) which exists in the area smaller than 0 being the second predetermined value and which is formed by part of the elliptic circumference of the second ellipse (the ellipse represented by the formula (35)) having the center on the straight line (here, the 'L' axis) on which the component in the direction of the selected axis (the second axis (the 'v' axis)) indicates 0 being the second predetermined value. Further, one end of the first elliptic circumference (the solid line F3 in FIG. 17) and one end of the second elliptic circumference (the solid line F4 in FIG. 21) are connected at 0 (u=0) being the second predetermined value.

In the first conversion (for protan and deutan), a variation (Lt−Li) for changing the component in the direction of the luminance axis (the 'L' axis) according to the component in the direction of the selected axis (first axis (the 'u' axis)) in the color vision conversion processing is determined according to the ratio Sc (=ui/um) of the component ui related to the selected axis (first axis (the 'u' axis)) of the pixel data to the selected axis reference value um which is a reference value for the component related to the selected axis (first axis (the 'u' axis)). Specifically, since (Lt−Li)/(Lm−Li) equals Sc (=ui/um), the variation (Lt−Li) is determined by multiplying the ratio Sc (=ui/um) by (Lm−Li).

Further, in the first conversion (for protan and deutan), the variation (Lt−Li) of the component in the direction of the luminance axis (the 'L' axis) is determined according to a value obtained by multiplying the difference (Lm−Li) between the luminance axis reference value Lm which is a reference value for the component related to the luminance axis (the 'L' axis), and the component Li in the direction of the luminance axis (the 'L' axis) before color vision conversion processing by the ratio Sc (=ui/um). Then, in the first conversion (for protan and deutan), the luminance axis reference value Lm represents the component related to the luminance axis (the 'L' axis) of the intersection point (M5 in FIG. 5, M7 in FIG. 13) between the convex function (the ellipse represented by the solid line F1 in the formula (1) in FIG. 5) or the concave function (the ellipse represented by the solid line F2 in the formula (13) in FIG. 13), and the boundary line (shown by the dotted line in FIGS. 5 and 13) of the area which can be displayed on the selected plane (the uL plane) including the selected axis (the first axis (the 'u' axis)) and the luminance axis (the 'L' axis).

Then, in the case of u>0 in the first conversion (for protan and deutan), the selected axis reference value um is a limit value up to which the component related to the selected axis (the first axis (the 'u' axis)) can be displayed (the maximum value of 'u' which the display can display in the value (Li) of 'L') in at least part of the range (here, the value (Li) of 'L' is 53.3 or greater) of the component in the direction of the luminance axis (the 'L' axis) before color vision conversion processing. In the case of u>0 in the first conversion (for protan and deutan), the selected axis reference value um is a constant value of 175.0213 in at least part of the range (here, the value (Li) of 'L' is smaller than 53.3) of the component in the direction of the luminance axis (the 'L' axis) before color vision conversion processing.

Further, in the case of u<0 in the first conversion (for protan and deutan), the selected axis reference value um is a limit value up to which the component related to the selected axis (the first axis (the 'u' axis)) can be displayed (the minimum value of 'u' which the display can display in the value (Li) of 'L') in at least part of the range (here, the value (Li) of 'L' is smaller than 87.8) of the component in the direction of the luminance axis (the 'L' axis) before color vision conversion processing. In the case of u<0 in the first conversion (for protan and deutan), the selected axis reference value um is a constant value of −83.0667 in at least part of the range (here, the value (Li) of 'L' is 87.8 or greater) of the component in the direction of the luminance axis (the 'L' axis) before color vision conversion processing.

In the third conversion (for tritan), the variation (Lt−Li) for changing the component in the direction of the luminance axis (the 'L' axis) according to the component in the direction of the selected axis (the second axis (the 'v' axis)) in the color vision conversion processing is determined according to the ratio Sc (=vi/vm) of the component vi related to the selected axis (the second axis (the 'v' axis)) of the pixel data to the selected axis reference value vm which is the reference value for the component related to the selected axis (the second axis (the 'v' axis)). Specifically, since (Lt−Li)/(Lm−Li) equals Sc (=vi/vm), the variation (Lt−Li) is determined by multiplying the ratio Sc (=vi/vm) by (Lm−Li).

In the third conversion (for tritan), the variation (Lt−Li) of the component in the direction of the luminance axis (the 'L' axis) is determined according to a value obtained by multiplying the difference (Lm−Li) between the luminance axis reference value Lm which is the reference value for the component related to the luminance axis (the 'L' axis) and the component Li in the direction of the luminance axis (the 'L' axis) before color vision conversion processing by the ratio Sc (=vi/vm). Then, in the third conversion (for tritan), the luminance axis reference value Lm is a component related to the luminance axis (the 'L' axis) of the intersection point (M6 in FIG. 17, M9 in FIG. 21) between the convex function (the ellipse represented by the solid line F4 in the formula (35) in FIG. 21) or the concave function (the ellipse represented by the solid line F3 in the formula (24) in FIG. 17), and the boundary line (shown by the dotted line in FIGS. 17 and 21) of the area which can be displayed on the selected plane (the vL plane) including the selected axis (the second axis (the 'v' axis)) and the luminance axis (the 'L' axis).

Then, in the case of v>0 in the third conversion (for tritan), the selected axis reference value vm is a limit value up to which the component related to the selected axis (the second axis (the 'v' axis)) can be displayed (the maximum value of 'v' which the display can display in the value (Li) of 'L') in at least part of the range (here, the value (Li) of 'L' is smaller than 87.8) of the component in the direction of the luminance axis (the 'L' axis) before color vision conversion processing. In the case of v>0 in the third conversion (for tritan), the selected axis reference value vm is a constant value 107.4177 in at least part of the range (here, the 'L' value (Li) is 87.8 or greater) of the component in the direction of the luminance axis (the 'L' axis) before the color vision conversion processing.

Further, in the case of v<0 in the third conversion (for tritan), the selected axis reference value vm is a limit value up to which the component related to the selected axis (the second axis (the 'v' axis)) can be displayed (The minimum value of 'v' which the display can display in the value (Li) of 'L'. The formulae for calculating the minimum value are different depending on whether or not the value (Li) of 'L' is greater than 60.4.) in at least part of the range (here, the value (Li) of 'L' is greater than 39.0) of the component in the direction of the luminance axis (the 'L' axis) before color vision conversion processing. In the case of v<0 in the third conversion (for tritan), the selected axis reference value vm is a constant value of −134.0896 in at least part of the range (here, the value (Li) of 'L' is 39.0 or smaller) of the component in the direction of the luminance axis (the 'L' axis) before color vision conversion processing.

In the first conversion (for protan and deutan), the data processing part 41 being the color vision conversion processing means further performs unselected axis processing which is processing of decreasing the absolute value of the component in the direction of an unselected axis (the 'v' axis) being the axis other than the selected axis (the first axis (the 'u' axis)) among the first axis (the 'u' axis) and the second axis (the 'v' axis) of pixel data.

Specifically, the unselected axis processing is performed as follows.

(1) When 'u' is Positive

When vi is positive (>0), the component vt in the direction of the unselected axis (the 'v' axis) is calculated by using vt=vi−(Lt−Li). When ui is positive in the first conversion (for protan and deutan), (Lt−Li) is greater than 0, and hence the absolute value of vt becomes smaller than the absolute value of vi. That is, the absolute value of the component in the direction of the unselected axis (the 'v' axis) is decreased according to the variation (Lt−Li) for changing the component in the direction of the luminance axis (the 'L' axis) according to the component in the direction of the selected axis (the first axis (the 'u' axis)). Then, it is determined whether or not the value of the determined value (vt) of 'v' is negative (vt<0), and when the value is determined to be negative, 0 is set to vt (vt=0). Thus, when the component vi and vt of the unselected axis (the 'v' axis) of the pixel data are opposite in sign, where the vi is before unselected axis processing and the vt is after unselected axis processing, the component vt of the unselected axis after unselected axis processing is set to 0.

When vi is 0 or smaller (0 or <0), the component vt in the direction of the unselected axis (the 'v' axis) is calculated by using vt=vi+(Lt−Li). When ui is positive in the first conversion (for protan and deutan), (Lt−Li) is greater than 0, and hence the absolute value of vt becomes smaller than the absolute value of vi. That is, the absolute value of the component in the direction of the unselected axis (the 'v' axis) is decreased according to the variation (Lt−Li) for changing the component in the direction of the luminance axis (the 'L' axis) according to the component in the direction of the selected axis (the first axis (the 'u' axis)). Then, it is determined whether or not the value of the determined value (vt) of 'v' is positive (vt>0), and 0 is set to vt (vt=0) when the value is determined to be positive. Thus, when the component vi and vt of the unselected axis (the 'v' axis) of the pixel data are opposite in sign, where the vi is before unselected axis processing and the vt is after unselected axis processing, the component vt of the unselected axis after unselected axis processing is set to 0.

In both the cases where vi is positive (>0) and vi is zero or smaller (0 or <0), the conversion part 44 finally checks whether or not the thus determined value of vt exists within the area which the display can display. When it is determined that the value does not exist within the area, the conversion part 44 performs correction by replacing the vt value with the minimum value or the maximum value (whichever is closer to vt after conversion) of the area which the display can display in the value of Lt after conversion. Thus, it is determined whether or not the pixel data after unselected axis processing exists within the area which can be displayed, and when it is determined that it cannot be displayed, the component of the unselected axis is corrected to a limit value which can be displayed (the minimum value or the maximum value within the area which the display can display in the value of Lt after conversion).

(2) When 'u' is Negative

If vi is positive (>0), the component vt in the direction of the unselected axis (the 'v' axis) is calculated by using vt=vi−(Li−Lt). If ui is negative in the first conversion (for protan and deutan), (Li−Lt) is greater than 0, and hence the absolute value of vt becomes smaller than the absolute value of vi. That is, the absolute value of the component in the direction of the unselected axis (the 'v' axis) is decreased according to the variation (Li−Lt) for changing the component in the direction of the luminance axis (the 'L' axis) according to the component in the direction of the selected axis (the first axis (the 'u' axis)). Then, it is determined whether or not the value of the determined value (vt) of 'v' is negative (vt<0). And when the value is determined to be negative, 0 is set to the vt (vt=0). Thus, when the component vi and vt of the unselected axis (the 'v' axis) of the pixel data are opposite in sign, where the vi is before unselected axis processing and the vt is after unselected axis processing, the component vt of the unselected axis after unselected axis processing is set to 0.

If vi is 0 or smaller (0 or <0), the component vt in the direction of the unselected axis (the 'v' axis) is calculated by using vt=vi+(Li−Lt). If ui is negative in the first conversion (for protan and deutan), (Li−Lt) is greater than 0, and hence the absolute value of vt becomes smaller than the absolute value of vi. That is, the absolute value of the component in the direction of the unselected axis (the 'v' axis) is decreased according to the variation (Li−Lt) for changing the component in the direction of the luminance axis (the 'L' axis) according to the component in the direction of the selected axis (the first axis ('u' axis)). Then, it is determined whether or not the value of the determined value (vt) of 'v' is positive (vt>0), and when the value is determined to be positive, 0 is set to vt (vt=0). Thus, when the component vi and vt of the unselected axis (the 'v' axis) of the pixel data are opposite in sign, where the vi is before unselected axis processing and the vt is after unselected axis processing, the component vt of the unselected axis after unselected axis processing is set to 0.

In both the cases where vi is positive (>0) and vi is 0 or smaller (0 or <0), the conversion part 44 finally checks whether or not the thus determined value of vt exists within the area which the display can display. When it is determined that the value does not exist within the area, the conversion part 44 performs correction by replacing the vt value with the minimum value or the maximum value (whichever is closer to vt after conversion) of the area which the display can display in the value of Lt after conversion. Thus, it is determined whether or not the pixel data after unselected axis processing exists within the area which can be displayed, and when it is determined that it cannot be displayed, the component of the unselected axis is corrected to a limit value which can be displayed (the minimum value or the maximum value within the area which the display can display in the value of Lt after conversion).

In the third conversion (for tritan), the data processing part 41 being the color vision conversion processing means further performs unselected axis processing which is processing of decreasing the absolute value of the component of the pixel data in the direction of the unselected axis (the 'u' axis) which is an axis other than the selected axis (the second axis (the 'v' axis)) between the first axis (the 'u' axis) and the second axis (the 'v' axis).

Specifically, the unselected axis processing is performed as follows.

(1) When 'v' is Positive

If ui is positive (>0), the component ut in the direction of the unselected axis (the 'u' axis) is calculated by using ut=ui−(Li−Lt). If vi is positive in the third conversion (for tritan), (Li−Lt) is greater than 0, and hence the absolute value of ut becomes smaller than the absolute value of ui. That is, the absolute value of the component in the direction of the unselected axis (the 'u' axis) is decreased according to the variation (Li−Lt) for changing the component in the direction of the luminance axis (the 'L' axis) according to the component in the direction of the selected axis (the second axis (the 'v' axis)). Then, it is determined whether or not the value of the determined value (ut) of 'u' is negative (ut<0), and when the value is determined to be negative, 0 is set to ut (ut=0). Thus, when the component ui and ut of the unselected axis (the 'u' axis) of the pixel data are opposite in sign, where the ui is before unselected axis processing and the ut is after unselected axis processing, the component ut of the unselected axis after unselected axis processing is set to 0.

If ui is 0 or smaller (0 or <0), the component ut in the direction of the unselected axis (the 'u' axis) is calculated by using ut=ui+(Li−Lt). If vi is positive in the third conversion (for tritan), (Li−Lt) is greater than 0, and hence the absolute value of ut becomes smaller than the absolute value of ui. That is, the absolute value of the component in the direction of the unselected axis (the 'u' axis) is decreased according to the variation (Li−Lt) for changing the component in the direction of the luminance axis (the 'L' axis) according to the component in the direction of the selected axis (the second axis (the 'v' axis)). Then, it is determined whether or not the value of the determined value (ut) of 'u' is positive (ut>0), and when the value is determined to be positive, 0 is set to ut (ut=0). Thus, when the component ui and ut of the unselected axis (the 'u' axis) of the pixel data are opposite in sign, where the ui is before unselected axis processing and the ut is after unselected axis processing, the component ut of the unselected axis after unselected axis processing is set to 0.

In both the cases where ui is positive (>0) and ui is 0 or smaller (0 or <0), the conversion part 44 finally checks whether or not the thus determined value of ut exists within the area which the display can display. When it is determined that the value does not exist within the area, the conversion part 44 performs correction by replacing the ut value with the minimum value or the maximum value (whichever is closer to ut after conversion) of the area which the display can display in the value of Lt after conversion. Thus, it is determined whether or not the pixel data after unselected axis processing exists within the area which can be displayed, and when it is determined that it cannot be displayed, the component of the unselected axis is corrected to a limit value which can be displayed (the minimum value or the maximum value within the area which the display can display in the value of Lt after conversion).

(2) When 'v' is negative

If ui is positive (>0), the component ut in the direction of the unselected axis (the 'u' axis) is calculated by using ut=ui−(Lt−Li). If vi is negative in the third conversion (for tritan), (Lt−Li) is greater than 0 (>0), and hence the absolute value of ut becomes smaller than the absolute value of ui. That is, the absolute value of the component in the direction of the unselected axis (the 'u' axis) is decreased according to the variation (Lt−Li) for changing the component in the direction of the luminance axis (the 'L' axis) according to the component in the direction of the selected axis (the second axis (the 'v' axis)). Then, it is determined whether or not the value of the determined value (ut) of 'u' is negative (ut<0), and when the value is determined to be negative, 0 is set to ut (ut=0). Thus, when the component ui and ut of the unselected axis (the 'u' axis) of the pixel data are opposite in sign, where the ui is before unselected axis processing and the ut is after unselected axis processing, the component ut of the unselected axis after unselected axis processing is set to 0.

If ui is 0 or smaller (0 or <0), the component ut in the direction of the unselected axis (the 'u' axis) is calculated by using ut=ui+(Lt−Li). If vi is negative in the third conversion (for tritan), (Lt−Li) is greater than 0 (>0), and hence the absolute value of ut becomes smaller than the absolute value of ui. That is, the absolute value of the component in the direction of the unselected axis (the 'u' axis) is decreased according to the variation (Lt−Li) for changing the component in the direction of the luminance axis (the 'L' axis) according to the component in the direction of the selected axis (the second axis (the 'v' axis)). Then, it is determined whether or not the value of the determined value (ut) of 'u' is positive (ut>0), and when the value is determined to be positive, 0 is set to ut (ut=0). Thus, when the component ui and ut of the unselected axis (the 'u' axis) of the pixel data are opposite in sign, where the ui is before unselected axis processing and the ut is after unselected axis processing, the component ut of the unselected axis after unselected axis processing is set to 0.

In both the cases where ui is positive (>0) and ui is 0 or smaller (0 or <0), the conversion part 44 finally checks whether or not the thus determined value of ut exists within the area which the display can display. When it is determined that the value does not exist within the area, the conversion part 44 performs correction by replacing the ut value with the minimum value or the maximum value (whichever is closer to ut after conversion) of the area which the display can display in the value of Lt after conversion. Thus, it is determined whether or not the pixel data after unselected axis processing exists within the area which can be displayed, and when it is determined that it cannot be displayed, the component of the unselected axis is corrected to a limit value which can be displayed (the minimum value or the maximum value within the area which the display can display in the value of Lt after conversion).

The present device 11 further comprises the color space conversion part 31 as a uniform color space conversion means for converting the original pixel data represented by the RGB color model into positional information in the Luv color space being a uniform color space.

The present device 11 further comprises a uniform color space inverse transform means (here, formed of the color space inverse transform part 51 and the output part 61) for converting the pixel data (Lt, ut, vt) in the uniform color space processed by the data processing part 41 being the color vision conversion processing means into the RGB color model and outputting the converted pixel data.

The present device 11 is configured to cause the computer to execute the predetermined program (Refer to FIG. 1.), and further, the program can be recorded on a computer-readable storage medium.

Matters taken into consideration in the process of inventing the present devices 11 thus configured are described below for reference.

It is necessary to perform color conversion in a color space close to color sense perceived by the human, for making a specific kind of color brighter or darker about the color of each pixel which forms image data while maintaining the tone of an original image.

As an example of such a color space, there is a color space (LMS Color Space) for determining the stimulus value of each cone from the measured values of a color development property (spectral distribution) of the display of a computer or the like, and the spectral absorption properties of three types of cones.

Further, there is another color space (Opponent Color Space) for determining color sense perceived by the brain from an LMS value in consideration of a mathematical operation performed in the process of transmitting a signal from the cones to the brain.

By using such a color space, it is also possible to simulate with a computer how the people having the color vision deficiency see colors.

However, in order to use these color spaces, it is necessary to measure the color development property for each display to be used, and to calculate parameter values for color conversion.

Further, when color conversion for helping the people having the color vision deficiency to imagine an original color is considered, the color conversion which accomplishes purposes for all the people is difficult to achieve even when these color spaces are used, because the extent of the color vision deficiency is diversified, or the cause of a mild color vision deficiency derives from one of the L-cone and the M-cone which indicates the intermediate property thereof.

Considering the above circumstances, the present inventors decide to perform the present color conversion based on the CIE L*u*v* color space (hereinafter referred to as Luv color space).

The Luv color space comprises three dimensions of a luminance axis, a red-green axis, and a yellow-blue axis similar to the Opponent Color Space, and the interconversion method between RGB values and CIE XYZ values is standardized (the conversion method between CIE XYZ and Luv space is also standardized) provided that a display conforms to sRGB.

The CIE L*a*b* color space similar to the Luv color space can also be used. However, when the above simulation result is converted into two color spaces, the Luv color space shows a result nearer to a two-dimensional plane (An axis indicating practically the same range of colors which can be perceived as that for the trichromat, and an axis indicating a very small range of colors which can be perceived are more conspicuous.).

According to the result, the present inventors determines that the Luv color space is more easily used for performing the color conversion considering the humans having the color vision deficiency.

What is claimed is:

1. A pixel processor comprising:
a data processing means which converts a luminance component in a direction of a luminance axis through color vision conversion processing in accordance with a selected component in a direction of a selected axis selected from a first component in a direction of a first axis and a second component in a direction of a second axis, wherein:
the luminance component, the first component, and the second component constitute pixel data designating position data in a uniform color space indicated by three orthogonal coordinate axes of the luminance axis representing luminance, and the first axis and the second axis representing a chromaticness index; and
the color vision conversion processing is conducted to decrease the luminance component in the direction of the luminance axis or increase the luminance component in the direction of the luminance axis alternatively in either case where the selected component in the direction of the selected axis is greater than a first predetermined value or where the selected component in the direction of the selected axis is smaller than a first predetermined value.

2. The pixel processor according to claim 1,
wherein the selected axis is an axis indicating a red component for a positive direction and a green component for a negative direction, and
wherein the luminance component in the direction of the luminance axis is increased when the red component is greater than the first predetermined value while the luminance component in the direction of the luminance axis is decreased when the red component is smaller than the first predetermined value.

3. The pixel processor according to claim 1,
wherein the selected axis is an axis indicating a yellow component for a positive direction and a blue component for a negative direction, and
wherein the luminance component in the direction of the luminance axis is decreased when the yellow component is greater than the first predetermined value while the luminance component in the direction of the luminance axis is increased when the yellow component is smaller than the first predetermined value.

4. The pixel processor according to claim 1, wherein the selected component in the direction of the selected axis after the color vision conversion processing is determined by converting the selected component in the direction of the selected axis before the color vision conversion processing based on a monotone increasing function that monotonically increases an absolute value of the selected component in the direction of the selected axis through the color vision conversion processing.

5. The pixel processor according to claim 4,
wherein a selected data combination is composed of the luminance component in the direction of the luminance axis and the selected component in the direction of the selected axis that are included in the pixel data,
wherein either selected data combination including the selected component in the direction of the selected axis greater than a second predetermined value or smaller than the second predetermined value is alternatively converted such that either convex or concave function existing on a selected plane including the selected axis and the luminance axis as the selected axis is a horizontal axis and the luminance axis is a vertical axis is alternatively satisfied.

6. The pixel processor according to claim 5,
wherein the convex function and the concave function are formed, when luminance components in the direction of the luminance axis are the same, by a part of a first elliptic circumference existing in a greater range than the second predetermined value, the first elliptic circumference having the center on a straight line indicating the second predetermined value as a selected component in the direction of the selected axis; and a part of a second elliptic circumference existing in a smaller range than the second predetermined value, the second elliptic circumference having the center on a straight line indicating the second predetermined value as a selected component in the direction of the selected axis, and
wherein one end of the first elliptic circumference and one end of the second elliptic circumference are connected at the second predetermined value.

7. The pixel processor according to claim 1, wherein a change amount of the luminance component in the direction of the luminance axis to be changed corresponding to the selected component in the direction of the selected axis in the color vision conversion processing is determined to be an amount corresponding to a ratio of the selected component of the selected axis of the pixel data to a selected axis reference value as a reference value of the selected component of the selected axis.

8. The pixel processor according to claim 7, wherein the selected axis reference value is a limit value of a displayable range of the selected component of the selected axis in at least part of the range of the luminance component in the direction of the luminance axis before the color vision conversion processing.

9. The pixel processor according to claim 7, wherein the selected axis reference value is constant in at least part of the range of the luminance component in the direction of the luminance axis before the color vision conversion processing.

10. The pixel processor according to claim 7, wherein the change amount of the luminance component in the direction of the luminance axis is determined to be an amount corresponding to a value obtained by multiplying the ratio by a difference between a luminance axis reference value as a reference value of the luminance component of the luminance axis and the luminance component in the direction of the luminance axis before the color vision conversion processing.

11. The pixel processor according to claim 10, wherein the luminance axis reference value is a luminance component of the luminance axis of an intersection of the convex or concave function existing on a selected plane including the selected axis and the luminance axis as the selected axis is a horizontal axis and the luminance axis is a vertical axis and a boundary line of a range that can be displayed on the selected plane including the selected axis and the luminance axis.

12. The pixel processor according to claim 1, wherein the data processing part conducts unselected axis processing to decrease an absolute value of an unselected component of the pixel data in a direction of an unselected axis as the other axis than the selected axis selected from the first axis and the second axis.

13. The pixel processor according to claim 12, wherein the absolute value of the unselected component in the direction of the unselected axis is decreased by an amount corresponding to a change amount of the luminance component in the direction of the luminance axis.

14. The pixel processor according to claim 12, wherein the unselected component of the unselected axis of the pixel data is made 0 after the unselected axis processing when the unselected component of the unselected axis switches between positive and negative alternatively before or after the unselected axis processing.

15. The pixel processor according to claim 12, wherein the unselected component of the unselected axis is corrected to be a limit value of a displayable range when it is judged that the pixel data cannot be displayed by determining whether the pixel data after the unselected axis processing is in a displayable range or not.

16. The pixel processor according to claim 1, wherein the uniform color space is a Luv color space or a Lab color space.

17. The pixel processor according to claim 1, further comprising:
a color space conversion part which converts original pixel data indicated by RGB color model into position data in the uniform color space.

18. The pixel processor according to claim 1, further comprising:
a color space inverse transform part which converts the pixel data in an RGB color model, the pixel data in the uniform color space being processed by the data processing part; and
an output part which outputs the converted pixel data.

19. A method of processing pixel data comprising the steps of:
selecting one of a first component in a direction of a first axis and a second component in a direction of a second axis wherein the selected one is referred to as a selected component in a direction of a selected axis; and
converting a luminance component in a direction of a luminance axis by decreasing or increasing the luminance component alternatively in either case where the selected component in the direction of the selected axis is greater than a first predetermined value or where the selected component in the direction of the selected axis is smaller than the first predetermined value,
wherein the pixel data has the luminance component, the first component, and the second component, which designate position data in a uniform color space indicated by three orthogonal coordinate axes of the luminance axis representing luminance, and the first axis and the second axis represent a chromaticness index.

* * * * *